(12) United States Patent
Steffens et al.

(10) Patent No.: US 12,466,298 B2
(45) Date of Patent: Nov. 11, 2025

(54) ERGONOMIC VEHICLE CAB

(71) Applicant: Oshkosh Corporation, Oshkosh, WI (US)

(72) Inventors: Greg Steffens, Oshkosh, WI (US); Andrew Rausch, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 152 days.

(21) Appl. No.: 18/171,065

(22) Filed: Feb. 17, 2023

(65) Prior Publication Data

US 2023/0278475 A1 Sep. 7, 2023

Related U.S. Application Data

(60) Provisional application No. 63/356,106, filed on Jun. 28, 2022, provisional application No. 63/325,936, (Continued)

(51) Int. Cl.
*B60N 2/75* (2018.01)
*B60K 35/00* (2006.01)
(Continued)

(52) U.S. Cl.
CPC .............. *B60N 2/797* (2018.02); *B60K 35/00* (2013.01); *B60N 2/77* (2018.02); *B60K 35/10* (2024.01);
(Continued)

(58) Field of Classification Search
CPC .... B60N 2/77; B60N 2/797; B60K 2360/135; B60Y 2200/144
(Continued)

(56) References Cited

U.S. PATENT DOCUMENTS 2,172,831 A 9/1939 Carson
2,959,239 A 11/1960 Kenlock et al.
(Continued)

FOREIGN PATENT DOCUMENTS

CN 203651947 U 6/2014
CN 114954695 A 8/2022
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Jose V Chen
(74) *Attorney, Agent, or Firm* — Foley & Lardner LLP

(57) ABSTRACT

A refuse vehicle includes a chassis coupled to a wheel and having a first portion and a second portion, an energy storage system supported by the chassis, a drive motor coupled to the wheel and configured to receive electrical energy from the energy storage system and provide rotational mechanical energy to the wheel, a cab supported by the first portion of the chassis, a refuse compartment supported by the second portion of the chassis, a suspension supported by the cab, a seat supported within an interior of the cab, an armrest arranged proximate to the seat and having control console with a joystick, and an armrest adjustment assembly coupled to the armrest and configured to adjust a height of the armrest relative to the seat. The suspension supports the seat and the armrest so that a position of the armrest relative to the seat is maintained.

20 Claims, 45 Drawing Sheets

Related U.S. Application Data filed on Mar. 31, 2022, provisional application No. 63/317,322, filed on Mar. 7, 2022.

(51) Int. Cl.
 *B60K 35/10* (2024.01)
 *B60K 35/65* (2024.01)

(52) U.S. Cl.
 CPC ........... *B60K 35/65* (2024.01); *B60K 2360/11* (2024.01); *B60K 2360/135* (2024.01); *B60K 2360/741* (2024.01); *B60Y 2200/144* (2013.01); *B60Y 2400/3015* (2013.01); *B60Y 2400/306* (2013.01)

(58) Field of Classification Search
 USPC .............................. 297/411.3, 411.36, 411.38
 See application file for complete search history.

(56) References Cited

U.S. PATENT DOCUMENTS

| | | | |
|---|---|---|---|
| 3,055,699 A | 9/1962 | Walter | |
| 5,632,353 A | 5/1997 | Kimberley | |
| 5,636,899 A * | 6/1997 | Schiff | B60N 2/77 248/118 |
| 5,676,483 A * | 10/1997 | Koubek | A47C 1/03 403/328 |
| 5,908,221 A * | 6/1999 | Neil | A47C 1/03 297/411.36 |
| 5,931,536 A * | 8/1999 | Wu | A47C 1/0308 248/404 |
| 5,952,730 A | 9/1999 | Haller et al. | |
| 6,460,932 B1 * | 10/2002 | Kopish | A47C 1/03 297/411.36 |
| 7,246,859 B2 * | 7/2007 | Igarashi | A47C 1/03 297/411.36 |
| 7,490,910 B1 * | 2/2009 | Draughon | A47C 1/0308 297/411.31 |
| 7,832,805 B1 * | 11/2010 | Lai | A47C 1/0308 297/411.32 |
| 8,480,172 B2 * | 7/2013 | Baker | A47C 1/03 297/411.3 |
| 8,943,946 B1 | 2/2015 | Richmond et al. | |
| 12,090,847 B2 | 9/2024 | Ahn et al. | |
| 2005/0280286 A1 | 12/2005 | Kelley et al. | |
| 2006/0000656 A1 * | 1/2006 | Bisick | B60N 2/797 180/272 |
| 2006/0136110 A1 | 6/2006 | Casey et al. | |
| 2006/0290190 A1 * | 12/2006 | Zuccato | A47C 1/03 297/411.36 |
| 2009/0230749 A1 * | 9/2009 | Kostak | B60N 2/777 701/50 |
| 2011/0236130 A1 * | 9/2011 | Klein | B60N 2/797 297/344.21 |
| 2012/0098215 A1 | 4/2012 | Rositch et al. | |
| 2012/0112492 A1 | 5/2012 | Grumbo | |
| 2013/0119738 A1 * | 5/2013 | Wallis | A61G 5/125 297/411.36 |
| 2013/0170932 A1 | 7/2013 | Neufeldt | |
| 2013/0249183 A1 | 9/2013 | Ellifson et al. | |
| 2013/0300073 A1 | 11/2013 | Venton-Walters et al. | |
| 2014/0028542 A1 | 1/2014 | Lovitt et al. | |
| 2014/0183922 A1 * | 7/2014 | Cvek | A47C 1/0308 297/411.36 |
| 2014/0265203 A1 | 9/2014 | Zuleger et al. | |
| 2014/0326555 A1 | 11/2014 | Ellifson et al. | |
| 2014/0334956 A1 | 11/2014 | Venton-Walters et al. | |
| 2015/0151651 A1 | 6/2015 | Stingle et al. | |
| 2015/0165941 A1 * | 6/2015 | Park | B60N 2/24 297/411.36 |
| 2015/0191069 A1 | 7/2015 | Zuleger et al. | |
| 2015/0352987 A1 * | 12/2015 | Randleman | B60N 2/0228 297/463.1 |
| 2016/0167475 A1 | 6/2016 | Ellifson et al. | |
| 2016/0375805 A1 | 12/2016 | Krueger et al. | |
| 2017/0267052 A1 | 9/2017 | Zuleger et al. | |
| 2018/0056746 A1 | 3/2018 | Ellifson et al. | |
| 2019/0185077 A1 | 6/2019 | Smith et al. | |
| 2019/0276102 A1 | 9/2019 | Zuleger et al. | |
| 2019/0316322 A1 * | 10/2019 | Haller | F16C 1/10 |
| 2019/0333750 A1 | 11/2019 | Ellifson et al. | |
| 2020/0062071 A1 | 2/2020 | Zuleger et al. | |
| 2020/0247486 A1 | 8/2020 | Groteleuschen et al. | |
| 2020/0256649 A1 | 8/2020 | Krueger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2020/0391569 A1 | 12/2020 | Zuleger | |
| 2021/0171137 A1 | 6/2021 | Zuleger et al. | |
| 2021/0276643 A1 | 9/2021 | Ellifson et al. | |
| 2021/0284019 A1 * | 9/2021 | Koshiol | E02F 9/16 |
| 2021/0300143 A1 | 9/2021 | Zuleger | |
| 2021/0300396 A1 | 9/2021 | McGill | |
| 2021/0318713 A1 * | 10/2021 | Case | E02F 3/841 |
| 2021/0354329 A1 | 11/2021 | Hou et al. | |
| 2021/0380179 A1 | 12/2021 | Smith et al. | |
| 2021/0394578 A1 | 12/2021 | Ellifson et al. | |
| 2022/0072736 A1 | 3/2022 | Steffens et al. | |
| 2022/0118854 A1 * | 4/2022 | Davis | B60W 10/08 |
| 2022/0134372 A1 | 5/2022 | Andringa | |
| 2022/0134856 A1 * | 5/2022 | Andringa | B60L 50/16 74/15.4 |
| 2022/0258965 A1 * | 8/2022 | Kappers | B62D 33/06 |
| 2022/0260344 A1 | 8/2022 | Krueger et al. | |
| 2022/0289290 A1 | 9/2022 | Andringa et al. | |
| 2022/0339987 A1 | 10/2022 | Zuleger et al. | |
| 2023/0191887 A1 * | 6/2023 | Rausch | B62D 1/12 180/65.1 |
| 2023/0202301 A1 * | 6/2023 | Rocholl | B60K 25/00 180/65.1 |
| 2023/0287652 A1 * | 9/2023 | Shiiguchi | E02F 9/0883 |
| 2023/0373571 A1 | 11/2023 | Price et al. | |
| 2024/0376692 A1 * | 11/2024 | Masuda | E02F 9/2004 |

FOREIGN PATENT DOCUMENTS

| | | |
|---|---|---|
| DE | 10007664 A1 | 8/2001 |
| FR | 2873335 A1 | 1/2006 |
| WO | WO-2006/711160 A1 | 7/2006 |
| WO | WO-2007/101616 A1 | 9/2007 |

OTHER PUBLICATIONS https://www.youtube.com/watch?v=NQFtAnm7D-c; "All-New Mack LR Electric Garbage Truck." Retrieved on Mar. 21, 2023.

* cited by examiner

ERGONOMIC VEHICLE CAB

CROSS-REFERENCE TO RELATED PATENT APPLICATIONS

This application claims the benefit of and priority to: (a) U.S. Provisional Patent Application No. 63/317,322, filed Mar. 7, 2022; (b) U.S. Provisional Patent Application No. 63/325,936, filed Mar. 31, 2022; and (c) U.S. Provisional Patent Application No. 63/356,106, filed Jun. 28, 2022, the entire disclosures of which are hereby incorporated by reference herein.

BACKGROUND

Vocational vehicles typically include a cab that may be coupled to components, such as a chassis or an implement.

SUMMARY OF THE INVENTION

At least one embodiment relates to a refuse vehicle that includes a chassis coupled to a wheel and having a first portion and a second portion, an energy storage system supported by the chassis, a drive motor coupled to the wheel and configured to receive electrical energy from the energy storage system and provide rotational mechanical energy to the wheel, a cab supported by the first portion of the chassis, a refuse compartment supported by the second portion of the chassis, a suspension supported by the cab, a seat supported within an interior of the cab, an armrest arranged proximate to the seat and having control console with a joystick, and an armrest adjustment assembly coupled to the armrest and configured to adjust a height of the armrest relative to the seat. The suspension supports the seat and the armrest so that a position of the armrest relative to the seat is maintained.

Another embodiment relates to a refuse vehicle that includes a chassis coupled to a wheel and having a first portion and a second portion, an energy storage system supported by the chassis, a drive motor coupled to the wheel and configured to receive electrical energy from the energy storage system and provide rotational mechanical energy to the wheel, a cab supported by the first portion of the chassis, a refuse compartment supported by the second portion of the chassis, a suspension supported by the cab, and a seat supported within an interior of the cab. The seat includes an armrest coupled to the seat and having a joystick supported on the armrest, and a gas strut coupled between the seat and the armrest and configured to adjust a height of the armrest relative to the seat. The suspension supports the seat and the armrest so that a position of the armrest relative to the seat is maintained.

Another embodiment relates to a refuse vehicle that includes a chassis coupled to a wheel and having a first portion and a second portion, an energy storage system supported by the chassis, a drive motor coupled to the wheel and configured to receive electrical energy from the energy storage system and provide rotational mechanical energy to the wheel, a cab supported by the first portion of the chassis, a refuse compartment supported by the second portion of the chassis, a suspension supported by the cab, a seat supported within an interior of the cab, an armrest coupled to the seat and having a joystick supported on the armrest; and an armrest adjustment assembly coupled to the armrest. The armrest adjustment assembly includes a hinge and a housing. The housing is coupled to the seat and the hinge is coupled to the armrest and the housing. The armrest pivots about the hinge to selectively move between an operating position and a stowed position. The suspension supports the seat and the armrest so that a position of the armrest relative to the seat is maintained.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
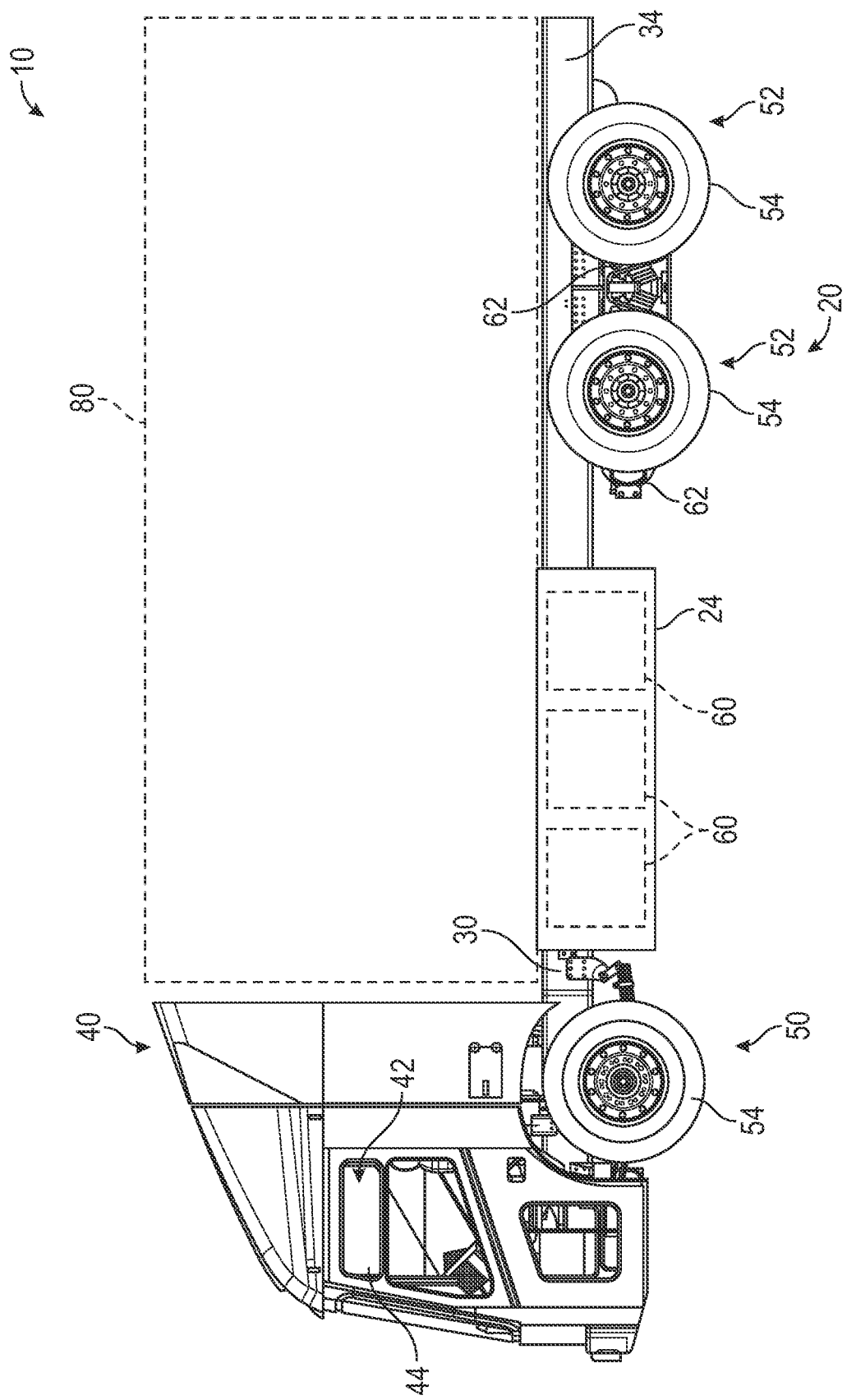
FIG. 1 is a left side view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vocational vehicle (e.g., refuse vehicle, mixing vehicles) includes a cab configured to house an operator and various systems and controls of the vocational vehicle. In some embodiments, the cab includes a tunnel that extends along a centerline of the cab. The tunnel protrudes into the interior of the cab and defines a recess on the exterior of the cab to receive a support structure. In some embodiments, the support structure is a chassis. The chassis may include a front portion that is narrower than a rear portion, such that the front portion fits within the tunnel of the cab and supports the cab via the tunnel. In some embodiments, there are no other devices (e.g., an engine) disposed within the tunnel. This allows the tunnel to be lower and allows the cab to sit closer to the ground.

In some embodiments, the size of the tunnel is defined by the elevation and width of the chassis. A tunnel with a smaller width allows a seat inside the cab to be positioned further inboard within the cab. A shorter tunnel allows a top of the tunnel to be below where an arm of an operator would traditionally be. In such an embodiment, the seat can be disposed directly next to or even partially above the tunnel and still provide the operator with the necessary clearances. This allows the entire cab to be reduced in size (e.g., total volume) since the seats are disposed closer to the middle of the cab and the tunnel does not restrict operator clearances.

In another embodiment, the cab includes a multi-step entry. The multi-step entry may include a plurality of steps. In one embodiment, the multi-step entry includes stair-style steps, where each of the plurality of steps is substantially the same height. In an exemplary embodiment, a first step is 15 inches above a ground on which the vehicle travels and a second step is 15 inches above the first step. This allows for easier entry and exit for an operator of the vehicle.

Incorporating the elements of the cab described herein allows the overall size of the cab to decrease and improves the ergonomics of the vocational vehicle for an operator. The cab described herein provides easier accessibility with lower floor heights, equal stair heights, a narrower seating configuration to accommodate a smaller cab, a shorter tunnel to allow seats to be positioned more inward in the cab while still maintaining appropriate clearances for an operator, and increased visibility with better positioning of the seats and windows of the cab, among others.

In some embodiments, the cab (e.g., of a refuse vehicle) may be configured for two operators (e.g., a left-hand operation and/or a right-hand operation). The vehicle may include a controller configured to determine the position and/or presence of an operator within the cab, and may configure various settings and controls of the cab and the operation of the vehicle depending on such determinations.

In some embodiments, the vehicle (e.g., a refuse vehicle) includes an armrest and a gas strut configured to reposition the armrest in a vertical direction. In some embodiments, the armrest includes a control console having drive components of the vehicle mounted thereon (e.g., a joystick). The armrest is repositionable between an operating position and a stowed position, where the armrest pivots between the positions to make the cab a walkthrough cab. The gas strut is rigidly coupled to the seat and configured to extend and retract to change a height of the armrest. The armrest includes a joint, where the armrest pivots about the joint. The joint is advantageously positioned to minimize contact between the armrest and a rear sidewall of the cab when the armrest is in the stowed position.

In some embodiments, the vehicle (e.g., a refuse vehicle) includes a cab that is selectively configurable in a left-hand drive configuration, a right-hand drive configuration, and/or a dual-drive configuration. This modularity in the drive configuration reduces the number of unique components that need to be manufactured to produce three different vehicle drive configurations. In some embodiments, the cab includes a dash pod that is installed on both a first side and a second side of a front console or dash within an interior of the cab. The dash pod includes integrated ducting (e.g., one or more ducts for HVAC) and a console cutout that is configured to receive either a glove box or an gauge hood (e.g., used on a steering side). The console cutout is designed to be universal so that a glove box or gauge hood can be installed on either (or both) side of the cab.

Overall Vehicle

Figure 2:
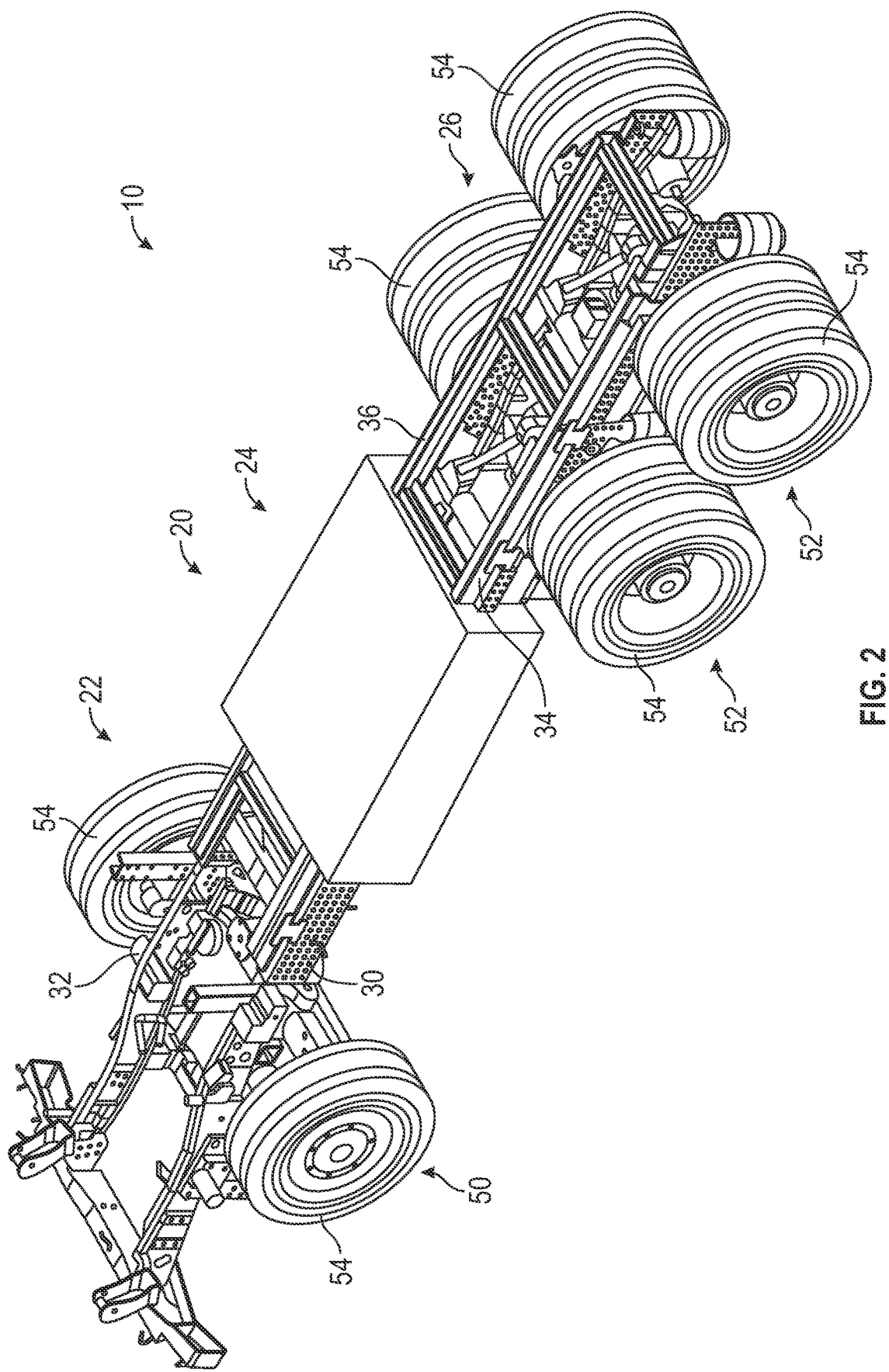
FIG. 2 is a perspective view of a chassis of the vehicle of FIG. 1, according to an exemplary embodiment.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or propulsion components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
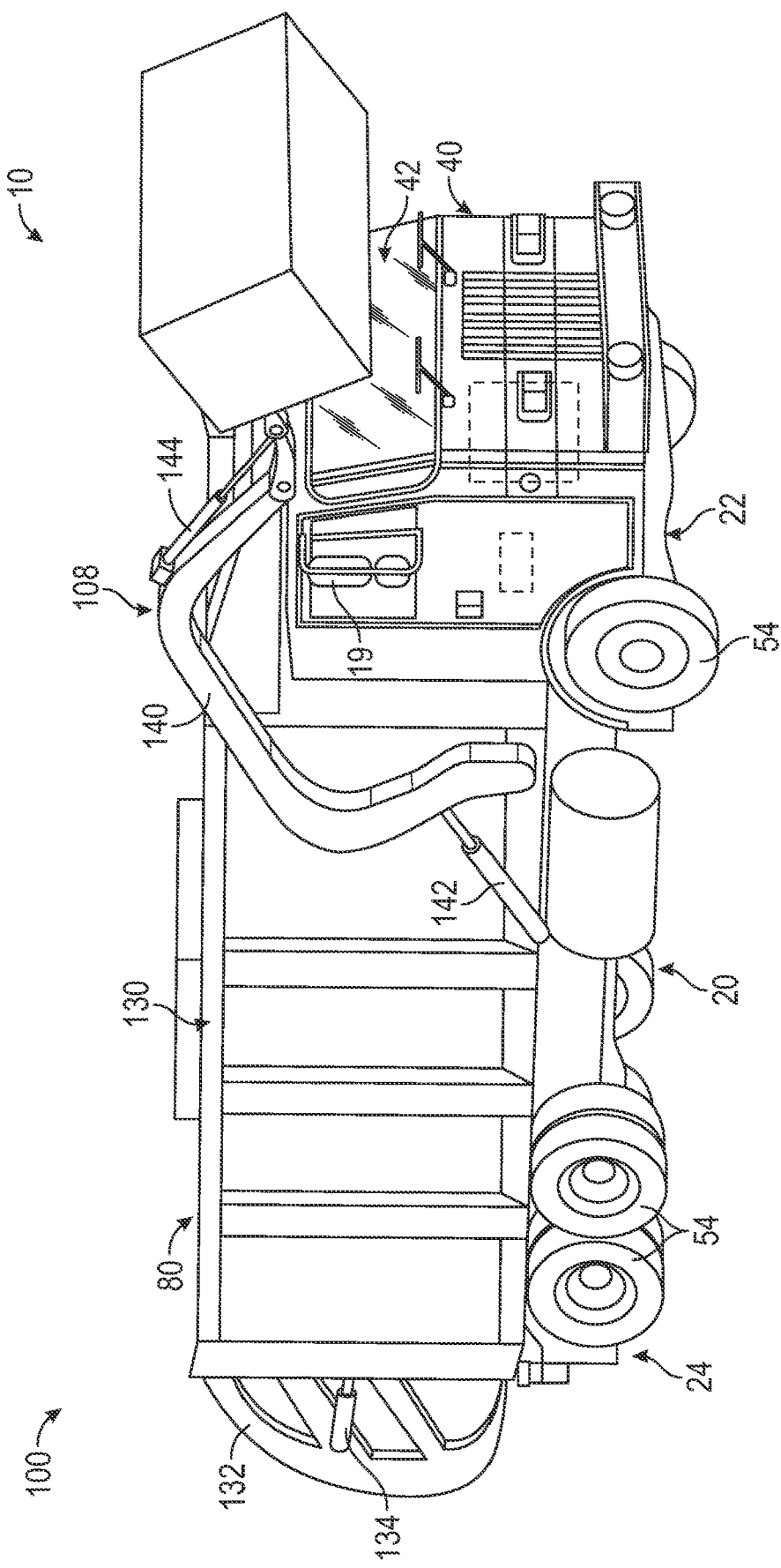
FIG. 3 is a perspective view of the vehicle of FIG. 1 configured as a front-loading refuse vehicle, according to an exemplary embodiment.
Figure 4:
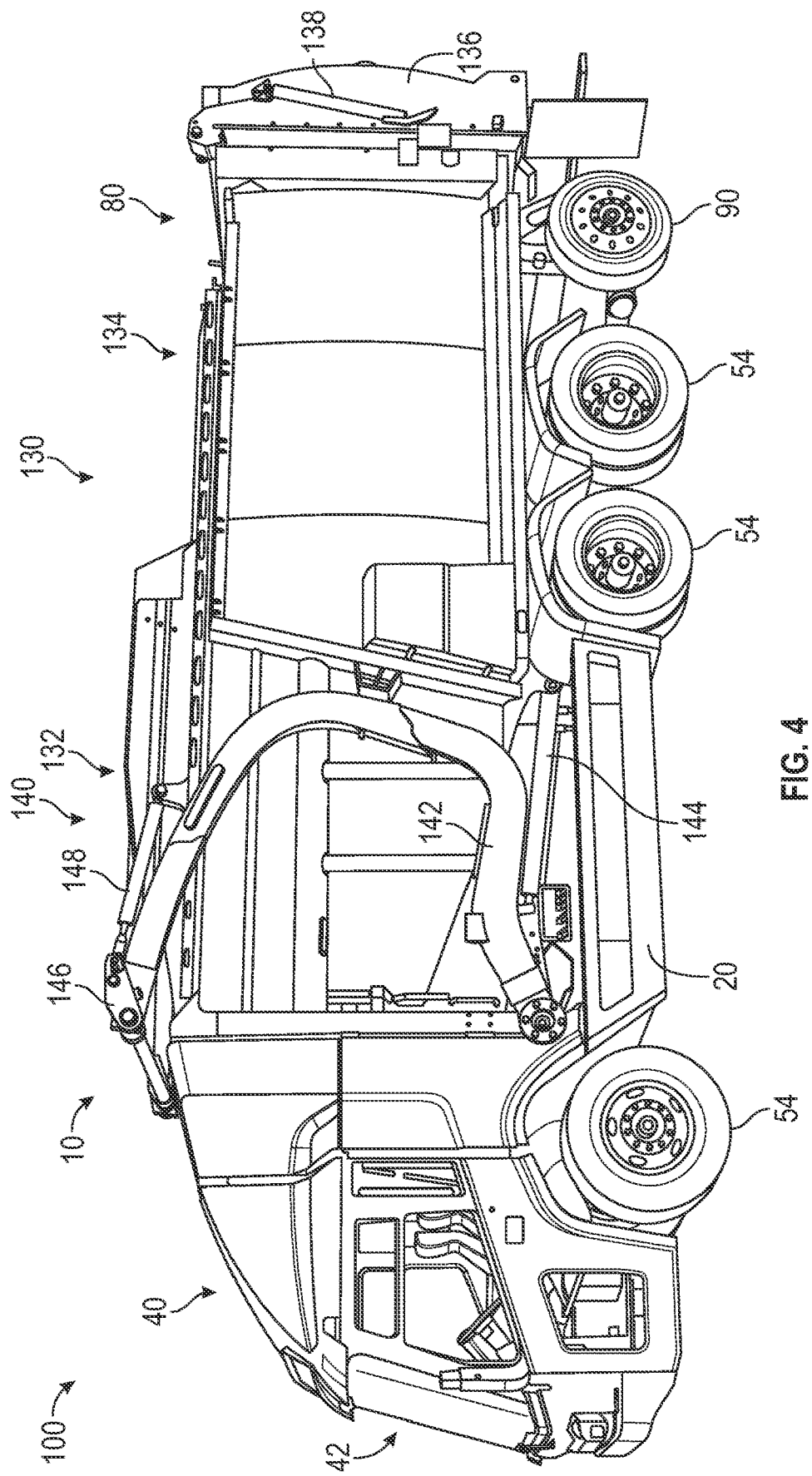
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
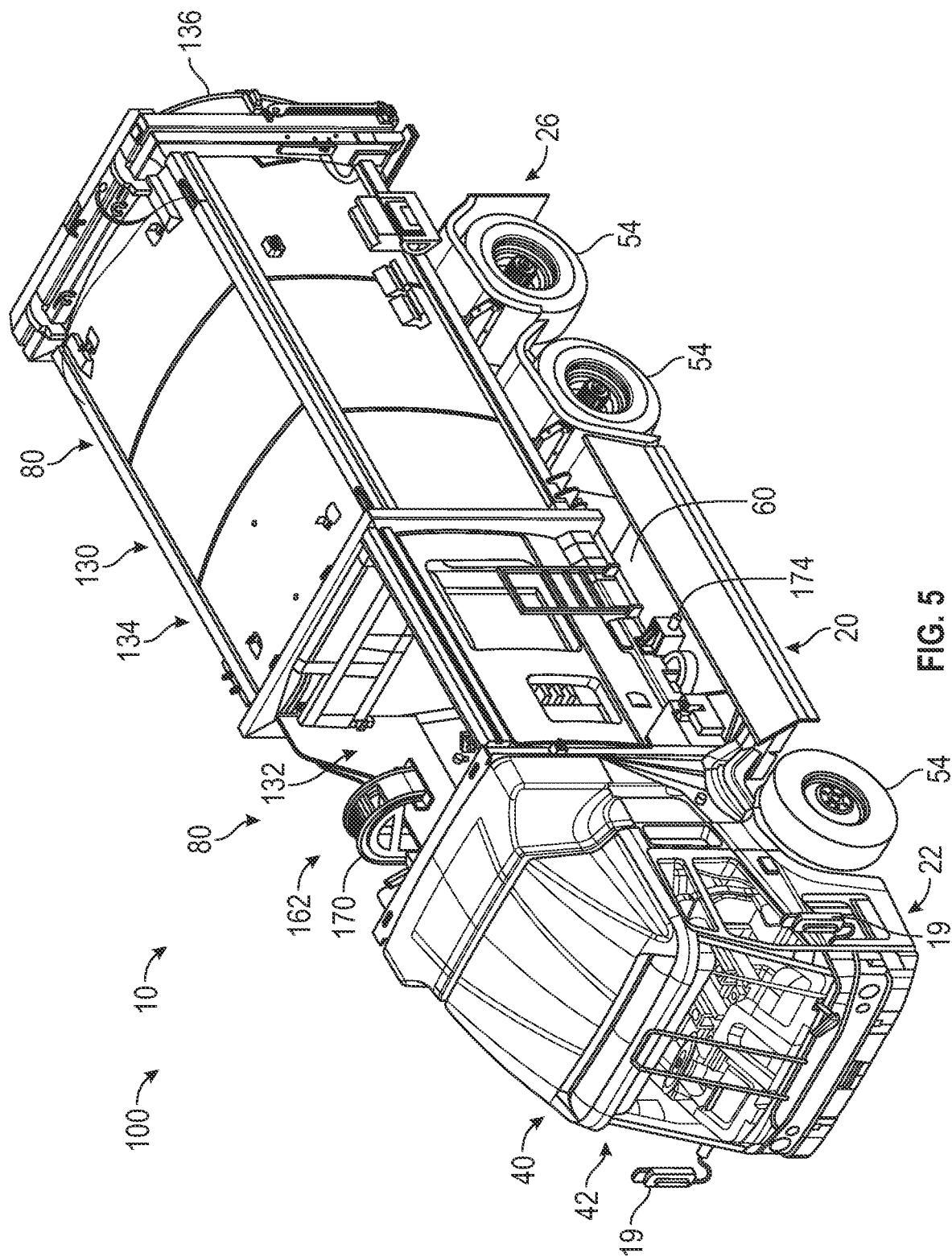
FIG. 5 is a perspective view of the vehicle of FIG. 1 configured as a side-loading refuse vehicle, according to an exemplary embodiment.
Figure 6:
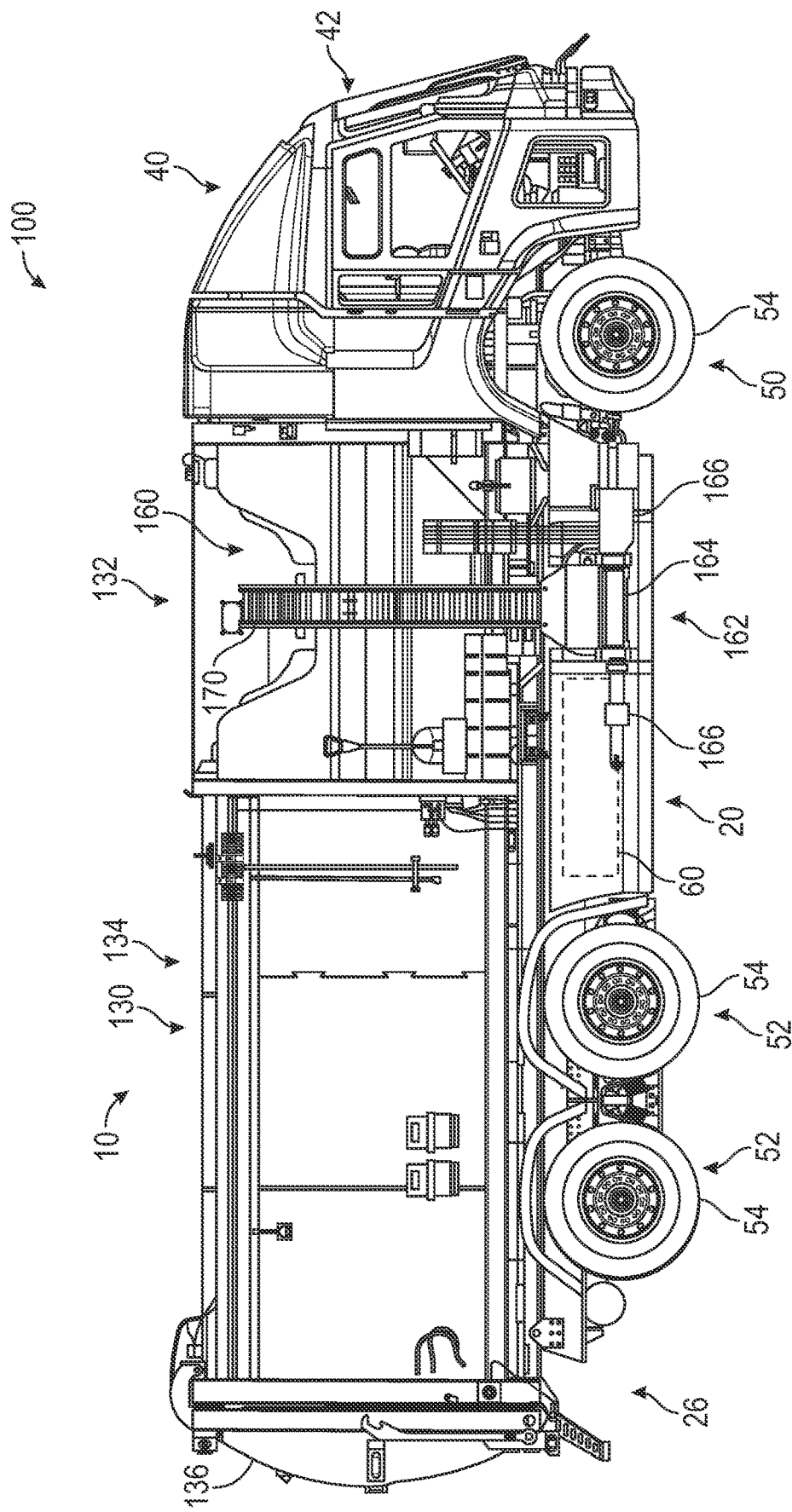
FIG. 6 is a right side view of the side-loading refuse vehicle of FIG. 5.
Figure 7:
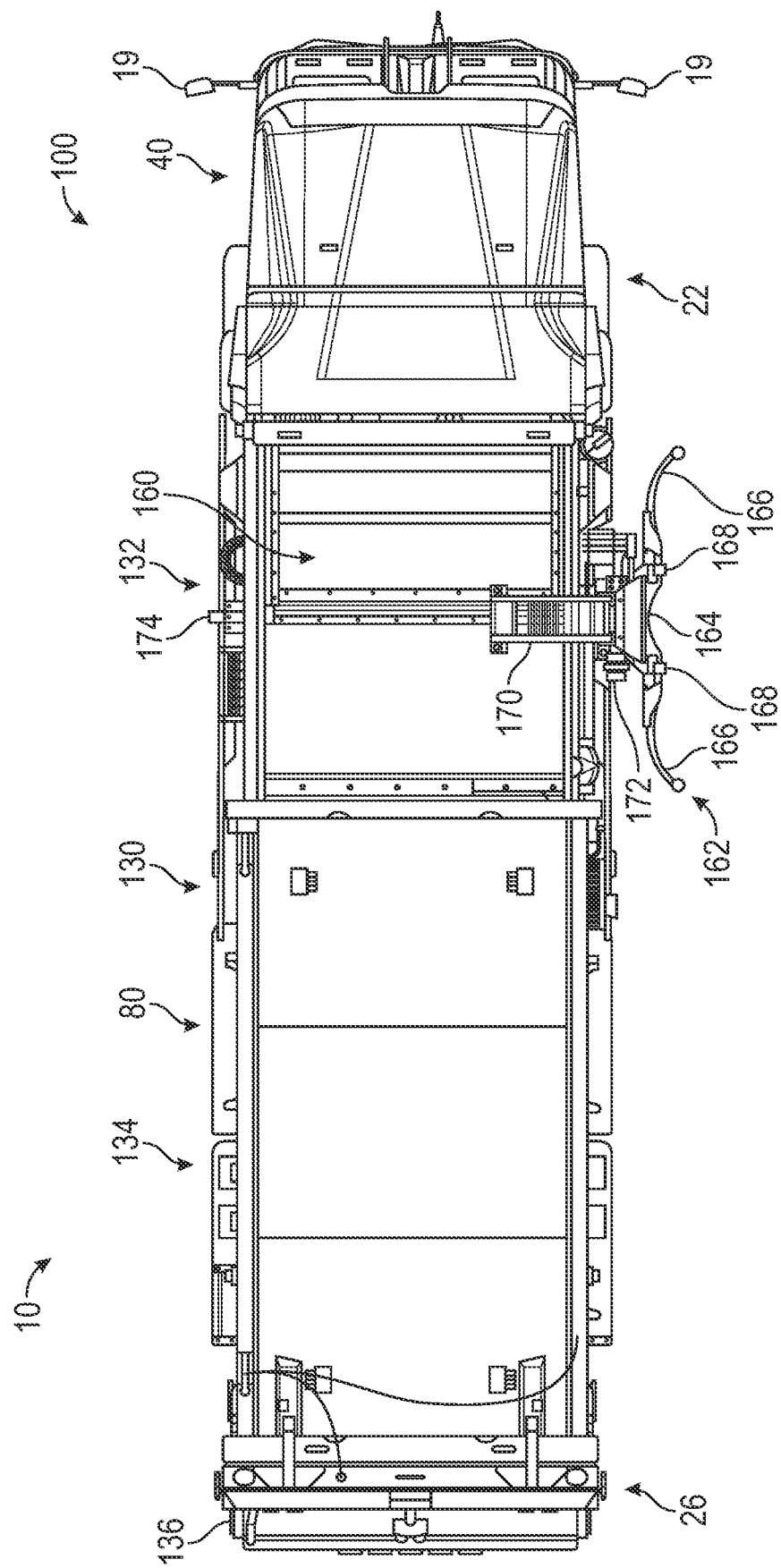
FIG. 7 is a top view of the side-loading refuse vehicle of FIG. 5.
Figure 8:
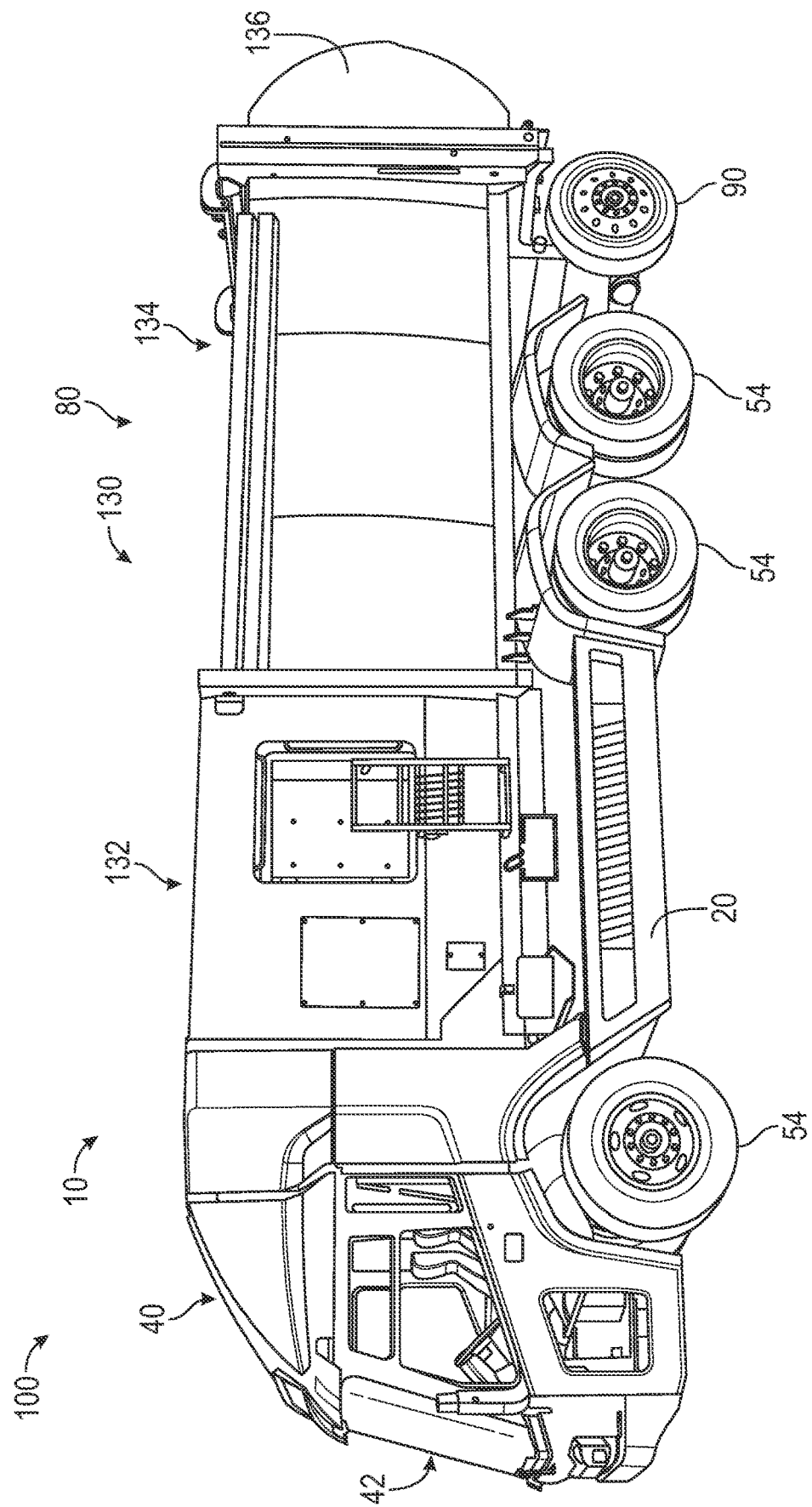
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
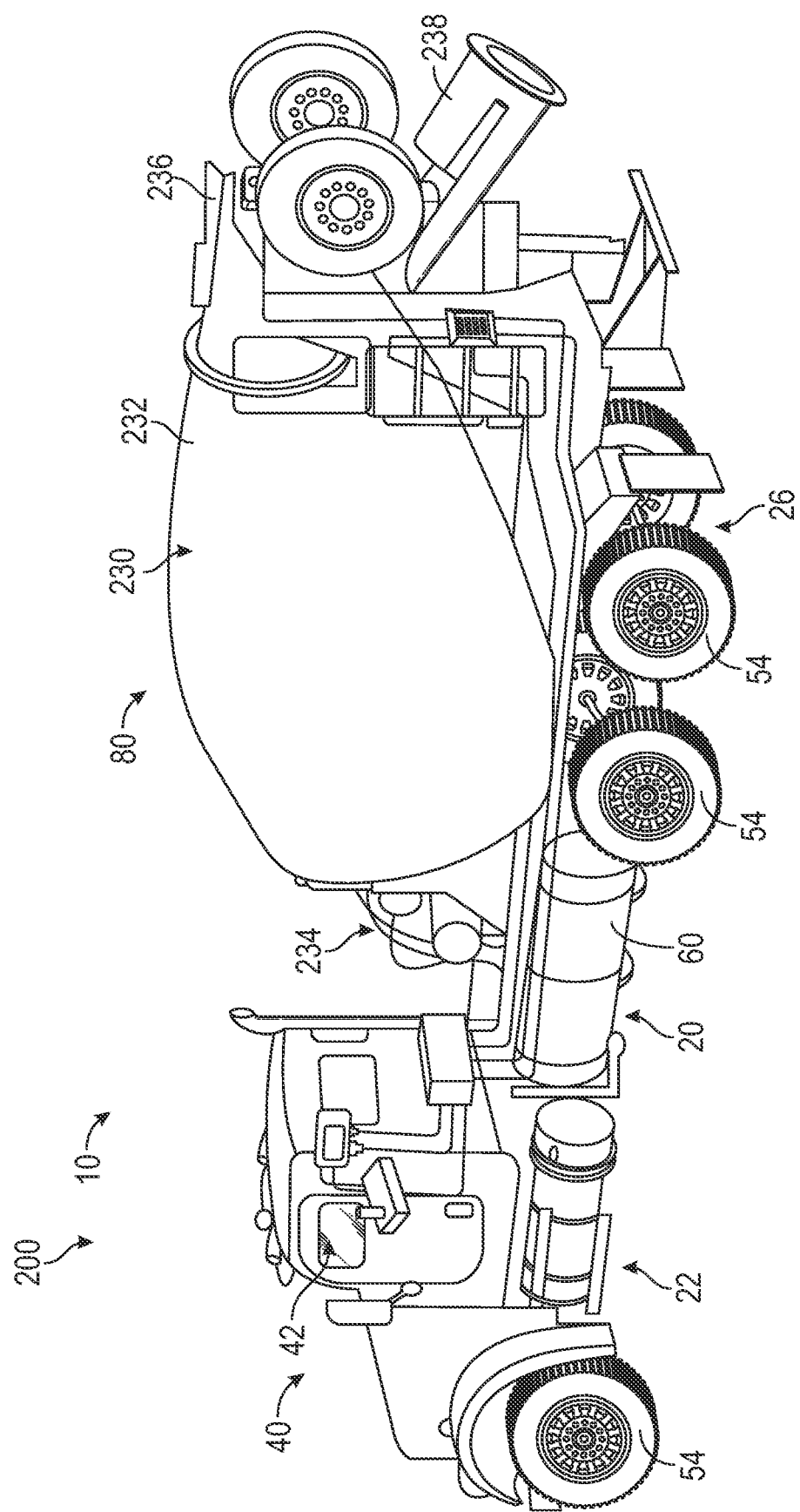
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
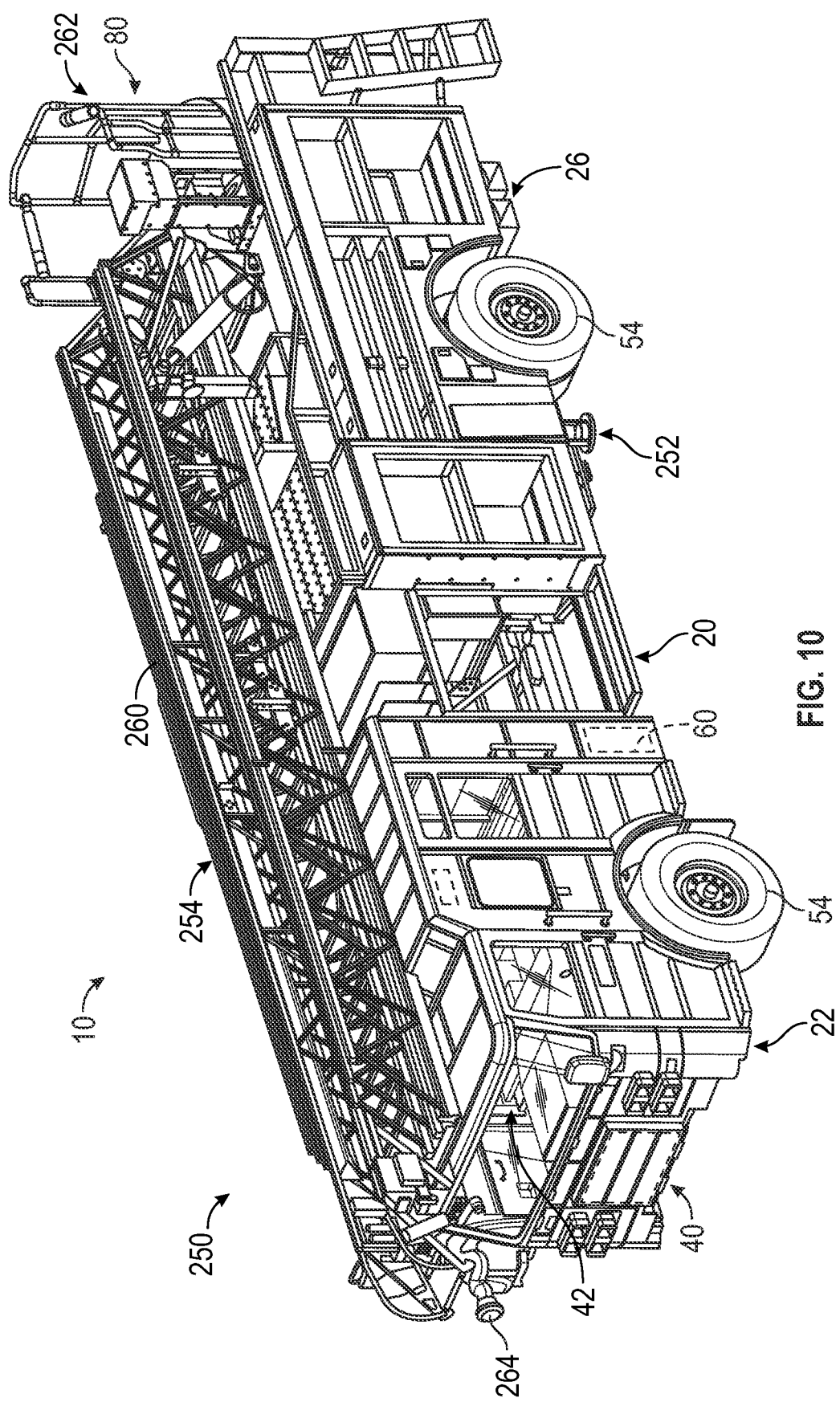
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
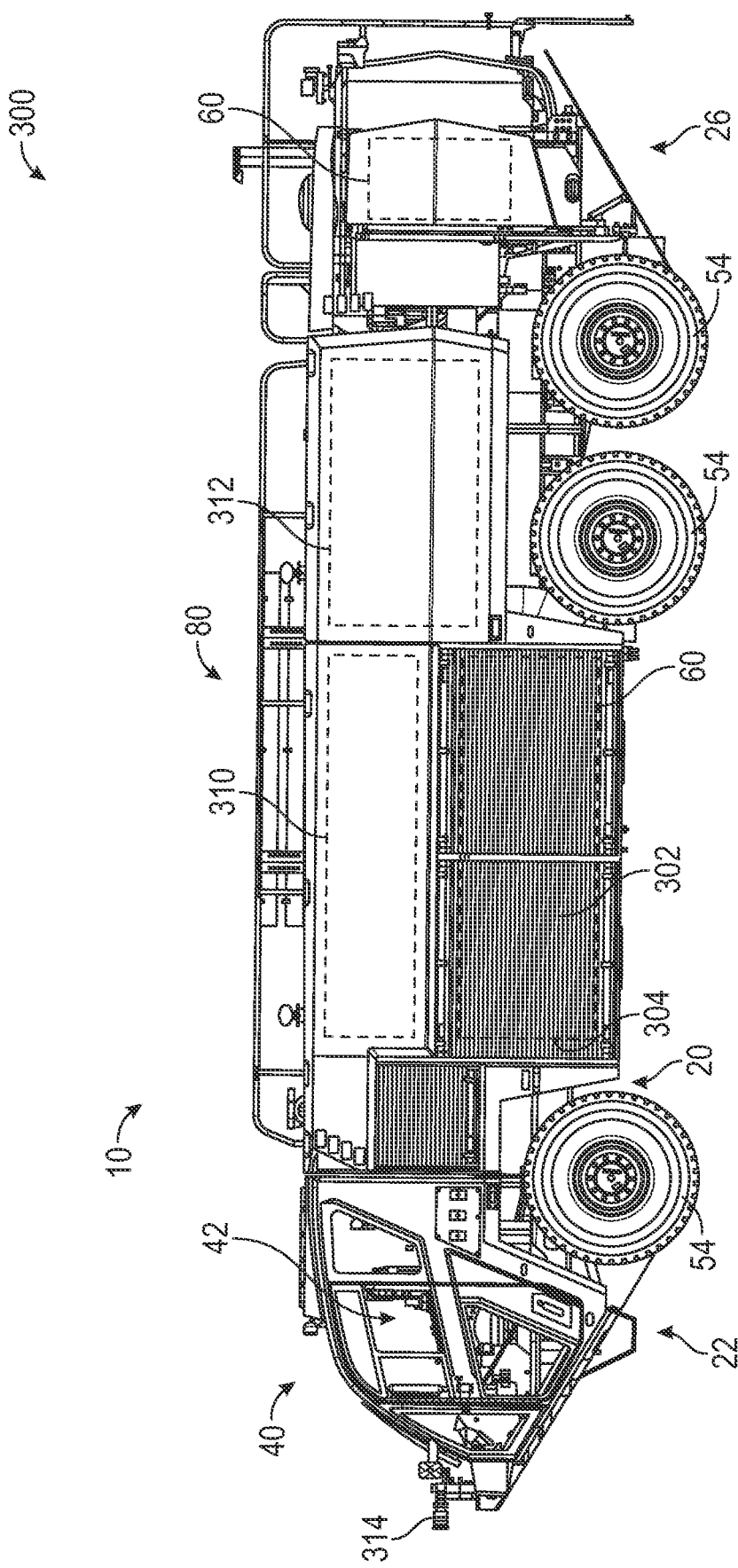
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
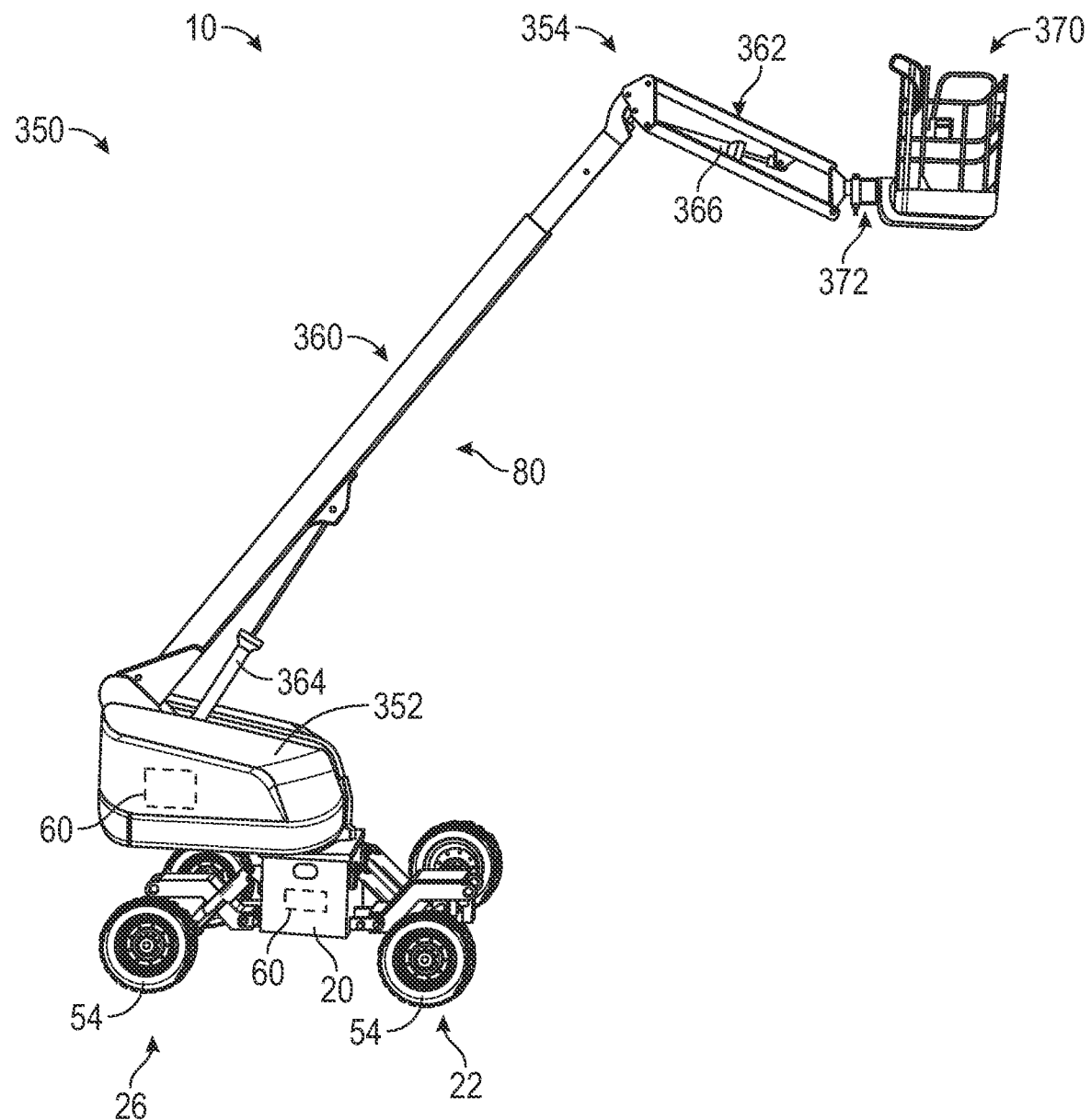
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
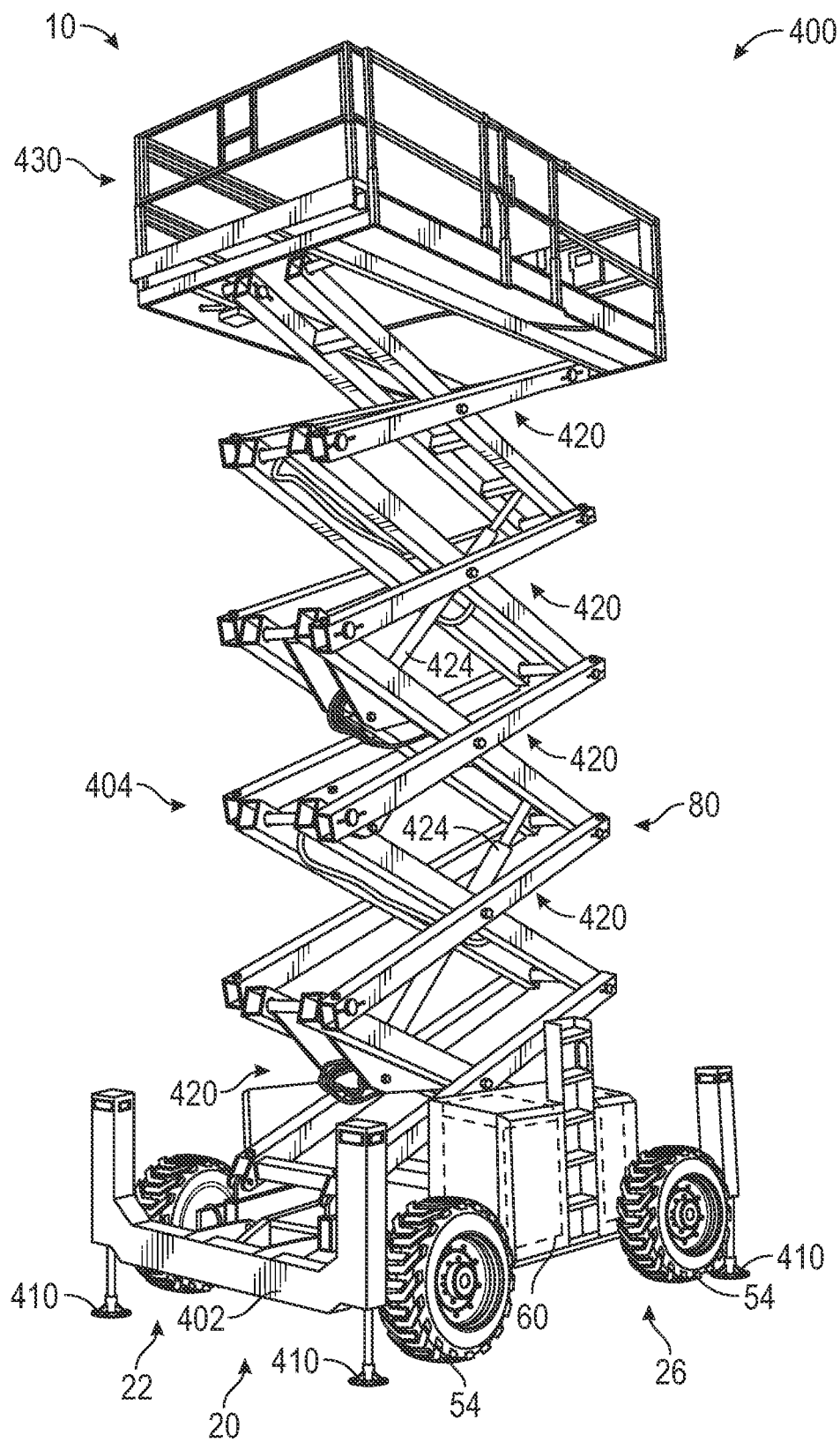
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Ergonomic Vehicle Cab

According to an exemplary embodiment, as shown in FIG. 9A, the chassis 20 of a vehicle 10 includes a first frame rail, shown as frame rail 902, and a second frame rail, shown as frame rail 904. The first frame rail 902 and the second frame rail 904 may extend continuously along the entire length of the vehicle 10. In other embodiments, the first and second frame rails 902, 904 extend only a portion of the length of the vehicle 10. In one embodiment, the first frame rail 902 is parallel to the second frame rail 904. In another embodiment, at least one portion of the first frame rail 902 is parallel to at least one portion of the second frame rail 904. In another embodiment, the first frame rail 902 and the second frame rail 904 have a uniform cross-section along the entire length of the frame rails 902, 904. In such an embodiment, each frame rail 902, 904 defines a constant size and shape along the entire frame rail 902, 904. In another embodiment, the first frame rail 902 and the second frame rail 904 do not have a uniform cross-section along the entire length of the frame rails 902, 904. In some embodiments, the first frame rail 902 mirrors the second frame rail 904 (e.g., the first frame rail 902 and the second frame rail 904 define reflective symmetry about a center axis extending longitudinally along a centerline of the chassis 20). In other embodiments, the first frame rail 902 is different from the second frame rail 904.

According to an exemplary embodiment, as shown in FIG. 9A, the chassis 20 includes three sections. The chassis 20 may include a first section, shown as front portion 906, a second section, shown as transition portion 908, and a third section, shown as rear portion 910. The front portion 906 may correspond to a front portion of the first frame rail 902 and a front portion of the second frame rail 904. The transition portion 908 may correspond to a transition portion of the first frame rail 902 and a transition portion of the second frame rail 904. The rear portion 910 may correspond to a rear portion of the first frame rail 902 and a rear portion of the second frame rail 904. The front portion 906 may define a width, shown as first width 912. The first width 912 may be defined by a distance laterally between an exterior of the front portion of the first frame rail 902 and an exterior of the front portion of the second frame rail 904. The rear portion 910 may define a width, shown as second width 914. The second width 914 may be defined by a distance laterally between an exterior of the rear portion of the first frame rail 902 and an exterior of the rear portion of the second frame rail 904. In one embodiment, the first width 912 is smaller than the second width 914. In such an embodiment, the chassis 20 comprises an inward-offset rail configuration. In another embodiment, the first width 912 is larger than the second width 914. In such an embodiment, the chassis 20 comprises an outward-offset rail configuration. In another embodiment, the first width 912 and the second width 914 are the same. In other embodiments, the chassis 20 has more or less sections.

In one embodiment, the front portion 906 is disposed at the same elevation (e.g., a height off a ground on which the vehicle 10 travels) as the rear portion 910. In another exemplary embodiment, the front portion 906 is disposed at a different elevation than the rear portion 910. In one embodiment, the front portion 906 is disposed lower than the rear portion 910. In another embodiment, the front portion 906 is disposed higher than the rear portion 910.

In one embodiment, the front portions of the frame rails 902, 904 are the same size as the rear portions of the frame rails 902, 904. The front portions of the frame rails 902, 904 may have the same length as the rear portions of the frame rails 902, 904. The front portions of the frame rails 902, 904 may have the same width as the rear portions of the frame rails 902, 904. In another embodiment, the front portions of the frame rails 902, 904 are a different size than the rear portions of the frame rails 902, 904. The front portions of the frame rails 902, 904 may have a different length than the rear portions of the frame rails 902, 904. In one embodiment, the front portions of the frame rails 902, 904 is longer than the rear portions of the frame rails 902, 904. In another embodiment, the front portions of the frame rails 902, 904 is shorter than the rear portions of the frame rails 902, 904.

According to an exemplary embodiment, the transition portion 908 couples the front portion 906 with the rear portion 910. As shown in FIG. 9A, the transition portion 908 extends from a rear side of the front portion 906 to a front side of the rear portion 910. According to an exemplary embodiment, the transition portion 908 is oriented at an angle compared to the front portion 906 and the rear portion 910 (e.g., not parallel to the front portion 906 or the rear portion 910). The transition portion 908 may be any size, shape, or orientation configured to couple the front portion 906 with the rear portion 910. In an exemplary embodiment, the transition portion 908 is oriented at a gradual angle to couple the front portion 906 with the rear portion 910. A gradual angle may be any angle between zero and ninety degrees. A length of the transition portion 908, shown as length 916, may be based, in part, on the angle of orientation. In another embodiment, the transition portion 908 is oriented at a sharper angle. According to an exemplary embodiment, the transition portion 908 is oriented at a ninety-degree angle. The transition portion 908 oriented at a sharper angle may have a shorter length 916 than a transition portion 908 oriented at a more gradual angle. The size, shape, or orientation of the transition portion 908 of the first frame rail 902 may be the same as the size, shape, or orientation of the transition portion 908 of the second frame rail 904. Being the same may mean the transition portion 908 of the first frame rail 902 is mirroring the transition portion 908 of the second frame rail 904. In another embodiment, the size, shape, or orientation of the transition portion 908 of the first frame rail 902 is different from the size, shape, or orientation of the second frame rail 904.

According to an exemplary embodiment, the transition portion 908 supports a front axle 50 of the vehicle 10 and the rear portion 910 supports a rear axle 52. In another embodiment, the front portion 906 supports the front axle 50 and the rear portion supports the rear axle 52. In another embodiment, the rear portion 910 supports the front axle 50 and the rear axle 52. Any portion of the chassis 20 may support any combination of front and rear axles 50, 52.

In another embodiment, the chassis 20 supports an auxiliary axle, shown as auxiliary axle 911. The auxiliary axle 911 may be a pusher axle disposed in front of a front-most drive axle (e.g., a front-most one of the rear axles 52). In other embodiments, the auxiliary axle 911 is a tag axle disposed behind a rear-most drive axle (e.g., a rear-most one of the rear axles 52). The auxiliary axle 911 may be coupled with the chassis 20. The auxiliary axle 911 may be coupled with any portion of the chassis 20. In other embodiments, the auxiliary axle 911 is coupled to an external frame of the vehicle 10. In one embodiment, the external frame is coupled with the chassis 20 such that the auxiliary axle 911 is disposed at a location offset from the chassis 20 (e.g., behind a back end of the chassis 20). In some embodiments, the auxiliary axle 911 may be configured to move between a first position (e.g., a passive position) and a second position (e.g., an active position). When in the first position, the auxiliary axle 911 may be disposed at an elevation such that a wheel and tire assembly 54 coupled with the auxiliary axle 911 does not contact a support surface (e.g., the ground). In the first position, the auxiliary axle 911 may provide no support for the weight of the vehicle 10. When in the second position, the auxiliary axle 911 may be disposed at an elevation such that the wheel and tire assembly 54 coupled with the auxiliary axle 911 does contact a support surface (e.g., the ground). In the second position, the auxiliary axle 911 does provide support for the weight of the vehicle 10.

In some embodiments, the chassis 20 does not have a transition portion 908. The chassis 20 may include only one portion that extends the whole length of the vehicle 10. In other embodiments, the chassis 20 may include a front portion 906 that extends from a front side of the rear portion 910. In another embodiment, the front portion 906 and the rear portion 910 can overlap.

According to another exemplary embodiment, as shown in FIG. 9B, the chassis 20 can include a first frame rail 902, a second frame rail 904, and an extension structure, shown as frame extension 918. The frame extension 918 may comprise a single section or the frame extension 918 may comprise a plurality of sections. In one embodiment, the first frame rail 902 and the second frame rail 904 comprise a rear portion 910 of the chassis 20 and the frame extension 918 comprises a front portion 906 of the chassis 20. In another embodiment, the frame extension 918 comprises the front portion 906 and a transition portion 908 of the chassis 20. In some embodiments, the frame extension 918 is configured to bolt to the frame rails 902, 904 of the chassis 20. As shown in FIG. 9B, the frame extension 918 is configured to fit between the frame rails 902, 904 such that the frame extension 918 can be bolted to an inner surface of each frame rail 902, 904. The frame extension 918 may also be bolted to other portions of the frame rails 902, 904 (e.g., flanges, top, bottom, etc.). In another embodiment, the frame rails 902, 904 fit inside the frame extension 918. In such an embodiment, the frame extension 918 is configured to be bolted to an outer surface of each frame rail 902, 904.

According to an exemplary embodiment, as shown in FIG. 9B, the frame extension 918 defines the transition portion 908 and the front portion 906. The transition portion 908 may be at least partially disposed between the first frame rail 902 and the second frame rail 904. The frame extension 918 may be coupled with the frame rails 902, 904. In some embodiments, the frame extension 918 is bolted to the inside of the frame rails 902, 904. In one embodiment, the transition portion 908 extends forward from the frame rails 902, 904. In another embodiment, the frame extension 918 is a single portion (e.g., does not include both a front portion 906 and a transition portion 908) such that the frame extension 918 is capable of supporting the cab 40. As shown in FIG. 9B, the frame extension 918 starts with a height similar to the height of the frame rails 902, 904. In one embodiment, that height of the frame extension 918 can extend until the front portion 906. In another embodiment, the frame extension 918 can taper downwardly as it extends toward the front portion 906 such that a front of the frame extension 918 is at a lower height than a back of the frame extension 918. In other embodiments, the front of the frame extension 918 defines a height that is greater than the back of the frame extension 918. In another embodiment, at least part of the frame extension 918 has a width similar to the width 914 of the rear portion 910 of the chassis 20 (e.g., the frame extension 918 can couple with both frame rails 902, 904). In another embodiment, the frame extension 918 defines more than one width. In one embodiment, the transition portion 908 of the frame extension 918 has a first width and the front portion 906 has a second width. In another embodiment, the transition portion 908 includes a first width and a second width, and the front portion 906 includes a third width. In such an example, the transition portion 908 starts with a width similar to the width 914 of the rear portion 910 of the chassis 20 and becomes a different width as the frame extension 918 extends away from the rear portion 910 of the chassis 20. The width of the frame extension 918 may increase or decrease as it extends away from the rear portion 910. In one embodiment, the front portion 906 of the frame extension 918 extends in a direction perpendicular to the frame rails 902, 904. In some embodiments, the front portion 906 has a width that is at least twice as wide as the part of the transition portion 908 that couples with the front portion 906.

According to an exemplary embodiment, as shown in FIGS. 10-12, a cab 40 of a vehicle 10 includes a tunnel, shown as tunnel 1002. The tunnel 1002 protrudes into a cab interior 42 and extends longitudinally along the cab 40 (e.g., in a direction substantially parallel to the frame rails 902, 904). The tunnel 1002 may be a recess defined by the body of the cab 40 that is configured to receive at least part of the chassis 20. In some embodiments, the cab 40 is supported by at least the front portion 906 of the chassis 20. In some embodiments, the front portion 906 of the chassis 20 is disposed within the tunnel 1002 and supports the chassis 20 via the tunnel 1002. In other embodiments, the front portion 906 of the chassis 20 is wider than the tunnel 1002 such that front portion 906 does not fit in the tunnel 1002. In such an embodiment, the bottom of the cab 40 rests on top of the front portion 906 of the chassis 20. In such an embodiment, a transition portion 908 of the chassis 20 may be configured to be disposed, at least partially, within the tunnel 1002 and couple with a front portion 906 that is disposed below the tunnel 1002. The tunnel 1002 may extend a full length of the cab 40 or may extend only part of the length of the cab 40. The tunnel 1002 may divide the cab interior 42 into sides, shown as first side 1004 and second side 1006. Both the first side 1004 and the second side 1006 may be configured to provide an operator of the vehicle 10 with room, comfort, and accessibility to operate the vehicle 10. The sides 1004, 1006 may be configured the same or they may be configured differently.

According to an exemplary embodiment, a width 1008 of the tunnel 1002 is based, at least in part, on the width 912 of the front portion 906 of the chassis 20. For example, the lateral width 1008 of the tunnel 1002 is greater than the width 912 defined laterally between exteriors of the first frame rail 902 and the second frame 904 rail at the front portion 906 of the chassis 20. This arrangement enables the front portion 906 of the chassis 20 to be at least partially received within the tunnel 1002, which efficiently supports the cab 40 on the chassis 20 and enables the cab 40 to define a smaller lateral width when compared due to conventional cab designs. The tunnel 1002 may have a width 1008 large enough to fit the front portion of the first frame rail 902 and the front portion of the second frame rail 904 within the tunnel 1002. The smaller the width 912, the smaller the width 1008 of the tunnel 1002 may be. In another embodiment, the width 1008 is smaller than the width 914 of the rear portion 910 of the chassis 20. In such an embodiment, the width 912 of the front portion 906 is smaller than the width 914 of the rear portion 910. The width 1008 of the tunnel 1002 may be configured to accommodate the front portion 906 and not the rear portion 910.

In another embodiment, a width 1008 of the tunnel is based, at least in part, on the width of a transition portion 908 of a frame extension 918. The frame extension 918 may extend within the tunnel 1002 such that the front portion 906 is disposed either within the tunnel 1002 or below the cab 40 so as to support at least a front portion of the cab 40.

As shown in FIGS. 10-12, each side 1004, 1006 of the cab 40 includes a seat 1010 for an operator, according to an exemplary embodiment. In other embodiments, only one side of the cab 40 includes a seat 1010. The seat 1010 includes a back portion, shown as back rest 1020, and a bottom portion or cushion, shown as seat support 1022. In one embodiment, a location of the seat 1010 is based, at least in part, on the width 1008 of the tunnel 1002. The smaller the width 1008 of the tunnel 1002, the closer to the center of the cab 40 the seat 1010 may be. In other words, the smaller the width 1008 of the tunnel 1002, the closer a first seat 1010 may be laterally to a second seat 1010. According to an exemplary embodiment, a distance 1012 between a centerline of a first seat 1010 and a centerline of a second seat 1010 is less than or equal to about 45 inches. In one embodiment, the cab 40 includes a display 1018 fixed to a front console (e.g., dashboard) of the cab 40. The first seat 1010 and the second seat 1010 can be disposed such that an operator in both seats 1010 can access the display. The display 1018 may include input devices (e.g., buttons, switches, levers, pedals, etc.) or output devices (e.g., lights, gauges, speakers, etc.), or any combination thereof, that aid in the operation of the vehicle 10. The display 1018 may be configured to be accessible by an operator on either side 1004, 1006 of the cab 40 without having to move at all (e.g., all components are stationary), or with only moving slightly (e.g., swivel, tilt, etc.). In other embodiments, the cab 40 includes separate displays 1018 for each side 1004, 1006 of the cab 40.

According to an exemplary embodiment, the location of the seat 1010 provides adequate clearance, shown as clearance 1024, for an operator. In one embodiment, the location of the seat provides a shoulder clearance measured from a centerline of the seat 1010 to an inner surface of a door 1404 of the cab 40, or a component thereof (e.g., a window, a handle, an armrest), of greater than or equal to about 18 inches or greater than or equal to about 18.5 inches. In another embodiment, the location of the seat 1010 provides an elbow clearance measured from the centerline of the seat 1010 to an inner surface of a door 1404 of the cab 40 of greater than or equal to about 15 inches or greater than or equal to about 15.5 inches. In one embodiment, a window on a door of the cab 40 is positioned rearward to provide additional shoulder or elbow clearance.

The body of the cab 40 defines a front width 1014 and a rear width 1016. In general, the lateral widths 1014, 1016 defined by the cab 40 are smaller than convention cab designs, which enables the cab 40 to provide better visibility for an operator within the cab interior 42. In some embodiments, the widths 1014, 1016 may be measured from an exterior of a first side of the cab 40 to an exterior of a second side of the cab 40. In some embodiments, the front width 1014 is smaller than the back width 1016. In some embodiments, the front width 1014 is a maximum of about 80 inches. For example, the front width 1014 may be less than or equal to about 80 inches. In some embodiments, the rear width 1016 is maximum of about 86 inches. For example, the rear width may be less than or equal to about 86 inches.

According to an exemplary embodiment, as shown in FIG. 12, a height 1102 of the tunnel 1002 is based, at least in part, on a height 1108 of a top of the front portion 906 of the chassis 20. For example, the height 1102 of the tunnel 1002 may be defined between a bottom surface 1104 of the cab 40 and an uppermost surface or top 1106 of the tunnel 1002. In some embodiments, the height 1108 of the front portion 906 of the chassis 20 may be different than the height of the rear portion 910 of the chassis 20. According to an exemplary embodiment, a portion of the tunnel 1002 rests on top of the front portion 906 of the chassis 20. The portion of the tunnel 1002 may directly contact the chassis 20. Direct contact may include the tunnel 1002 directly contacting the chassis 20 without any other material separating the tunnel 1002 from the chassis 20. Direct contact may also include other material or small devices that are disposed between the tunnel 1002 and the chassis (e.g., padding, fasteners, supportive devices, etc.). In other embodiments, the chassis 20 contacts the tunnel 1002 indirectly. Indirect contact may include having a larger obstruction or piece of equipment disposed between the chassis 20 and the tunnel 1002 (e.g., an engine disposed in the tunnel 1002, etc.).

In some embodiments, a clearance distance 1110 is defined between the bottom surface 1104 of the cab 40 and a ground 1112. The clearance distance 1110 may have a minimum distance specified by industry standard. According to an embodiment, the industry standard for the clearance distance 1110 is 13 inches above the ground 1112 and the height 1108 of the top of the front portion 906 of the chassis 20 is about 35 inches. In such an embodiment, the height 1102 of the tunnel 1002 is about 22 inches.

In another embodiment, the height 1102 of the tunnel 1002 is based, at least on part, on a height of a top of the frame extension 918. The frame extension 918 may be disposed within the tunnel 1002 such that the height 1102 of the tunnel 1002 accommodates the height of the frame extension 918. The height of the frame extension 918 may vary so the height 1102 of the tunnel 1002 may vary accordingly.

According to an exemplary embodiment, the top 1106 of the tunnel 1002 is lower than a top of the seat support 1022 (e.g., closer to the ground 1112). In some embodiments, the top 1106 of the tunnel 1002 is lower than the entire seat support 1022. In such an embodiment, the seat 1010 may be positioned such that part of the seat support 1022 is disposed over the tunnel 1002. Similarly, an arm or shoulder of an operator sitting in the seat 1010 may be disposed above the tunnel 1002 since there is no obstruction preventing such arrangement. In general, arranging the uppermost surface or top 1106 of the tunnel 1002 below the seat supports 1022 enables the cab 40 to define a reduced lateral width (e.g., the front width 1014 and the rear width 1016), when compared to convention cab designs, because the seats 1010 are positioned laterally closer to one another (e.g., the distance 1012 is reduced when compared to convention cab designs).

According to an exemplary embodiment, as shown in FIG. 13, a rear of the cab 40 is supported by an external support structure, shown as support arm 1201. Supporting the rear of the cab 40 with the support arm 1201 allows the cab 40 to extend over other elements of the vehicle 10 (e.g., a wheel and tire assembly 54) The support arm 1201 may be a part of the cab 40 or may be coupled to the cab 40. The support arm 1201 may extend from the cab 40 at any location such that an end of the support arm 1201 contacts a support point, shown as pad 1202. Pad 1202 may include cushioning devices (e.g., suspension devices) configured to reduce the impact of any forces felt by the vehicle 10. Pad 1202 may include receiving devices (e.g., notches, holes, rails, etc.) configured to keep the support arm 1201 in a desired location. In some embodiments, the pad 1202 is coupled to the chassis 20. In some embodiments, the pad 1202 is coupled with a side of the chassis 20. In other embodiments, the pad 1202 is coupled with a top of the chassis 20. The pad 1202 is configured to receive the end of the support arm 1201 and keep the cab 40 at a desired orientation. In some embodiments, a first support arm 1201 extends from the cab 40 and contacts a first pad 1202 coupled with a first frame rail 902 of the chassis 20 and a second support arm 1201 extends from the cab 40 and contacts a second pad 1202 coupled with a second frame rail 904. In another embodiment, a support arm 1201 extends from the cab 40 and splits into two support arms 1201, each configured to contact a different frame rail 902, 904. In another embodiment, a support arm 1201 extends from the cab 40 and contacts a pad 1202 disposed between the two frame rails 902, 904. The pad 1202 may extend between the first frame rail 902 and the second frame rail 904 such that the support arm 1201 contacts the pad 1202 at a location between the first frame rail 902 and the second frame rail 904. The support arm 1201 may also be configured to contact a portion of the frame extension instead of, or along with, the frame rails 902. 904.

According to an exemplary embodiment, the cab 40 is supported by the chassis 20 via the tunnel 1002. In one embodiment, an entire length of the tunnel 1002 rests upon the front portion 906 of the chassis 20. In another embodiment, a portion of the tunnel 1002 rests upon a front portion 906 of the chassis 20. The portion of the tunnel 1002 may be a front portion. A rear portion of the tunnel 1002 may be supported by the support arm 1201. In another embodiment, the cab 40 is supported by the frame extension 918 of the chassis 20. The frame extension 918 may support the cab 40 via the tunnel 1002. In one embodiment, the front portion 906 of the frame extension 918 is disposed within the tunnel 1002 such that at least the front of the tunnel 1002 is supported by the frame extension 918. In another embodiment, the front portion 906 of the frame extension 918 is wider than the tunnel 1002 and is disposed below the tunnel 1002 such that the bottom of the cab 40 rests on, and is supported by, the front portion 906 of the frame extension 918.

According to an exemplary embodiment, as shown in FIG. 13, the first side 1004 of the cab 40 is configured to accommodate an operator in a seated position. In such an embodiment, the seat support 1022 of the seat 1010 is substantially horizontal such that a person sitting on the seat 1010 does not need additional support to remain on the seat 1010 (e.g., feet do not need to be on the floor to keep the person in the seat). In some embodiments, the second side 1006 is configured to accommodate an operator in a seated position. In some embodiments, the first side 1004 is configured to accommodate an operator in a seated position and the second side 1006 is configured to accommodate an operator in a non-seated or standing position (see, e.g., FIG. 11).

In some embodiment, the first side 1004 includes a multi-step entry. The multi-step entry may include a plurality of steps. For example, the multi-step entry may include a first step 1203 and a second step 1204. A first step height 1206 may be defined by a distance between the ground 1112 and the first step 1203. A second step height 1208 may be defined by a distance between the first step 1203 and the second step 1204. According to an exemplary embodiment, the first step height 1206 is substantially equal the second step height 1208 (e.g., +/−0.5 inches). The approximately equal distance between both the ground 1112 and the first step 1203, and between the first step 1203 and the second step 1204 provides an ergonomically efficient entry for an operator entering the first side 1004 of the cab 40. In one embodiment, the first step height 1206 is about 15 inches and the second step height 1208 is about 15 inches. In other embodiments, the sides 1004, 1006 are configured for a seated position with a single-step entry.

In one embodiment, the second step 1204 extends throughout at least a portion of the cab 40 to define a floor 1212. A person entering the cab 40 may stand on the floor 1212 or may rest their feet on the floor 1212 when in a seated position. When in a seated configuration, a pedal 1210 for controlling a subsystem of the vehicle 10 (e.g., gas pedal, brake, clutch, etc.) is disposed above the floor 1212 at a location where a user can use their foot to actuate the pedal 1210. According to an exemplary embodiment, the second step 1204 is disposed at an height that is below the top of the front portion 906 of the chassis 20, and is therefore below the top 1106 of the tunnel 1002. In one embodiment, a height 1214 of the floor 1212 is approximately 30 inches measured above the ground 1112. The height 1214 of the floor 1212, and all of the heights described herein relative to the ground 1112, may be measured in an unloaded bare chassis condition.

Figure 14:
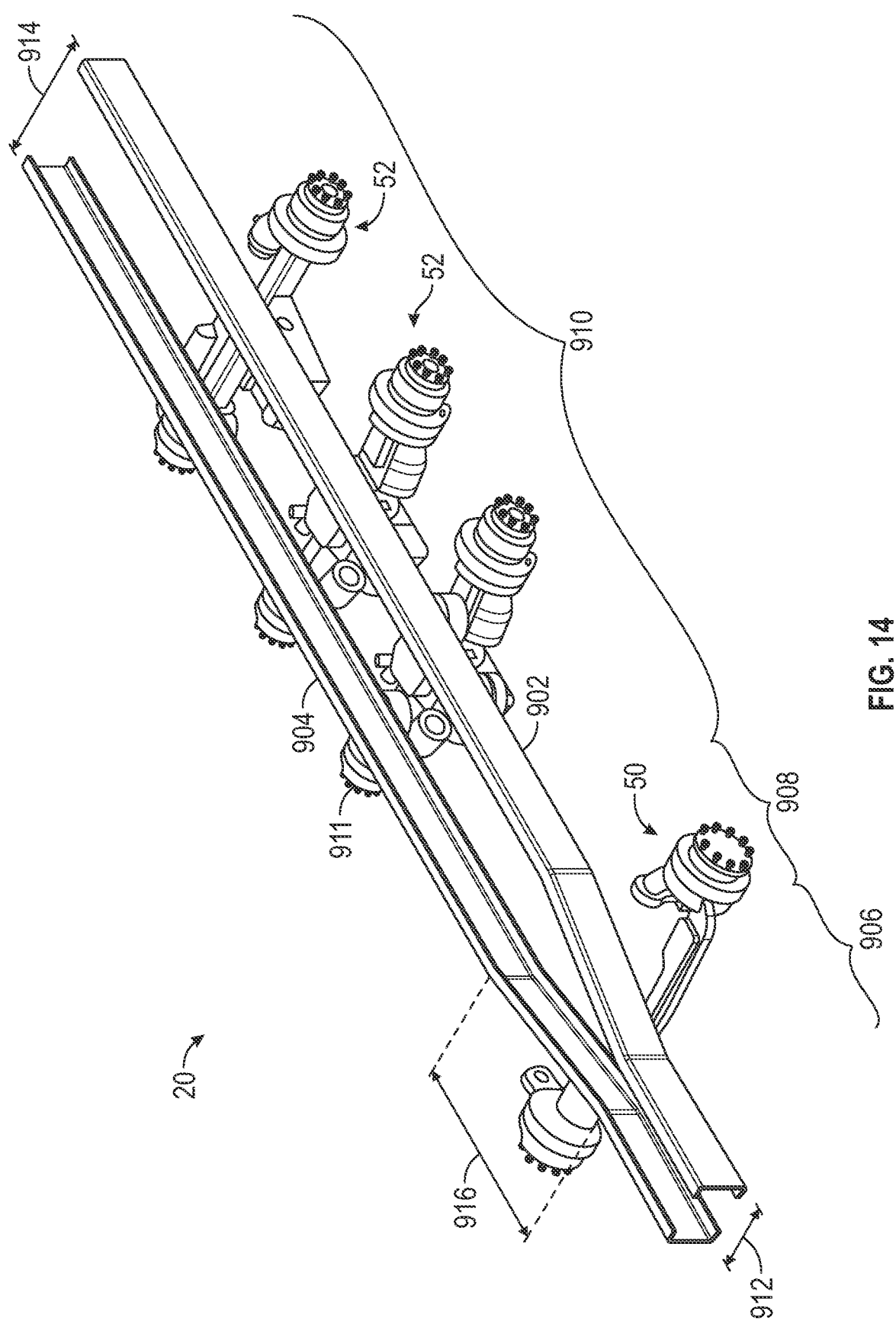
FIG. 14 is a perspective view of a chassis of the vehicle of FIG. 1, according to an exemplary embodiment.

According to another exemplary embodiment, as shown in FIG. 14, the second side 1006 of the cab 40 is configured to accommodate an operator in a non-seated or standing configuration. In such an embodiment, the seat support 1022 of the seat 1010 on the second side 1006 is oriented at an angle such that a person can be in a more upright position (e.g., not arranged parallel to the ground 1112). The standing configuration may include the person supporting themselves with their feet on the floor 1212 of the cab 40. In some embodiments, the first side 1004 is configured to accommodate an operator in a non-seated position. In other embodiments, neither side 1004, 1006 is configured to accommodate an operator in a non-seated position. In other embodiments, both sides 1004, 1006 are configured to accommodate an operator in a non-seated position.

According to an exemplary embodiment, the second side 1006 configured for a non-seated position includes a single-step entry. In one embodiment, the single-step entry includes the first step 1203 and not the second step 1204. The height 1206 of the first step 1203 may be defined by the distance between the ground 1112 and the first step 1203. In one embodiment, the first step 1203 extends throughout at least a portion of the cab 40 to define the floor 1212. In such an embodiment, the height 1206 is the same as the floor height 1214. When in a non-seated configuration, a pedal 1210 for controlling a subsystem of the vehicle 10 (e.g., gas pedal, brake, clutch, etc.) is disposed above the floor 1212 at a location where a user can use their foot to actuate the pedal 1210. According to an exemplary embodiment, the first step 1203 is disposed at an height below the top of the front portion 906 of the chassis 20, and therefore is below the top 1106 of the tunnel 1002. In one embodiment, the floor height 1214 is approximately 15 inches measured from the ground 1112. In other embodiments, the second side 1006 includes a multi-step entry.

According to an exemplary embodiment, the bottom of the cab 40 includes a plurality of sections. In one embodiment, the bottom surface 1104 of the cab 40 includes two sections, shown as flat portion 1302 and angled portion

1304. The flat portion 1302 includes the area used as the floor 1212 or the first step 1203. The flat portion 1302 is substantially planar such that it provides a flat surface for an operator to stand on to enter the cab 40. In some embodiments, the angled portion 1304 is in front of the flat portion 1302 (e.g., closer to a grill, a front bumper, or a headlight of the cab 40). In some embodiments, the angled portion 1304 is oriented at an acute angle with respect to the flat portion 1302. In some embodiments, the angled portion 1304 has an angle of approach, shown as angle 1306. The angle 1306 may be approximately 15 degrees.

In some embodiments, the cab 40 includes an overhang, shown as front overhang 1308. The front overhang 1308 may be measured from a front axle 50 to a bumper, shown as front bumper 1310. In one embodiment, the front overhang 1308 is less than or equal to about 74 inches.

In some embodiments, the seat configuration of the cab 40 can switch between a seated configuration (FIG. 13) and a non-seated configuration (FIG. 14). A plurality of systems or components may move in order to switch between a seated and a non-seated configuration. In some embodiments, the seat 1010, the second step 1204, and the pedal 1210 are reconfigured or moved to accommodate a different configuration. For example, the seat support 1022 may pivot between a substantially horizontal orientation (e.g., approximately parallel to the ground 1112) and a sloped orientation (e.g., not parallel to the ground 1112 where a front of the seat support 1022 is arranged closer to the floor 1212). In one embodiment, the seat 1010 can include a mechanism (e.g., button, lever, switch, etc.), or a combination of mechanisms, that allow a user to manually change the orientation of the seat 1010. Changing the orientation of the seat may include moving portions of the seat 1010 (e.g., tilting the seat support 1022 to be oriented at an angle) or removing or replacing elements of the seat 1010 (e.g., taking off or replacing seat cushions). In another embodiment, the cab 40 can include an automatic mechanism that automatically changes the orientation of the seat 1010 based on an input from a user. In one embodiment, the automatic mechanism includes storing user preferences in a computer system such that the seat can automatically reorient itself to a predefined position based on an input from the user (e.g., the user pushes a button and the seat 1010 moves to a preferred sloping angle previously defined by the user). When switching between a seated configuration and a non-seated configuration, all components of the seat 1010 may be adjustable (e.g., the back rest 1020, the seat support 1022, an armrest, a head rest, etc.). Components of the cab 40 that are not a part of the seat 1010 may also be adjustable (e.g., the steering wheel, pedals, controls, etc.).

According to an exemplary embodiment, to switch between a seated configuration and a non-seated configuration, the second step 1204 may move between an active position and a collapsed position. In the active position, the second step 1204 provides a floor 1212 for the cab 40. The floor 1212 is configured to support the weight of the user at an height above the first step 1203, wherein the height is more than just a thickness of the material of the second step 1204. In such an embodiment, the pedal 1210 for controlling the vehicle 10 is disposed above the second step 1204. In the collapsed position, the second step 1204 is removed from the cab 40 such that the first step 1203 provides the floor 1212 for the cab 40. In one embodiment, removing the second step 1204 from the cab 40 includes taking the physical step out of the vehicle 10. In another embodiment, removing the second step 1204 from the cab 40 includes swinging the second step 1204 from a horizontal position to a vertical position such that an operator can no longer step on the second step 1204. In another embodiment, removing the second step 1204 includes collapsing the second step 1204 such that it sits flat on top of the first step 1203.

According to an exemplary embodiment, to switch between a seated configuration and a non-seated configuration, the pedal 1210 may move between a lower position and a higher position. The pedal 1210 may be in the higher position when in the seated configuration. The pedal 1210 may be in the higher position when the second step 1204 is in the active position. The pedal 1210 may be in the lower position when in the non-seated position. The pedal 1210 may be in the lower position when the second step 1204 is in the collapsed position. In another exemplary embodiment, a cab 40 may include a plurality of pedals 1210. For example, a first pedal 1210 may be configured to be used when in the seated configuration and a second pedal 1210 may be configured to be used when in the non-seated configuration.

In general, either side 1004, 1006 of the cab 40 may define the seated position/configuration or the non-seated position/configuration. Regardless of the seat configuration, the seat 1010 can be adjusted and moved to increase comfort of an operator. In some embodiments, the seat 1010 can slide longitudinally (e.g., forward and backward) to provide more or less distance between the seat 1010 and the front of the cab 40. In one embodiment, the seat 1010 can slide between about 8 inches and about 9 inches, or about 8.7 inches. In other embodiments, the seat 1010 includes a vertical suspension (e.g., can travel up and down when on uneven roads, etc.). In some embodiments, the seat 1010 has a vertical suspension travel of about 6 inches. In other embodiments, the seat 1010 can recline (e.g., an angle of the back rest 1020 can change). In some embodiments, the seat 1010 can recline about 13 degrees.

Figure 15:
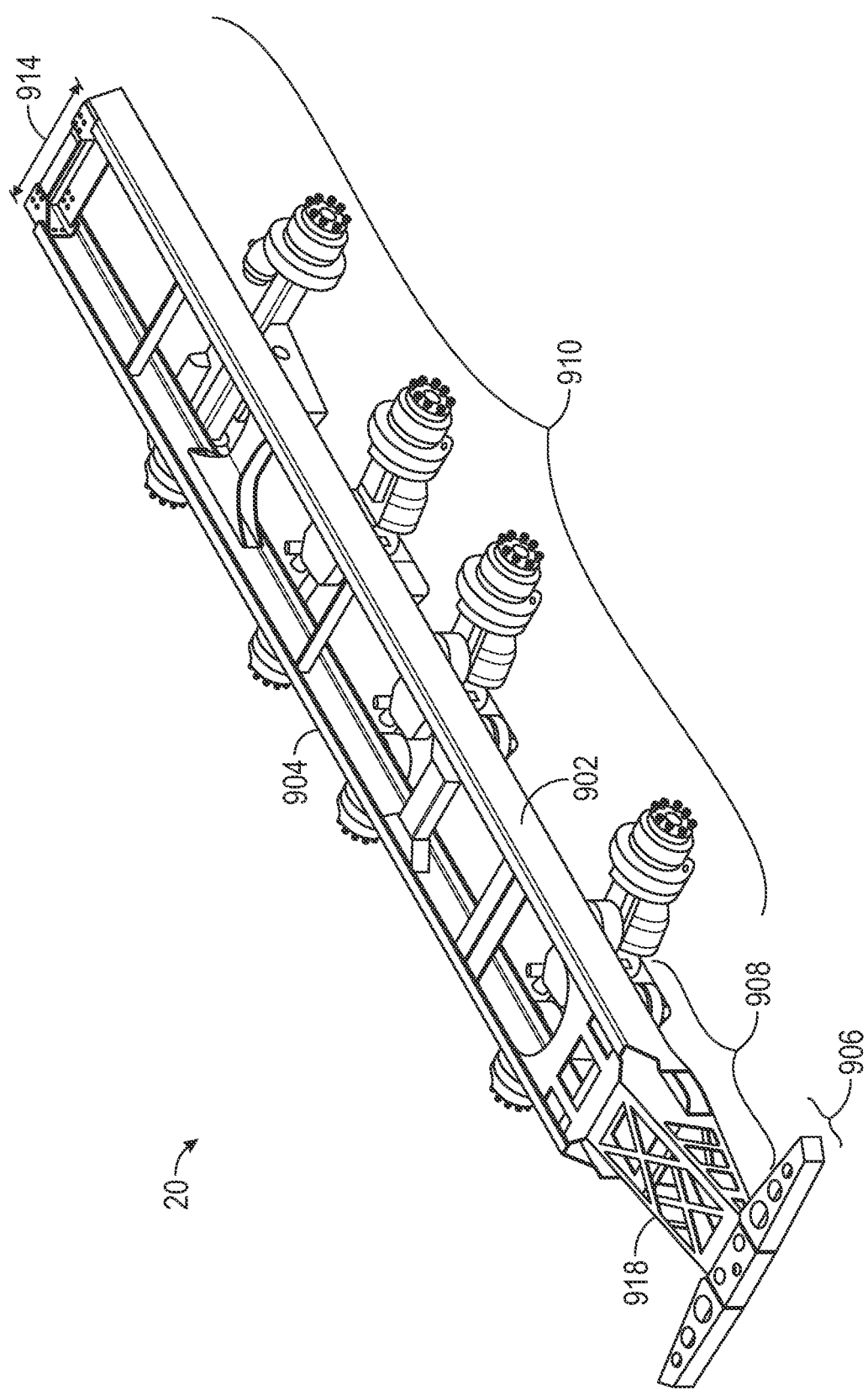
FIG. 15 is a perspective view of a chassis of the vehicle of FIG. 1, according to an exemplary embodiment.
Figure 16:
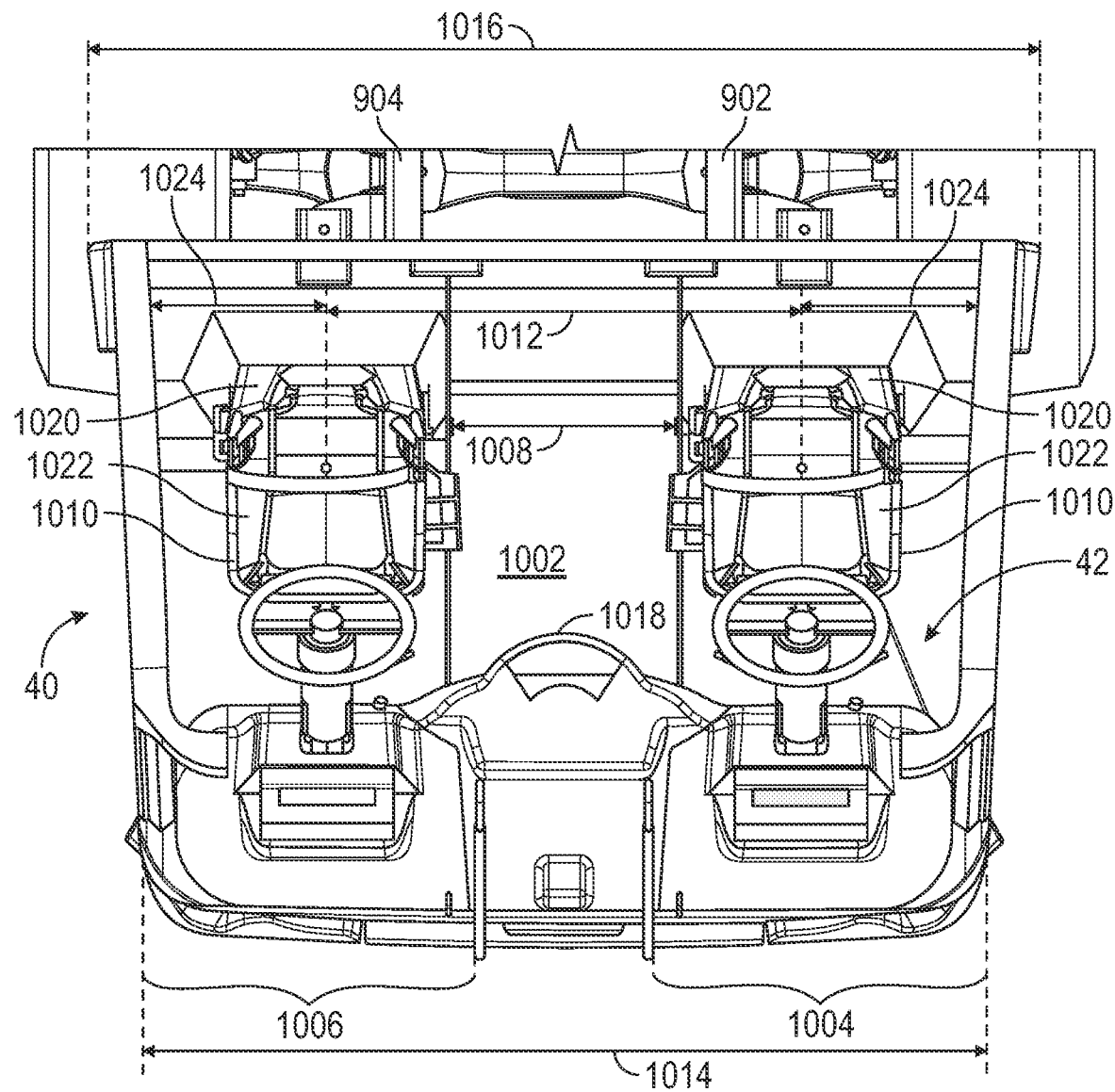
FIG. 16 is a top view of an interior of a cab of the vehicle of FIG. 1, according to an exemplary embodiment.
Figure 17:
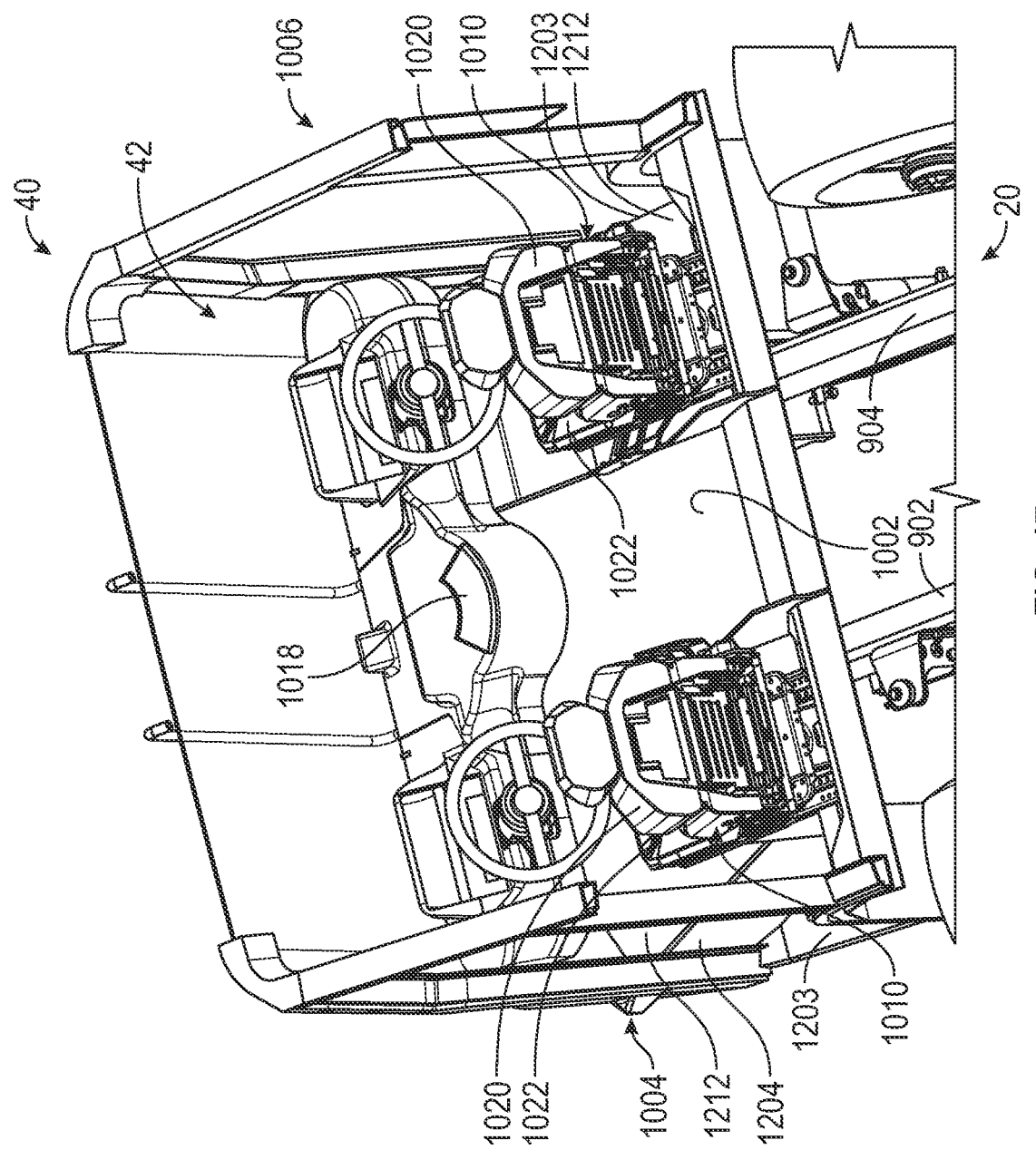
FIG. 17 is a perspective view of the interior of the cab of FIG. 16.
Figure 18:
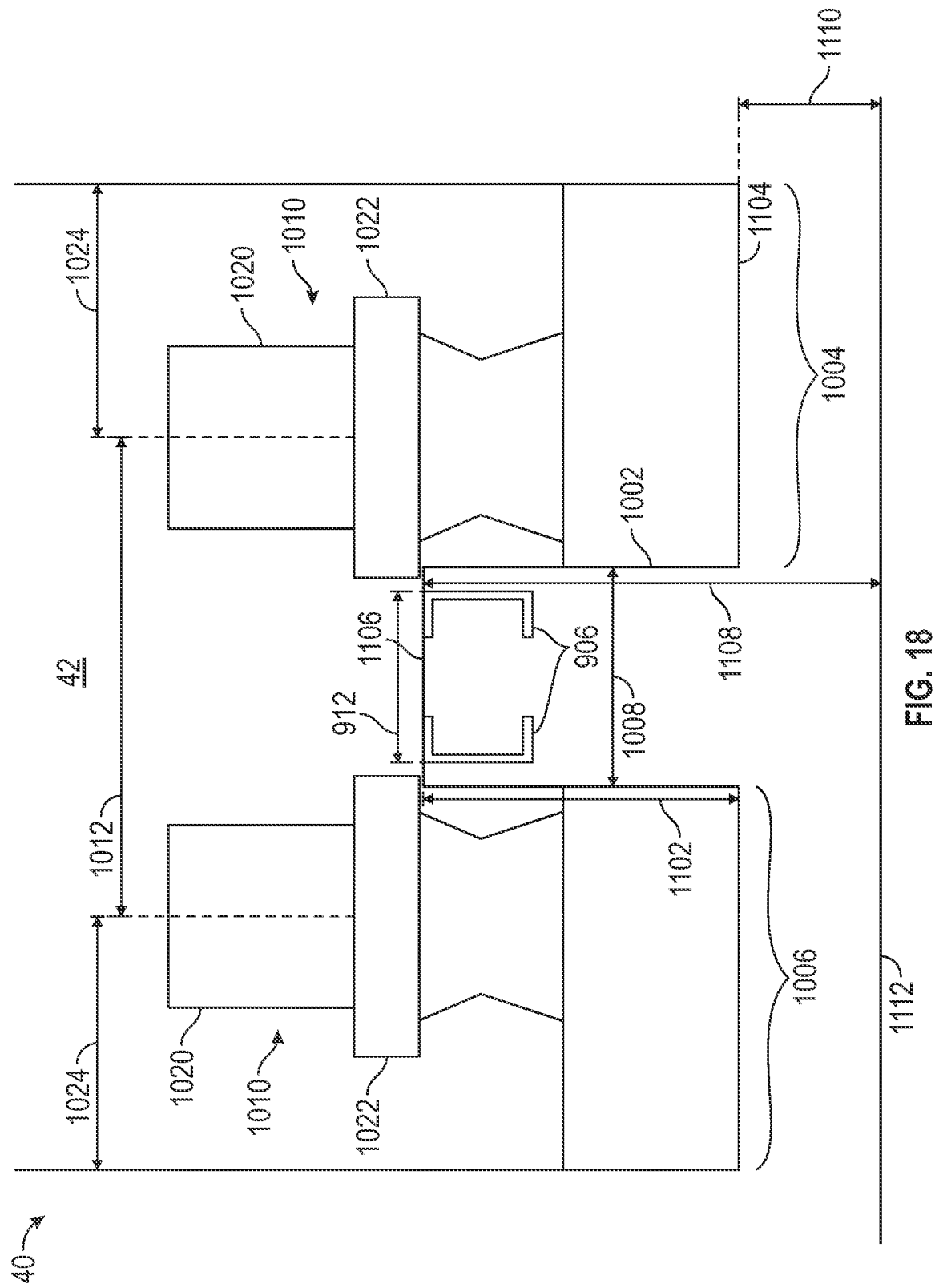
FIG. 18 is a cross-sectional view of the interior of the cab of the vehicle of FIG. 1, according to an exemplary embodiment.
Figure 19:
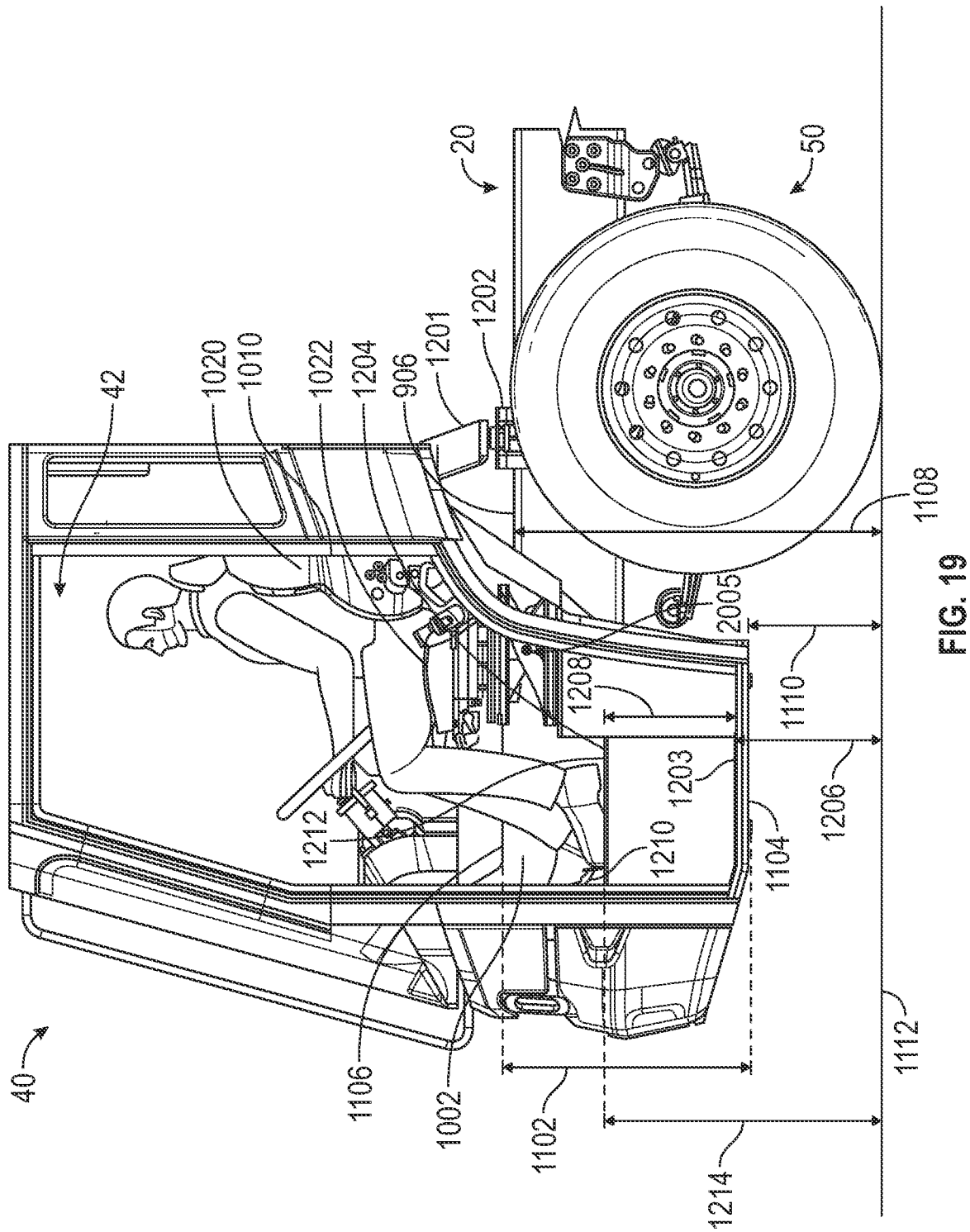
FIG. 19 is a side view of the interior of the cab of the vehicle of FIG. 16, according to an exemplary embodiment.

According to an exemplary embodiment, as shown in FIG. 15, the cab 40 includes at least one side 1402. The side 1402 may include at least one door, shown as door 1404. In one embodiment, the door 1404, or a portion thereof, may be formed via a stamping process. In other embodiments, the door 1404 may be formed by other processes (e.g., molded, pressed, etc.). The door 1404 facilitates selective access to the cab interior 42 from outside of the vehicle 10. In some embodiments, the door 1404 comprises the entire side of the cab 40. In other embodiments, the side 1402 comprises a plurality of sections. According to an exemplary embodiment, the side 1402 includes a first portion (the door 1404) and a second portion, shown as wall 1406. In an exemplary embodiment, the door 1404 comprises a majority of the surface area defined by the side 1402. In other embodiments, the door 1404 comprises no more than half of the surface area of the side 1402.

The door 1404 may be configured to move between an open position and a closed position. In some embodiments, the door 1404 moves by rotating about a vertical axis, shown as axis 1408. The axis 1408 may be coupled with a front edge of the door 1404 or a back edge of the door 1404. In some embodiments, the door 1404 swings inward to open the cab 40. In other embodiments, the door 1404 swings outward to open the cab 40. When rotating about an axis, the door 1404 may use piano hinges that are coupled to an edge of the door 1404. The piano hinges may be forward or backward hinges. In other embodiments, the door 1404 uses other hinges. In other embodiments, the door 1404 moves by rotating about a different axis (e.g., horizontal, 45 degree, etc.). In other embodiments, the door 1404 moves by being removed from the cab 40 and replaced back onto the cab 40. In other embodiments, the door 1404 moves by sliding along a rail or track.

In some embodiments, the wall 1406 is stationary. The wall 1406 may provide a seal with the door 1404 when in the closed position. In other embodiments, the wall 1406 is not stationary. The wall 1406 may be configured to move between an open position and a closed position. In some embodiments, the wall 1406 moves similarly to the door 1404 (e.g., if the door 1404 rotates about an axis, the wall 1406 rotates about an axis). In other embodiments, the wall 1406 moves different than the door 1404 (e.g., if the door 1404 rotates, the wall 1406 slides). In some embodiments, movement of the wall 1406 is independent from the movement of the door 1404. In other embodiments, movement of the wall 1406 is dependent on movement of the door 1404 (e.g., the door 1404 must open before the wall 1406 can open). In other embodiments, movement of the door 1404 is dependent on movement of the wall 1406.

In some embodiments, the door 1404 has a width, shown as door width 1410. The door 1404 may have a plurality of widths. In one embodiment, the door width 1410 refers to the widest part of the door 1404. In some embodiments, the door width 1410 may be less than or equal to 36 inches wide. In some embodiments, the door 1404 is one continuous portion. In other embodiments, the door 1404 has a plurality of portions. According to an exemplary embodiment, the door 1404 has a first portion, shown as top portion 1412, and a second portion, shown as bottom portion 1414. In some embodiments, the top portion 1412 is taller than the bottom portion 1414. In other embodiments, the top portion 1412 is shorter than the bottom portion 1414. In other embodiments, the top portion 1412 has the same height as the bottom portion 1414. In other embodiments, the plurality of portions are arranged differently (e.g., side by side).

According to an exemplary embodiment, the top portion 1412 includes at least one window 1416. The at least one window 1416 may be thinner than other components of the door 1404 (e.g., door frame, armrest, etc.) such that the window 1416 provides more room in the cab interior 42 than the other components of the door 1404 (e.g., more clearance room for the operator next to the window 1416 than next to the door frame).

In some embodiments, a majority of a surface area of the top portion 1412 is comprised of the at least one window 1416. In one embodiment, the whole top portion 1412 comprises at least one window 1416. In such an embodiment, the top portion 1412 may include a perimeter 1418. In some embodiments, the perimeter 1418 is as thin as an inch wide. In other embodiments, the perimeter 1418 is thicker than an inch. In other embodiments, the perimeter 1418 is thinner than an inch. In other embodiments, a majority of the surface area of the top portion 1412 does not comprise a window 1416 (e.g., solid wall). In another embodiment, the top portion 1412 includes a plurality of windows 1416. At least one of the plurality of windows 1416 may be configured to open and close based on operator input. The input may be electronic (e.g., the window 1416 is electrically controlled by a switch) or manual (e.g., the window 1416 is manually controlled by a handle). In other embodiments, none of the plurality of windows 1416 are configured to open and close.

In some embodiments, each of the plurality of windows 1416 may have a perimeter 1418. Each perimeter 1418 may be a different thickness. In other embodiments, each perimeter 1418 is the same thickness. In some embodiments, a window 1416 is positioned rearward on the door 1404 to provide extra clearance (e.g., elbow and shoulder clearance) for the operator. The window 1416 positioned rearward on the door 1404 may also provide better visibility for an operator.

According to an exemplary embodiment, the bottom portion 1414 of the door 1404 includes at least one window 1416. In some embodiments, a majority of a surface area of the bottom portion 1414 is comprised of the at least one window 1416. In one embodiment, the whole bottom portion 1414 is comprised of the at least one window 1416. In such an embodiment, the bottom portion 1414 may include a perimeter 1418. In other embodiments, a majority of the surface area of the bottom portion 1414 does not comprise a window 1416. In other embodiments, the bottom portion 1414 includes no windows 1416.

In some embodiments, the wall 1406 includes at least one cab window 1417. In some embodiments, a majority of a surface area of the wall 1406 is comprised of the at least one cab window 1417. In one embodiment, the whole wall 1406 is comprised of the at least one cab window 1417. In such an embodiment, the wall 1406 may include a perimeter 1418. In other embodiments, a majority of the surface area of the wall 1406 does not comprise a cab window 1417. In other embodiments, the wall 1406 includes no cab windows 1417.

In some embodiments, the door 1404 includes an opening mechanism, shown as opening mechanism 1420. The opening mechanism 1420 may be any mechanism configured to keep the door 1404 in a closed position when activated, and release the door 1404 from the closed position when deactivated. Activation and deactivation of the opening mechanism 1420 can apply to either keeping the door 1404 in the closed position or releasing the door 1404 to move into an open position. In one embodiment, the opening mechanism 1420 is a handle. In other embodiments, the opening mechanism can be a lever, a button, a switch, a toggle, a latch, a knob, a handle, etc. In some embodiments, the opening mechanism 1420 is disposed on the top portion 1412 of the door 1404. In another embodiment, the opening mechanism 1420 is disposed on the bottom portion 1414 of the door 1404. In another embodiment, the opening mechanism 1420 is disposed on the wall 1406. The opening mechanism 1420 may be placed anywhere on the side 1402 of the cab 40 such that it controls the movement of the door 1404 between the open position and the closed position.

Figure 20:
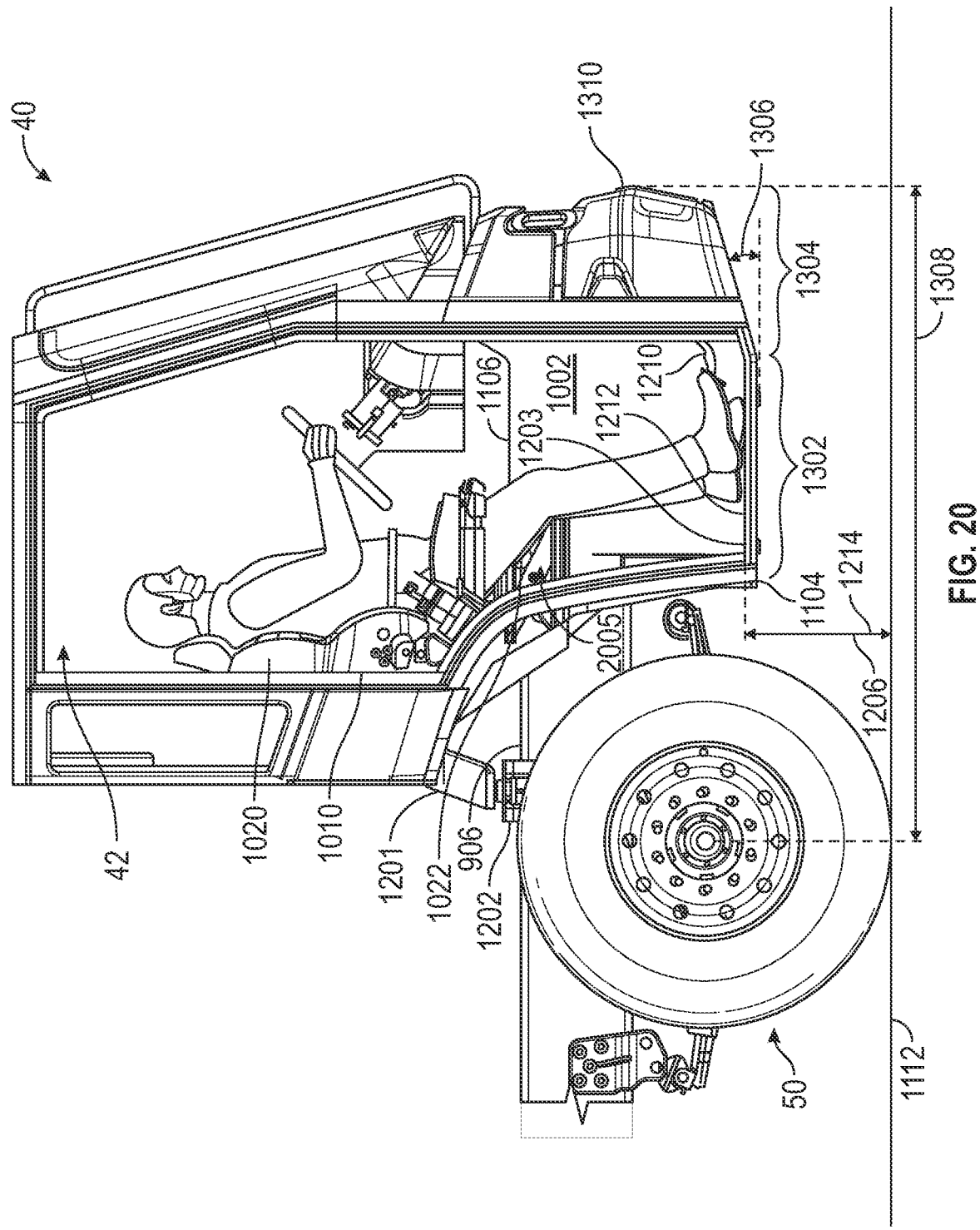
FIG. 20 is a side view of the interior of the cab of the vehicle of FIG. 16, according to an exemplary embodiment.
Figure 21:
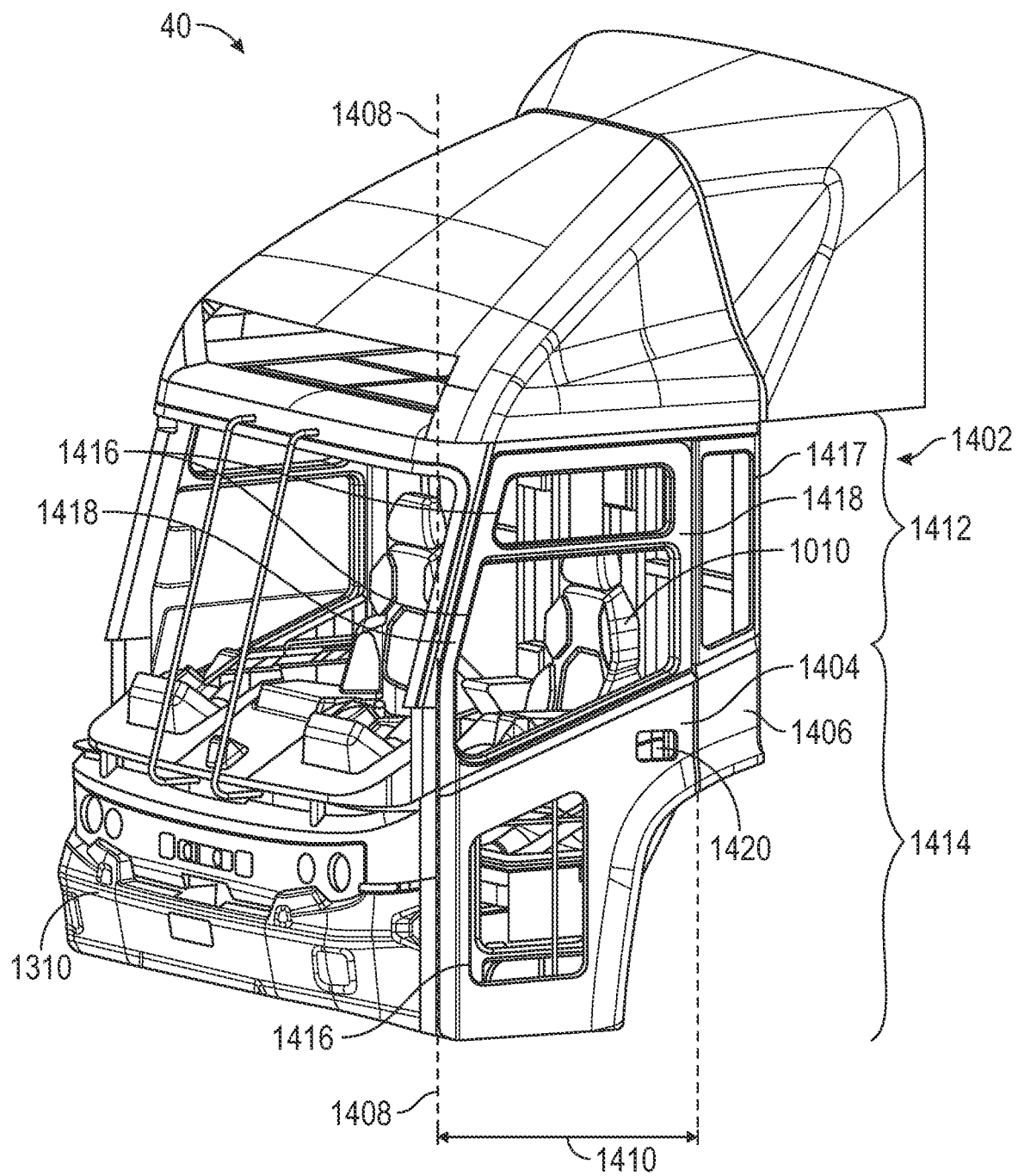
FIG. 21 is a perspective view of the cab of the vehicle of FIG. 1, according to an exemplary embodiment.

According to an exemplary embodiment, as shown in FIG. 20, the cab 40 includes a grab bar 2001. The grab bar 2001 may be made of any suitable material including, but not limited to, rubber, plastic, metal, or a combination thereof. For example, the grab bar 2001 may form a metal core with a rubber exterior to facilitate the ability of a user to grip the grab bar 2001.

In some embodiments, the grab bar 2001 may be coupled to and arranged within a portion (e.g., coupled to an interior wall) of the cab interior 42 of the cab 40. For example, as shown in FIG. 20, the grab bar 2001 may be positioned to the left, or laterally outwardly, of the seat support 1022 on the first side 1004. In some embodiments, the grab bar 2001 is positioned to the right, or laterally outwardly, of the seat support 1022 on the second side 1006. In some embodiments, the grab bar 2001 may be positioned on the right side, or laterally inwardly, of the seat support 1022 on the first side 1004. In some embodiments, the grab bar 2001 may be positioned on the left side, or laterally inwardly, of seat support 1022 on the second side 1006. It should be appreciated that the grab bar 2001 may be positioned in duplicative or alternative form including, but not limited to, any of the arrangements described herein. For example, the cab 40 may include a grab bar 2001 positioned laterally outwardly relative to both the seat support 1022 on the first side 1004 and the seat support 1022 on the second side 1006, so that an operator entering either side of the cab interior 42 may have access to a grab bar 2001. In general, the grab bar 2001 may facilitate an operator or user reaching the cab interior 42 via the first step 1203. Additionally, the grab bar 2001 may facilitate support for a user during operation of the vehicle 10.

In the illustrated embodiment, the grab bar 2001 defines a generally arced or curved shape with a first end 2002 being arranged vertically above a second end 2003. The grab bar 2001 is coupled to a rear wall 2004 of the cab interior 42. In some embodiments, the first end 2002 and the second end 2003 are both removably coupled (e.g., via bolts, clips, wall hooks, or an equivalent removable mounting feature) to the rear wall 2004 so that the grab bar 2001 may be removed from the rear wall 2004 and recoupled at a different height. In other words, the position of the grab bar 2001 may be adjustable such that a user of the vehicle 10 may position the grab bar 2001 at an ideal location relative to the seat 1010.

In the illustrated embodiment, the grab bar 2001 may be positioned at a height within the cab interior 42 that generally aligns with a bottom of the back rest 1020 of the seat 1010. For example, the first end 2002 of the grab bar 2001 may be vertically aligned with or arranged at about the same vertical height as an uppermost portion of the seat support 1022, and the second end 2003 of the grab bar 2001 may be arranged vertically below the bottommost portion of the seat support 1022. In some embodiments, the grab bar 2001 may be positioned further toward the top of the back rest 1020 of the seat 1010. For example, the first end 2002 of the grab bar 2001 may be arranged vertically above an uppermost portion of the seat support 1022, and the second end 2003 of the grab bar 2001 may be vertically aligned with or arranged at about the same vertical height as the uppermost portion of the seat support 1022. In some embodiments, the grab bar 2001 may be positioned at or near the top of the back rest 1020 of the seat 1010. For example, the first end 2002 and the second end 2003 of the grab bar 2001 may both be arranged vertically above an uppermost portion of the seat support 1022.

Figure 22:
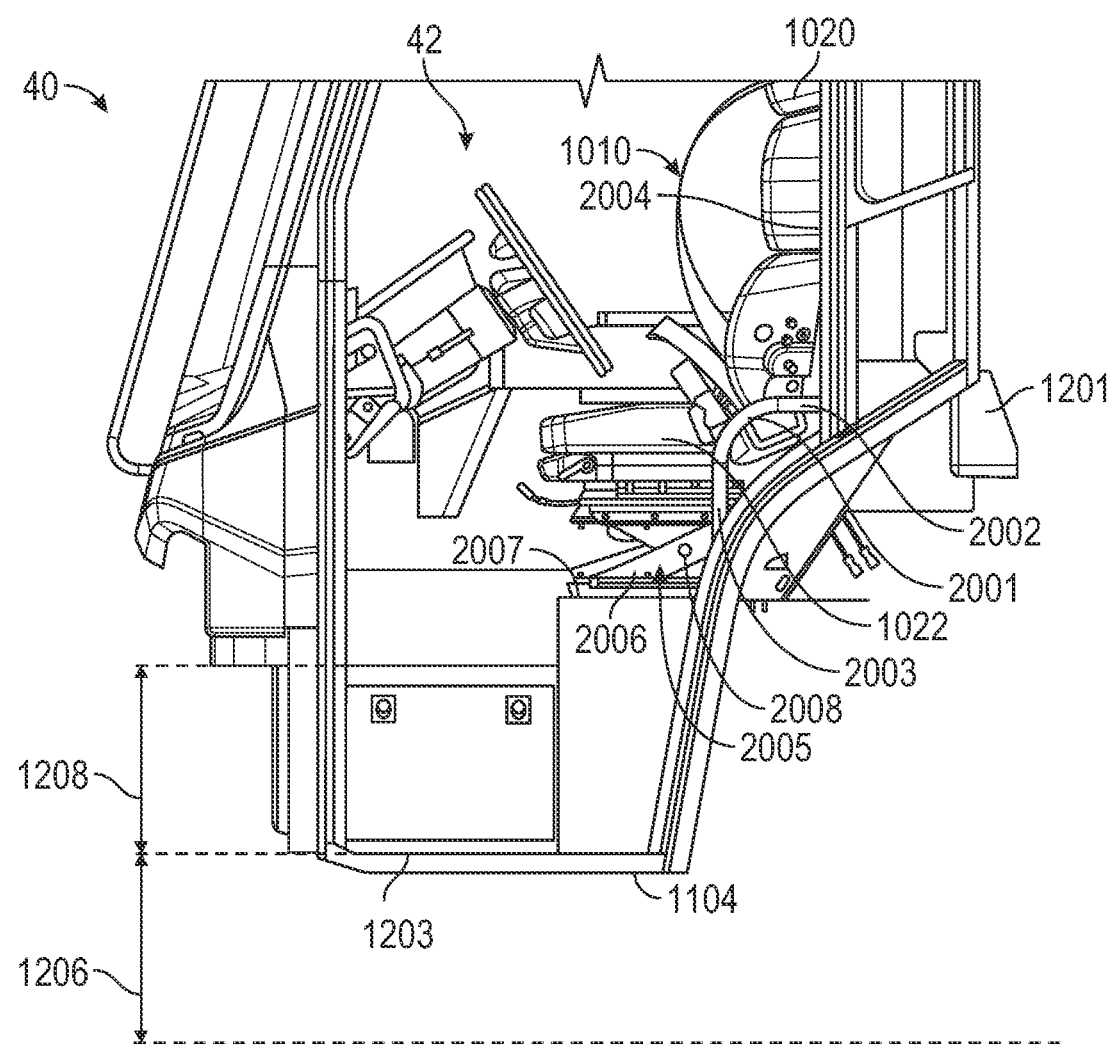
FIG. 22 is a side view of the interior of the cab of the vehicle of FIG. 19 configured with a grab bar, according to an exemplary embodiment.

In some embodiments, the grab bar 2001 is coupled to the rear wall 2004 of the cab interior 42 so that the seat 1010 is allowed to move relative to the grab bar 2001 during operation of the vehicle 10. For example, a suspension 2005 is coupled between the cab 40 and the seat 1010 that is configured to allow the seat 1010 to oscillate in response to bumps and movements of the cab 40. The suspension 2005 may be configured to dampen motion of the seat 1010 during the bumps and movements experienced by the cab 40 of the vehicle 10 during operation. In some embodiments, the suspension 2005 includes one or more linkage rods or scissor arms 2006 coupled between the bottom of the seat support 1022 and an interior surface of the cab 40. In the illustrated embodiment, the interior surface of the cab 40 is a seat platform 2007 on which the seat 1010 is supported. As illustrated in FIGS. 20 and 22, the suspension 2005 may be coupled between the seat platform 2007 and the seat 1010 in either the standing configuration (see, e.g., FIG. 20) and/or the sitting configuration (see, e.g., FIG. 22) of the seat 1010.

In the illustrated embodiment, as shown in FIG. 22, the scissor arms 2006 are coupled by a hinge pin 2008, and the scissor arms 2006 are configured to pivot relative to one another about the hinge pin 2008 so that the seat 1010 is allowed to move vertically relative to the seat platform 2007.

In some embodiments, one or more damping or biasing elements are arranged between the scissor arms 2006 and/or between the seat 1010 and the seat platform 2007. For example, the suspension 2005 may include one or more coil springs coupled between the scissor arms 2006 that act to dampen the relative vertical movement between the seat 1010 and the seat platform 2007. Alternatively or additionally, the suspension 2005 may include a shock absorber, a strut, and/or a piston/cylinder coupled between the seat 1010 and the seat platform 2007 to dampen the relative movement between the seat 1010 and the seat platform 2007.

In some embodiments, the grab bar 2001 is coupled to the seat 1510 itself, such that during operation, the grab bar 2001 moves with the seat 1510, instead of relative to the seat 1510, during operation of the vehicle 10.

Figure 23:
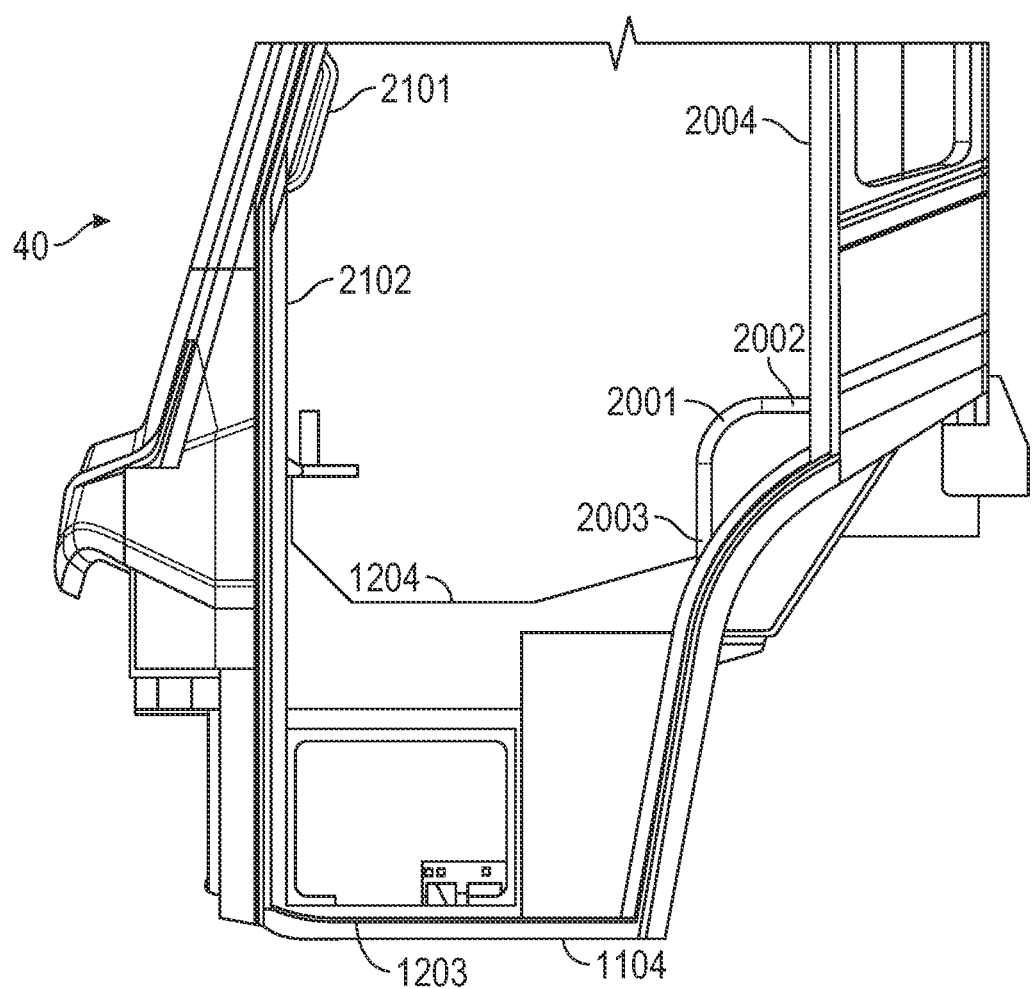
FIG. 23 is a side view of the interior of the cab of the vehicle of FIG. 22 configured with a second grab bar, according to an exemplary embodiment.

According to an exemplary embodiment, as shown in FIG. 23, the cab 40 may include a second grab bar 2101 in addition to the grab bar 2001 (e.g., a first grab bar 2001). In some embodiments, the cab 40 may include the second grab bar 2101 as an alternative to the grab bar 2001. In some embodiments, the second grab bar 2101 may be coupled to and arranged within a portion of the interior 42 of the cab 40. For example, the second grab bar 2101 may be positioned to the left, or laterally outwardly, of the seat support 1022 on the first side 1004. In some embodiments, the second grab bar 2101 is positioned to the right, or laterally outwardly, of the seat support 1022 on the second side 1006. In some embodiments, the second grab bar 2101 may be positioned on the right side, or laterally inwardly, of the seat support 1022 on the first side 1004. In some embodiments, the second grab bar 2101 may be positioned on the left side, or laterally inwardly, of seat support 1022 on the second side 1006. It should be appreciated that the second grab bar 2101 may be positioned in duplicative or alternative form including, but not limited to, any of the arrangements described herein. For example, the cab 40 may include a second grab bar 2101 positioned laterally outwardly relative to both the seat support 1022 on the first side 1004 and the seat support 1022 on the second side 1006, so that an operator entering either side of the cab interior 42 may have access to a second grab bar 2101. In general, the second grab bar 2101 may facilitate an operator or user reaching the cab interior 42 via the first step 1203 and the second step 1204. Additionally, the second grab bar 2101 may facilitate support for a user during operation of the vehicle 10.

The second grab bar 2101 is coupled to a front wall 2102 of the cab interior 42. In some embodiments, the second grab bar 2101 is removably coupled (e.g., via bolts, clips, wall hooks, or an equivalent removable mounting feature) to the front wall 2102 so that the second grab bar 2101 may be removed from the front wall 2102 and recoupled at a different height. In other words, the position of the second grab bar 2101 may be adjustable such that a user of the vehicle 10 may position the second grab bar 2101 at an ideal location relative to the seat 1010.

In the illustrated embodiment, the second grab bar 2101 is positioned at a height within the cab interior 42 that is generally above the height of the grab bar 2001 (i.e., above the first end 2002). In this way, for example, a user may initially grasp the grab bar 2001 when entering the cab interior 42 and subsequently grab the second grab bar 2101 as the user steps upwardly into the cab interior 42. Also, the second grab bar 2101 being arranged on a laterally opposing wall relative to the grab bar 2001 (i.e., the front wall 2102 is laterally opposite to the rear wall 2004) provides lateral stability to a user entering the cab interior 42. In some embodiments, the second grab bar 2101 is positioned at a height that at least partially overlaps with the grab bar 2001 (i.e., at least a portion of the grab bar 2001 and the second grab bar 2101 are arranged at the same height).

In some embodiments, the second grab bar 2101 is rigidly coupled to the front wall 2102 such that it does not move with the seat 1010 with respect to the motion of the suspension 2005 described herein. In some embodiments, the second grab bar 2101 is slidably coupled to the front wall 2102, such that if a user is holding the second grab bar 2101 during operation of the vehicle 10, the second grab bar 2101 is configured to move with the relative motion of the seat 1010 relative to the cab 40.

Figure 24:
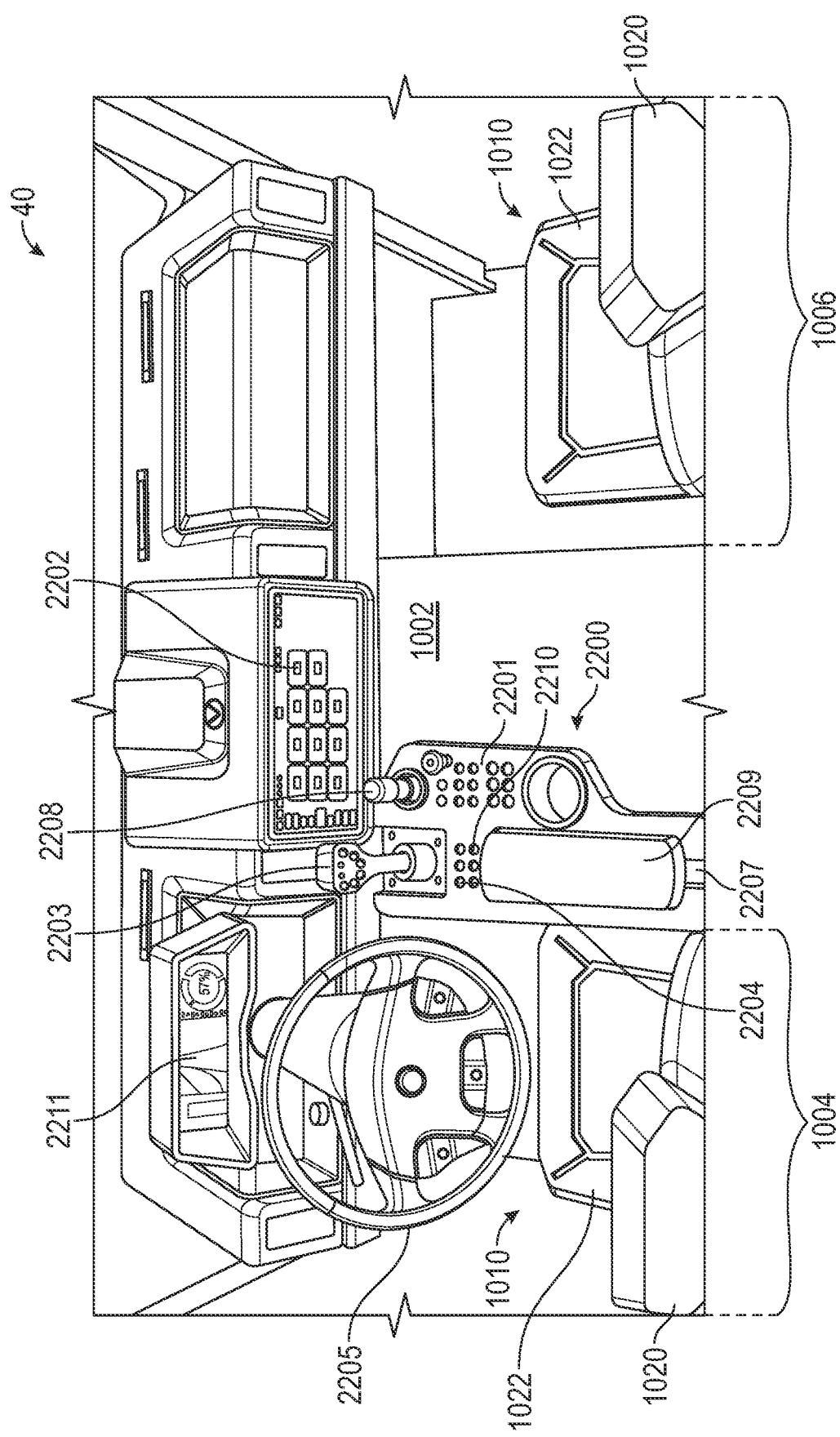
FIG. 24 is a top perspective view of an interior of the cab of the vehicle of FIG. 1 configured with a control console, according to an exemplary embodiment.

According to an exemplary embodiment, as shown in FIG. 24, the cab 40 may include a control console 2200 arranged within the cab interior 42. In the illustrated embodiment, the control console 2200 is positioned on the right side (e.g., a laterally inward side) of the seat 1010 on the first side 1004, near a steering wheel 2205. In other embodiments, the control console 2200 may be positioned on the left side (e.g., a laterally outward side) of the seat 1010 on the first side 1004.

The control console 2200 includes a panel 2201 having buttons and indicators that support the functions of the vehicle 10. The control console 2200 may further include an armrest 2209, a primary joystick 2203, a secondary joystick 2208, a gear shift 2204, and gear shift indicators 2210. The gear shift 2204 may be configured to change the gear of the transmission/components of the vehicle 10, and the gear shift indicators 2210 may be configured to indicate the gear of the vehicle 10 controlled by the gear shift 2204. In some embodiments, the control console 2200 itself forms an armrest that is coupled to the seat 1010 and the armrest 2209 of the control console 2200 is an armrest pad 2209 designed to cushion a portion of a user's arm.

In some embodiments, the primary joystick 2203 may be configured to operate some or all of the various implements described herein. For example, the primary joystick 2203 may be configured to operate the lift assembly 140. In particular, the primary joystick 2203 may be configured to operate the articulation actuators 148 and the lift arm actuators 144. As another example, the primary joystick 2203 may be configured to operate the tailgate actuator 138 to facilitate emptying the storage volume of vehicle 10. As another example, the primary joystick 2203 may be configured to operate the grabber assembly 162. In particular, the primary joystick 2203 may be configured to operate the grabber fingers 166, the track 170, and/or the lift actuator 172. As another example, the primary joystick 2203 may be configured to operate the drum assembly 230. In particular, the primary joystick 2203 may be configured to operate the drum drive system 234 and the chute 238. As another example, the primary joystick 2203 may be configured to operate the ladder assembly 254. In particular, the primary joystick 2203 may be configured to operate the turntable 262 and the monitor 264. As another example, the primary joystick 2203 may be configured to operate the boom assembly 354. In particular, the primary joystick 2203 may be configured to operate the lower lift cylinder 364, the turntable 352, the lower boom 360, and/or the upper lift cylinder 366. As another example, the primary joystick 2203 may be configured to operate the platform assembly 370. In particular, the primary joystick 2203 may be configured to operate the jib arm 372. As yet another example still, the primary joystick 2203 may be configured to operate the lift assembly 404. In particular, the primary joystick 2203 may be configured to operate the leveling actuators 410, the scissor layers 420, and/or the lift actuators 424. It should be appreciated that the primary joystick 2203 may be configured to operate any of the implements described herein, including or in addition to any of the examples discussed herein.

In some embodiments, the primary joystick 2203 and the secondary joystick 2208 may be configured to each operate some or all of the various implements described herein. For example, the primary joystick 2203 may be configured to operate implements more frequently used in the regular operation of the vehicle 10, while the secondary joystick 2208 may be configured to operate the implements less frequently used in the regular operation of the vehicle 10. In other embodiments, the primary joystick 2203 may be configured to operate implements associated with one or more subsystems of the vehicle 10, while the secondary joystick 2208 may be configured to operate a different one or more subsystems of the vehicle 10 than those operated by the primary joystick 2203.

In some embodiments, the operation of the primary joystick 2203 may be supported by any of the other components of the control console 2200, a user interface 2202, or a display screen 2211. For example, the user interface 2202 may show live camera footage of the implement being operated by the primary joystick 2203 or a digital representation of the implement being operated by the primary joystick 2203. In some embodiments, the user interface 2202 functions as the display 1018 described herein. Further, the user interface 2202 may display the status of various implements and functions of the vehicle 10. The user interface 2202 may include a touchscreen configured to allow a user to select a particular implement to operate with the primary joystick 2203. The operation of the various implements using the primary joystick 2203 may be supported or supplemented by the indicators or buttons coupled to the control console 2200. For example, the indicators (e.g., on the user interface 2202 or the panel 2201) may light up to indicate a status of one of the implements being operated by the primary joystick 2203. In some embodiments, the display screen 2211 may be configured to perform some or all of the functions described herein regarding the user interface 2202. In some embodiments, the display screen 2211 may be configured to display video footage of the exterior of the vehicle 10.

In some embodiments, the control console 2200 may be pivotable around a pivot 2207. For example, the control console 2200 may be configured to rotate upward toward the top of the seat 1510 or back down toward the bottom of the seat 1510. As another example, the control console 2200 may be configured to rotate right and left relative to the pivot 2207 (e.g., in a direction toward or away from the steering wheel 2205).

Figure 25:
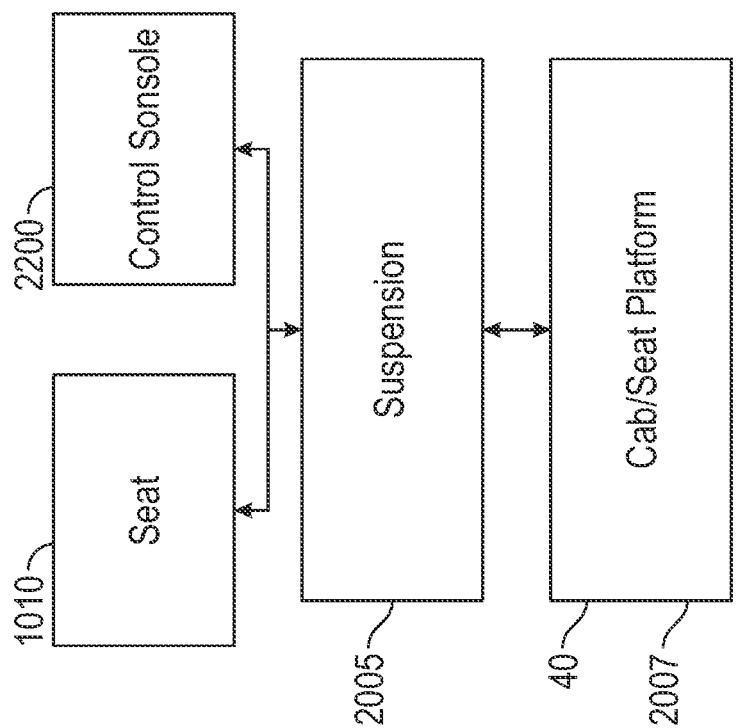
FIG. 25 is a schematic illustration of the cab of FIG. 24 with a suspension coupled to a seat and a control console, according to an exemplary embodiment.

In some embodiments, the control console 2200 is coupled to the cab 40 such that the control console 2200 moves with the seat 1010. As described above, the seat 1010 may move relative to the cab 40 due to the suspension 2005. The control console 2200 may be configured to move with the seat 1010 such that bumps and changes of position of the vehicle 10 do not obstruct the operation of the components of the control console 2200, such as the primary joystick 2203, during operation. In some embodiments, as shown in FIG. 25, the control console 2200 is coupled to the cab 40 or the seat platform 2007 by the suspension 2005 (e.g., separately from the seat 1010) such that it does not move relative to the seat 1010 during operation of the vehicle 10. In this configuration, the suspension 2005 supports the seat 1010 and the control console 2200 separately, and may account for different masses of the seat 1010 (and an operator therein) and the control console 2200 by including different springs, shock absorbers, struts, and/or a piston/cylinders that support the control console 2200, compared to those that support the seat 1010. This ensures that the relative motion between the seat 1010 and the cab 40 is the same as the relative motion between the control console 2200 and the cab 40 (i.e., the control console 2200 is inhibited from moving relative to the seat 1010). In other words, the position of the control console 2200 relative to the seat 1010 is maintained during operation of the vehicle 10.

Figure 26:
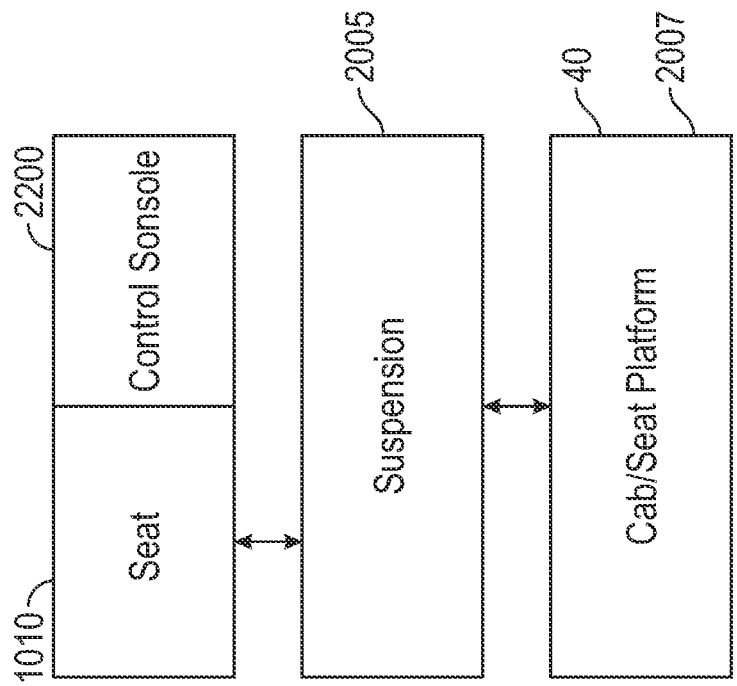
FIG. 26 is a schematic illustration of the cab of FIG. 24 with a suspension coupled to a seat and a control console coupled to the seat, according to an exemplary embodiment.

In some embodiments, as shown in FIG. 26, the suspension 2005 is coupled between the seat 1010 and the seat platform 2007 of the cab 40, and the control console 2200 is coupled to the seat 1010 so that the control console 2200 moves with the seat 1010. In this way, for example, the suspension 2005 supports both the seat 1010 and the control console 2200 together and a position of the control console 2200 relative to the seat 1010 is maintained during operation of the vehicle 10 (e.g., the control console 2200 moves with the seat 1010 during relative movement between the cab 40 and the seat 1010 facilitated by the suspension 2005).

Figure 27:
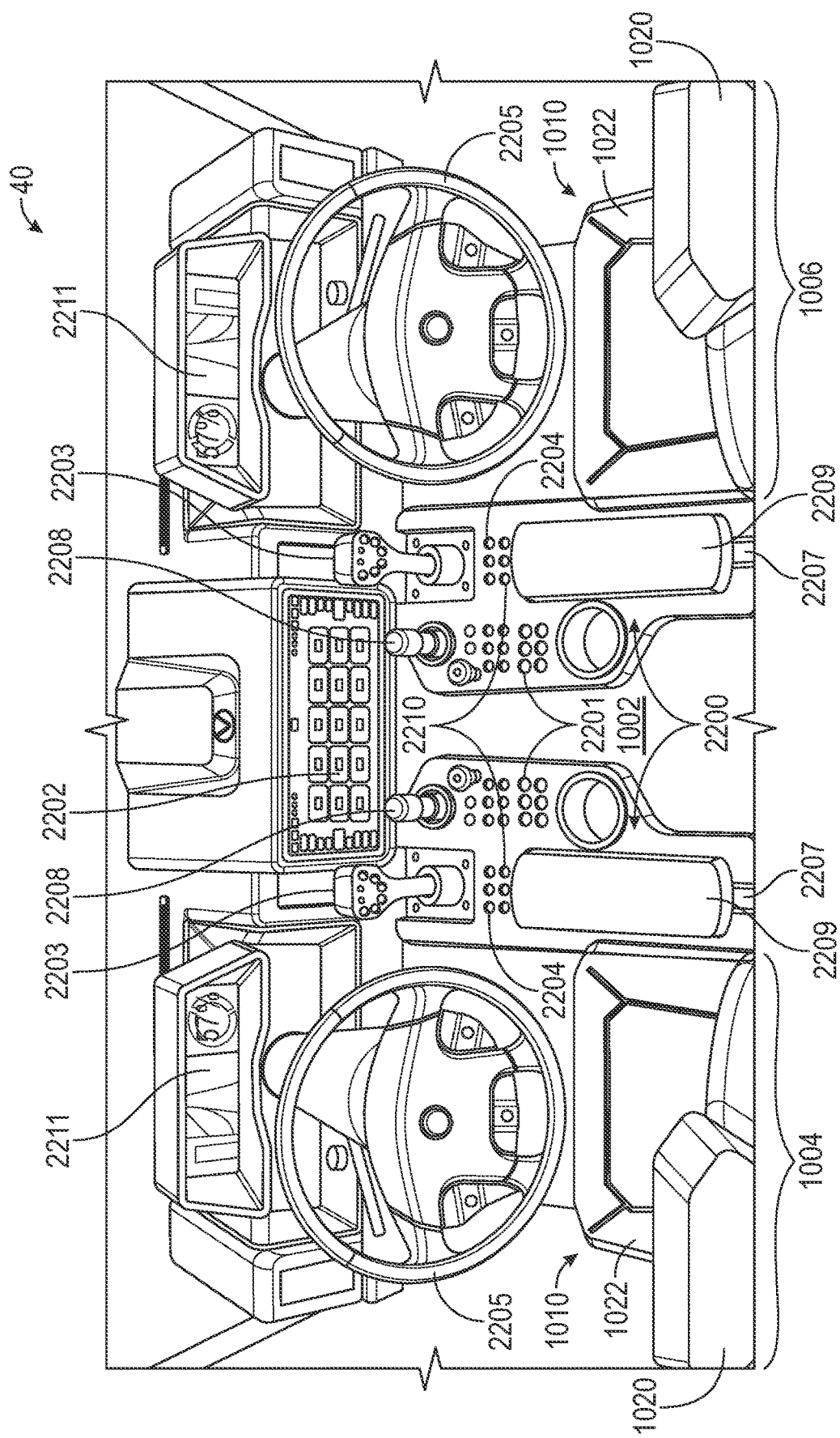
FIG. 27 is a top perspective view of the interior of the cab of FIG. 24 configured with a second control console, according to an exemplary embodiment.

According to an exemplary embodiment, as shown in FIG. 27, the cab 40 may include multiple control consoles 2200. For example, a control console 2200 may be further positioned on or near the second side 1006 of the cab 40 in addition to, or as an alternative to, the first side 1004. In this way, for example, an operator of the vehicle 10 may operate the various implements/functions of the vehicle 10 as described herein while riding in the seat 1010 on the second side 1006. In some embodiments, the cab 40 includes a first control console 2200 coupled to the seat 1010 arranged on the first side 1004 and a second control console 2200 coupled to the seat 1010 arranged on the second side 1006. In the illustrated embodiment, the first control console 2200 and the second control console 2200 are mounted inwardly on their respective seats 1010 (e.g., laterally inwardly).

Figure 28:
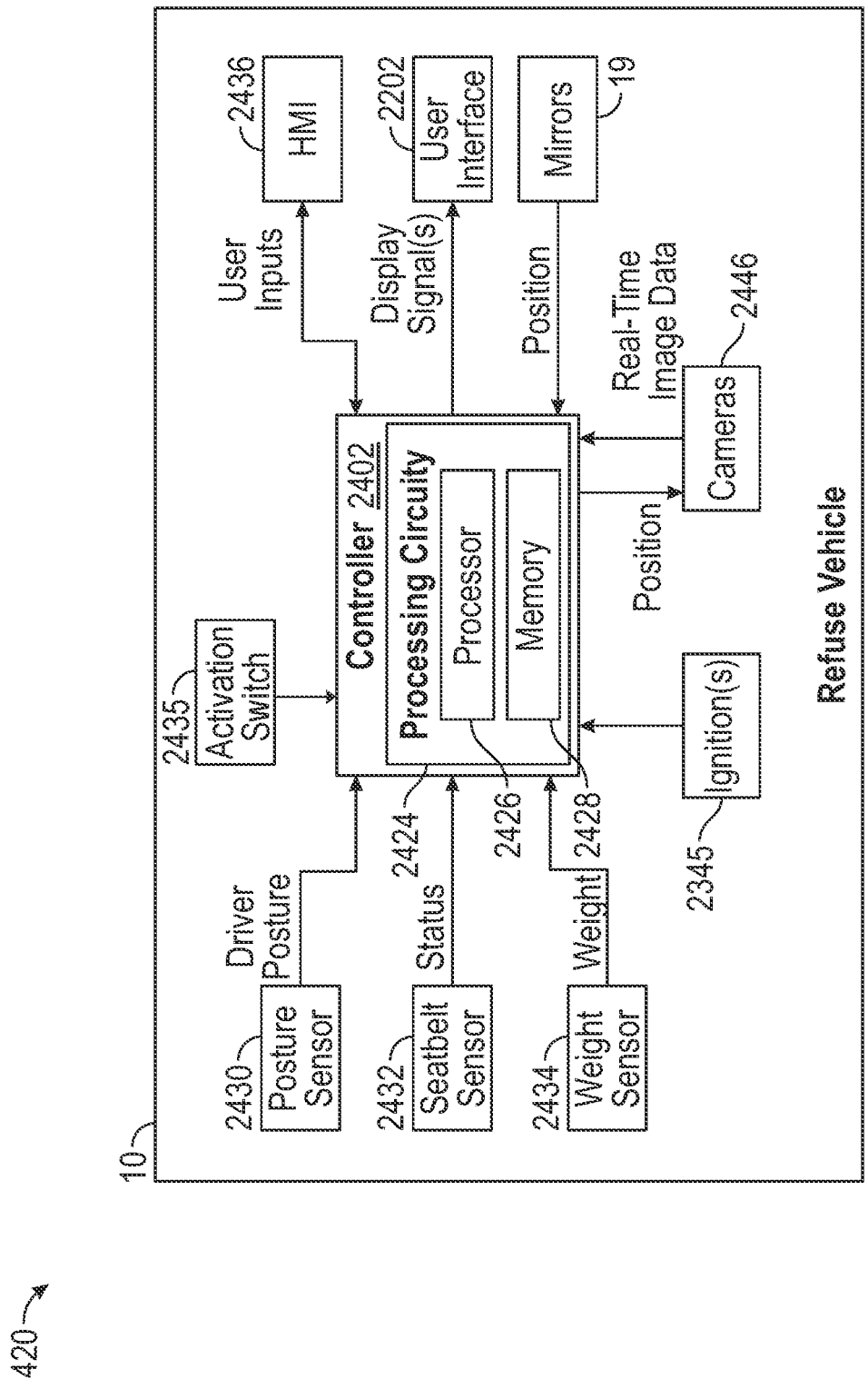
FIG. 28 is a schematic illustration of a controller of the vehicle of FIG. 1, according to an exemplary embodiment.

As shown in FIG. 28, the one or more components of the cab 40 may be communicably coupled to a control system 2400 having a controller 2402. The controller 2402 is configured to receive different sensor or input data from a variety of devices/components, and provide control data to various systems, sub-systems, etc., of the vehicle 10. In some embodiments, the controller 2402 is a native controller on the vehicle 10 that communicates over a vehicle CAN bus. In some embodiments, the controller 2402 is a dedicated controller that is included on the vehicle 10 to control operations within the cab 40. The controller 2402 includes a processing circuit 2424 having a processor 2426 and memory 2428. The processing circuit 2424 can be communicably connected to a communications interface such that the processing circuit 2424 and the various components thereof can send and receive data via the communications interface. The processor 2426 can be implemented as a general purpose processor, an application specific integrated circuit ("ASIC"), one or more field programmable gate arrays ("FPGAs"), a group of processing components, or other suitable electronic processing components.

The memory 2428 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 2428 can be or include volatile memory or non-volatile memory. The memory 2428 can include database components, object code components, script components, or any other type of information structure for supporting the various activities and information structures described in the present application. According to some embodiments, the memory 2428 is communicably connected to the processor 2426 via the processing circuit 2424 and includes computer code for executing (e.g., by the processing circuit 2424 and/or the processor 2426) one or more processes described herein.

In the illustrated embodiment, the vehicle 10 can include a posture sensor 2430, a seatbelt sensor 2432, a weight sensor 2434, one or more cameras 2446, a user interface 2202, and a human machine interface (HMI) 2436. In some embodiments, the HMI 2436 may include components such as the steering wheel 2205, the primary joystick 2203, the secondary joystick 2208, the gear shift 2204, the pedals 1210, the panel 2201, the user interface 2202, and/or an ignition 2345. The controller 2402 may be configured to determine various conditions of the cab 40, particularly conditions unique to dual drive embodiments (e.g., right-hand drive or left-hand drive operational modes), and provide control outputs to the various components of the control system 2400.

In some embodiments, a camera (e.g., one of the cameras 2446) is positioned within the cab 40 and the controller 2402 is configured to use image data from the camera to determine position(s) of the operator(s) within the cab 40. For example, the controller 2402 may be configured to determine, via one or more of the cameras 2446, whether there is an operator in the seat 1010 on the first side 1004 and/or the seat 1010 on the second side 1006. In other embodiments, various sensors (e.g., the weight sensors 2434, the posture sensors 2430, the seatbelt sensors 2432, etc.) are positioned throughout the cab 40 to determine the position and/or presence of an operator within the cab 40.

In some embodiments, the controller 2402 is configured to operate the user interface 2202 to provide the real-time image data obtained from the cameras 2446 or to provide the real-time image data of the cameras 2446 to a secondary display (e.g., the display screen 2211). In some embodiments, the user interface 2202 or the secondary display is positioned within the cab 40 such that the user interface 2202 is viewable from any driving position within the cab 40 (e.g., either the seat 1010 on the first side 1004 or the second side 1006). In some embodiments, various settings of the user interface 2202 may be adjusted by the controller 2402.

In some embodiments, the vehicle 10 (e.g., the refuse vehicle 100) may include a pair of mirrors 19, as shown in FIGS. 3, 5, 7, and 9, with each mirror 19 positioned on laterally opposing sides of an exterior of the vehicle 10 (e.g., proximate the cab 40) and viewable from the cab interior 42. Various settings regarding the mirrors 19 may be adjusted by the controller 2402 (e.g., position, orientation, etc.).

Referring to FIGS. 27 and 28, in some embodiments, the cab 40 of the vehicle 10 (e.g., the refuse vehicle 100) includes drive components/capabilities (e.g., pedals 1210, control consoles 2200, steering wheels 2205, etc.) on both the first side 1004 and the second side 1006 of the cab interior 42. As used herein, the terms "drive component(s)" or "vehicle operator interface(s)" mean any component/interface (e.g., pedals, steering wheels, joysticks, levers, user interfaces, buttons, switches, etc.) that, when manipulated, is capable of causing movement or travel of a function (e.g., motor, actuator, pump, transmission, etc.) on a vehicle or movement or travel of the vehicle itself. For example, drive components within the cab 40 of the vehicle 10 (e.g., the refuse vehicle 100) may include the pedals 1210, the steering wheels 2205, the primary joysticks 2203, the secondary joysticks 2208, buttons or switches on the panel

2201, the gear shifts 2204, any graphical buttons appearing on the user interface 2202, etc.

The controller 2402 may be configured to adjust various settings involved with the operation of the drive components within the cab 40. For example, with drive components/vehicle operator interfaces being arranged on both the first side 1004 and the second side 1006 of the cab interior 42, the controller 2402 may be configured be selectively allow operation of the drive components on either the first side 1004 or the second side 1006 based on the criteria described herein. Determining which of the first side 1004 or the second side 1006, if any, to allow operation of the drive components may be based on a determination of the presence of an operator on the first side 1004 (e.g., in the seat 1010) and/or the second side 1006 (e.g., in the seat 1010). In some embodiments, the determination of the presence of operator(s) on the first side 1004 and/or the second side 1506 may be based on data provided by the weight sensor(s) 2434, the seatbelt sensors 2432, an activation switch 2435, and/or the posture sensors 2430. For example, the weight sensor 2434 may be positioned within or underneath each of the seat(s) 1010. When an operator positions themselves on either of the seat(s) 1010, the weight sensor(s) 2434 may transmit a measurement of the amount of weight resting on the seat(s) 1010 (e.g., on the seat supports 1022). The controller 2402 may receive the weight measurement(s) and determine whether an operator is present in the first side 1004 and/or the second side 1006. For example, the memory 2428 may store a threshold weight (e.g., 100 pounds) that may be referenced by the controller 2402. If either of the weight measurement(s) received by the controller 2402 meet or exceed the threshold weight, the controller 2402 may make a determination that an operator is present on the first side 1004 and/or the second side 1006 and enable the drive components on that side. The threshold weight may be set such that various utility items may be placed on one of the seat(s) 1010 without necessarily triggering a determination by the controller 2402 that an operator is present. In some embodiments, data received from the posture sensor 2430 (indicating whether an operator, while detected in one of the seats 1010, is in fact in position to drive) or the seatbelt sensor (indicating whether an operator has engaged the seat belt of the seat 1010 or not) may, either alone or in combination with the other sensors described herein, be used by the controller 2402 to make a determination as to user presence in the cab 40. In some embodiments, activation of an activation switch 2435 may indicate to the controller 2402 the presence of an operator and grant control to the side of the cab 40 that the activation of the activation switch 2435 originates from (e.g., the cab 40 may include an activation switch 2435 on the first side 1004 and the second side 1006). In some embodiments, the activation switch 2435 may be arranged within the panel 2201, the user interface 2202, and/or the display screen 2211.

In some embodiments, one of the camera(s) 2446 may provide image data to the controller 2402 of the region of the cab 40 on or around the seat(s) 1010. The controller 2402 may receive the image data from the camera(s) 2446 and determine whether an operator is present on the first side 1004 and/or the second side 1006. For example, a single camera 2446 may feature a wide-angle field of view and be configured to collect image data from both the first side 1004 and the second side 1006 of the cab interior 42. With a wide-angle field of view, the image data may be provided by a single camera 2446 to differentiate between the first side 1004 and the second side 1006. As another example, two or more cameras 2446 may be positioned within the cab interior 42 to provide separate sets of image data associated with the first side 1004 and the second side 1006. As another example still, a single camera 2446 (without a wide lens) may be configured to operate in conjunction with the weight sensor(s) 2434 and reposition toward the first side 1004 or the second side 1006 based on the weight sensor(s) 2434 detecting a threshold weight on the seat(s) 1010. Based on the data from one of the cameras 2446 or other sensors described herein, the controller 2402 may make a determination regarding operator presence and adjust the other cameras 2446 (e.g., the cameras 2446 collecting image data outside the cab 40) for an improved view for the driving operator.

In some embodiments, the controller 2402 is configured to allow operation of the drive components within the cab 40 based on image data from the camera(s) 2446 indicating that an operator is present within the cab 40 on at least one of the first side 1004 or the second side 1006. In some embodiments, based on a determination that either of the seats 1010 are unoccupied, the controller 2402 may be configured to lock/disable control of the drive components in the unoccupied one of the first side 1004 or the second side 1006. For example, the controller 2402 may determine that an operator is present in the seat 1010 on the first side 1004, while no operator is present in the seat 1010 on the second side 1006 (and vice-versa). The controller 2402 may be configured to allow/enable operation of the drive components within the cab 40 on the first side 1004, while not allowing/disabling operation of the drive components within the cab 40 on the second side 1006 (and vice-versa). Beneficially, when a single operator is operating the vehicle 10, unintentional engagement of the drive controls on the unoccupied side of the cab 40 (e.g., a stray object rolling and/or falling about the cab 40, the single operator reaching into the unoccupied side and making unintentional contact with controls on the unoccupied etc.) is avoided by the controller 2402 because the controller 2402 only enables the drive components on the occupied side of the cab 40. As another example, the controller 2402 may determine that no operator is present in either seat 1010 within the cab 40, and the controller 2402 may not allow control of the drive components within the cab on either the first side 1004 or the second side 1006. Beneficially, the controller 2402 may be configured to disengage the drive components of the cab 40 when the cab 40 is unoccupied and an operator reaches into the cab 40 from the outside and unintentionally engages a drive component.

In some embodiments, the controller 2402 may be configured to selectively allow operation of the drive components within the cab 40 on the first side 1004 or the second side 1006 when both the first side 1004 and the second side 1006 are occupied by an operator. For example, the activation switch 2435 may allow an operator to input a command to manually provide operation of the drive components within the cab 40 on the first side 1004 or the second side 1006. In some embodiments, the controller 2402 may be configured with a default setting that automatically allows operation of the drive components of the vehicle 10 via the first side 1004 or the second side 1006 based on image data from the camera(s) 2446 indicating that operators are present within the cab 40 on both of the first side 1004 and the second side 1006 (e.g., the first side 1004 may default to enabled drive components when operators are present on both the first side 1004 and the second side 1006). In some embodiments, when both the first side 1004 and the second side 1006 are occupied by an operator, the controller 2402 may instruct the user interface 2202 to provide a prompt to select which of the first side 1004 or the second side 1006 should be allowed to control the drive components within the cab 40 (e.g., designate a primary operator)), for example, by instructing an operator to activate the activation switch 2435.

In some embodiments, the cab 40 of the vehicle 10 (e.g., the refuse vehicle 100) includes an ignition 2345 on both the first side 1004 and the second side 1006 (e.g., on a front console or dash with in the cab interior 42). In these embodiments, the controller 2402 enable the drive components on the side of the cab 40 that corresponds with the side on which the ignition 2345 was activated. For example, the controller 2402 detects that an operator is present on both the first side 1004 and the second side 1006 of the cab 40 and the ignition 2345 on the first side 1004 was activated, the controller 2402 may enable the drive components on the first side 1004 and disable the drive components on the second side 1006. It should be appreciated that some or all of the adjustments or settings discussed herein in regards to operator presence on the first side 1004 versus the second side 1006 may be similarly adjusted when an operator is present on both the first side 1004 and the second side 1006, and the controller 2402 determines which of the two operators is designated as the primary operator.

In some embodiments, the controller 2402 is configured to adjust an orientation or position of the mirrors 19, the camera(s) 2446, and/or the graphical buttons on the user interface 2202 between one or more predetermined orientations or positions based on the position and/or presence of the operator(s) within the cab 40. For example, when the operator is in the seat 1010 on the first side 1004, the mirrors 19 can automatically transition into a first predetermined orientation. When the operator moves to a different location within the cab 40, the mirrors 19 can automatically transition into a second predetermined orientation. Furthermore, the controller 2402 may adjust the mirrors 19 to a third predetermined location when both operators are present.

In some embodiments, the controller 2402 is configured to adjust the user interface 2202 based on the position and/or presence of the operator(s) within the cab 40. For example, when the operator is in the seat 1010 on the first side 1004, the controller 2402 may adjust the user interface 2202 to be uniquely arranged (as opposed to an operator on the right side, or operators on both sides). For example, the controller 2402 may adjust the user interface 2202 to include controls, graphical buttons, or interfaces closer to the first side 1004 than the second side 1006. Additionally, the controller 2402 may adjust the function of the buttons and/or indicators of the panel 2201 based on the position and/or presence of the operator(s) within the cab 40. For example, the buttons and/or indicators may be configured with adjustable displays, and the panel 2201 may feature an adjustable input system (i.e. a button that adjusts the mirrors 19 may be reconfigured to adjust the cameras 2446), such that while the physical location of the buttons and/or indicators are not rearranged on the panel 2201, the controller 2402 may adjust the display and function of the buttons and/or indicators themselves.

In addition to the various settings regarding operator position and/or presence on the first side 1004 and/or the second side 1006, the controller 2402 may be configured to adjust the operator position settings above (e.g., position(s) of the mirror 19, position(s) of the cameras 2446, the arrangement of the user interface 2202, seat height, seat position) based on various operator features (e.g., height, skill level, weight, credentials, etc.). Alternatively or additionally, the controller 2402 may adjust the operator position settings based on one or more of: (a) an average operator profile (e.g., a setting the includes a height a weight that falls within a 95th percentile for men and women) that may be selected via the user interface 2202 or provided as a default before an operator adjusts the settings or selects new settings via a stored profile; (b) a badge worn by an operator that is scanned by the user interface 2202 (e.g., a barcode scanner, an NFC transceiver, etc.) or imaged by the camera(s) 2446 to automatically load and/or verify an arrangement of the operator position settings; (c) a previously-stored arrangement of operator position settings (e.g., the stored operator position settings reset daily based on time of day or when the vehicle 10 returns to a home/base location); or (d) an arrangement of operator positions settings from one side of the cab 40 may be applied to another side of the cab 40 (e.g., adjustments made to the first side 1004 may be implemented on the second side 1006).

Referring generally to FIGS. 29-35, the cab 40 of the vehicle 10 (e.g., the refuse vehicle 100) may include an armrest adjustment assembly 2500 that is coupled to an armrest of the seat 1010. As described herein, the control console 2200 itself may forms an armrest that is coupled to the seat 1010. As such, the terms control console 2200 and armrest 2200 are used synonymously in the following description of the armrest adjustment assembly 2500. In general, the armrest adjustment assembly 2500 may be coupled between the armrest 2200 and the seat 1010 to enable selective repositioning of the armrest 2200 relative to the seat 1010. For example, the armrest adjustment assembly 2500 may selectively adjust a height of the armrest 2200 relative to the seat 1010. In some embodiments, the armrest adjustment assembly 2500 is configured to adjust a height of the armrest 2200 between a plurality of positions. In some embodiments, the armrest adjustment assembly 2500 may be configured to adjust the height of the armrest 2200 between pre-set positions (e.g., lowered position, middle position, raised position, etc.).

In some embodiments, the armrest adjustment assembly 2500 is configured to allow the armrest 2200 pivot in one or more directions. For example, the armrest adjustment assembly 2500 may be configured to selectively allow the armrest 2200 to pivot in an up-down direction (e.g., pivot the armrest 2200 from a position where it is approximately parallel to the floor 1212 of the cab 40 (operating position) to a position where it is approximately perpendicular to the floor 1212 of the cab (stowed position). In some embodiments, the armrest adjustment assembly 2500 is configured to selectively enable the armrest 2200 to swivel (e.g., rotate with the armrest 2200 in the operating position).

In the illustrated embodiment, the armrest adjustment assembly 2500 includes a housing 2502 mounted internally within the armrest 2200 adjacent to a rearward end of the armrest 2200 (shown as transparent dashed lines for clarity). In some embodiments, the housing 2502 may be mounted adjacent to a forward end of the armrest 2200. The housing 2502 may be a tubular housing that defines a hollow cavity that extends therethrough. As discussed in greater detail herein, a gas strut may be positioned within the hollow cavity and configured to provide a push/pull force to adjust the height of the armrest 2200. The housing 2502 includes a lower housing, shown as inner housing 2504, and an upper housing, shown as outer housing 2506. In general, the inner housing 2504 is telescopically arranged within the outer housing 2506 so that the inner housing 2504 is configured to translated within and along the outer housing 2506. In still other embodiments, the housing 2502 defines more than two housing sections, where the additional housings may be telescopically provided within the inner housing 2504 or over the outer housing 2506. The inner housing 2504 may be at least partially disposed within the outer housing 2506 when the height of the armrest 2200 is adjusted. The inner housing 2504 may be further received within the outer housing 2506 when the armrest 2200 is in a lowered position relative to the seat 1010 that when the armrest 2200 is in a raised position. In some embodiments, the armrest adjustment assembly 2500 may include a four-bar linkage rather than a telescoping housing coupled between the armrest 2200 and the seat 1010.

The armrest adjustment assembly includes a gas strut, strut, cylinder, spring, etc., shown as gas strut 2508. The gas strut 2508 may be disposed within the hollow cavity of the housing 2050 and extend through at least a portion of the hollow cavity. The gas strut 2508 may act as a prime mover for the armrest adjustment assembly 2500, where the gas strut 2508 provides a push or a pull force to reposition the armrest 2200. By way of example, the gas strut 2508 provides a push force onto the armrest 2200 to automatically raise the armrest 2200 and the armrest 2200 may be manually lowered by a pull force exerted by an operator on the armrest 2200. In other embodiments, the gas strut 2508 may manually raise the armrest 2200 and automatically lower the armrest 2200. In still other embodiments, the gas strut 2508 may automatically raise the armrest 2200 and automatically lower the armrest 2200.

The gas strut 2508 is coupled to a seat (e.g., seat 1010) or a portion thereof, for example, through the housing 2502. For example, the gas strut 2508 is coupled to the outer housing 2506 and the inner housing 2504 is coupled to the seat 1010 (see, e.g., FIGS. 29-30). The gas strut 2508 may include a lower portion (e.g., a piston) and an upper portion (e.g., a cylinder), where the lower portion is configured to move relative to the upper portion.

Figure 29:
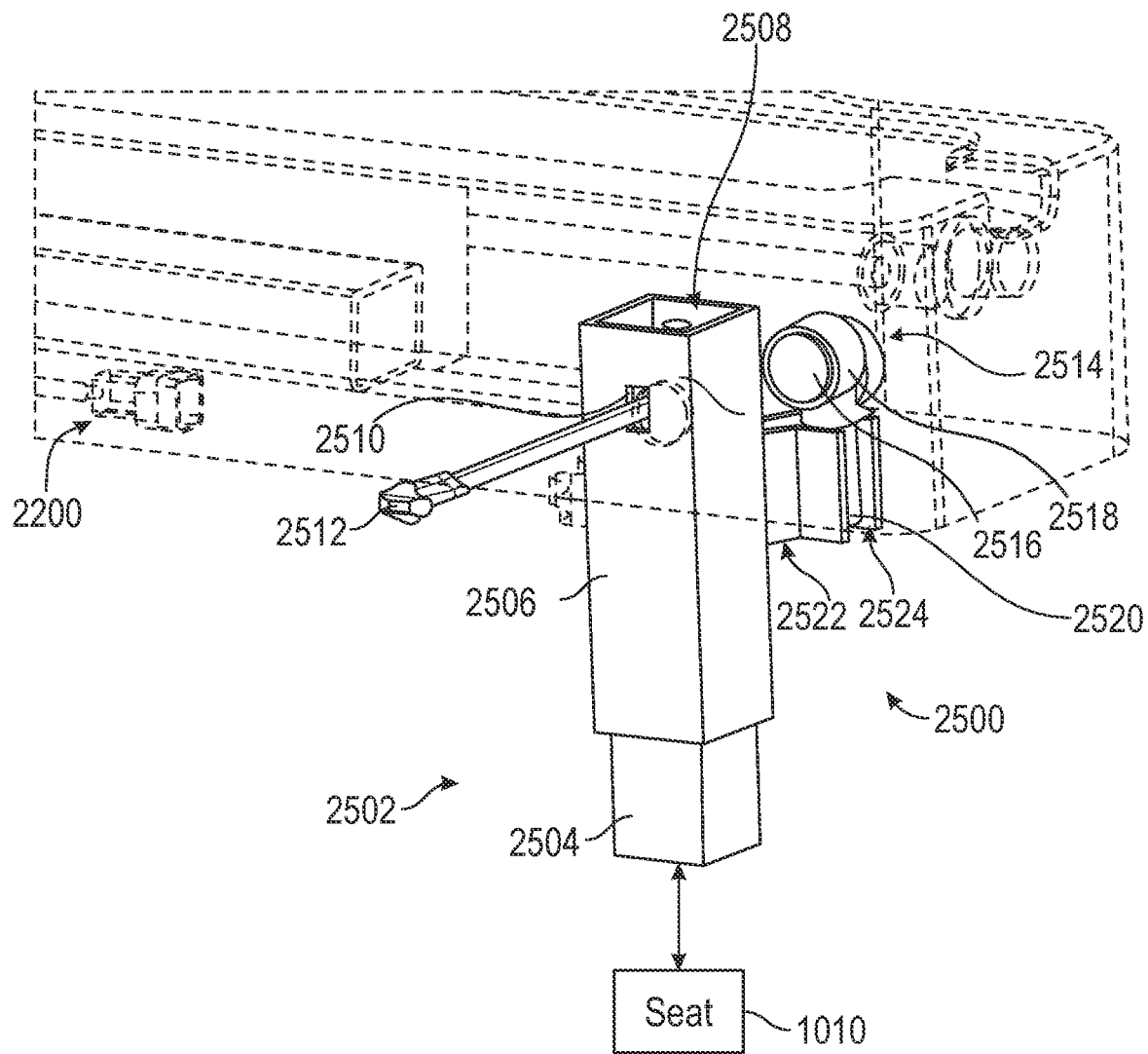
FIG. 29 is a top perspective view of an armrest adjustment assembly coupled to an armrest within the cab of FIG. 24 or FIG. 27, according to an exemplary embodiment.
Figure 30:
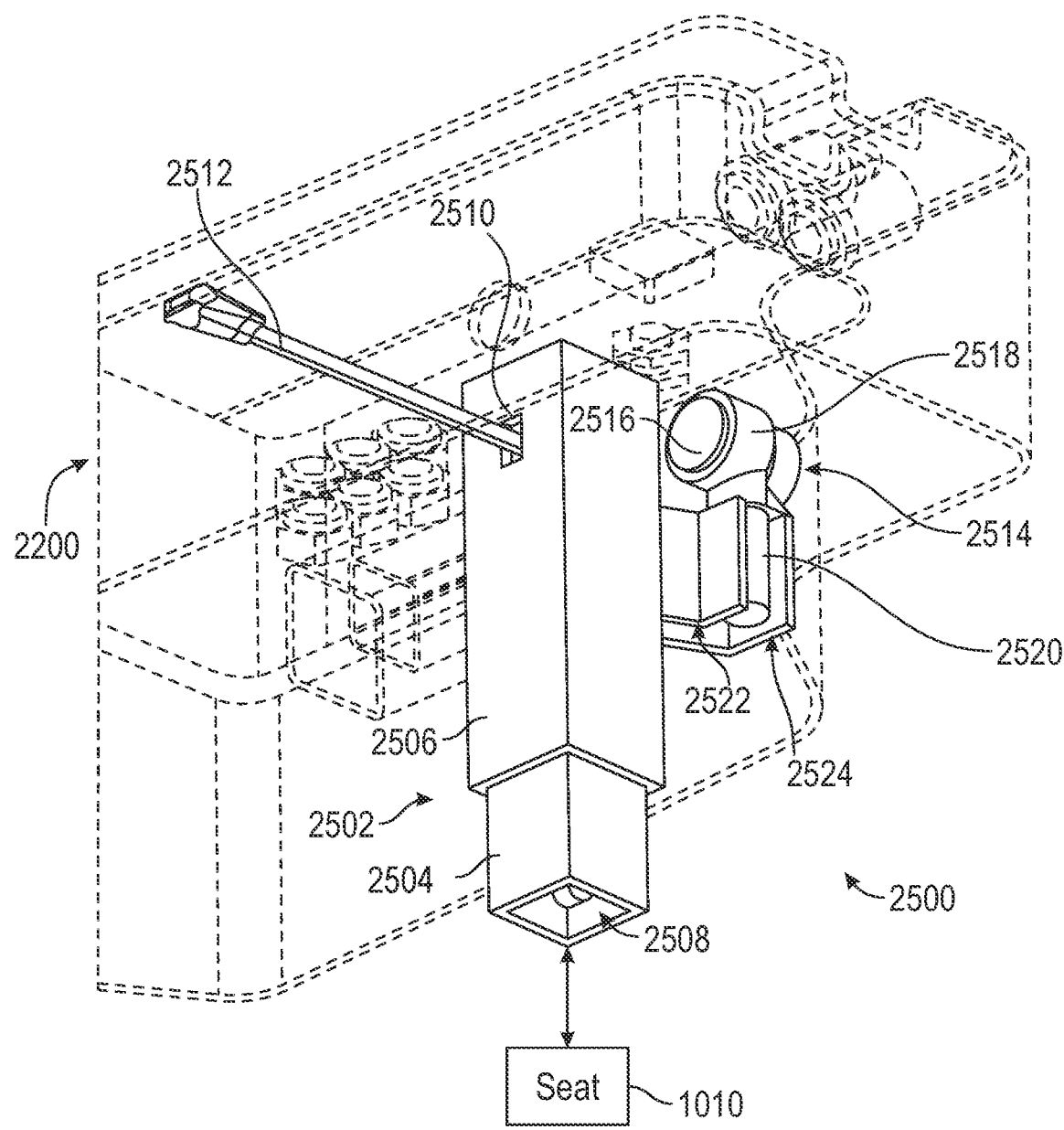
FIG. 30 is a bottom perspective view of the armrest adjustment assembly of FIG. 29.
Figure 31:
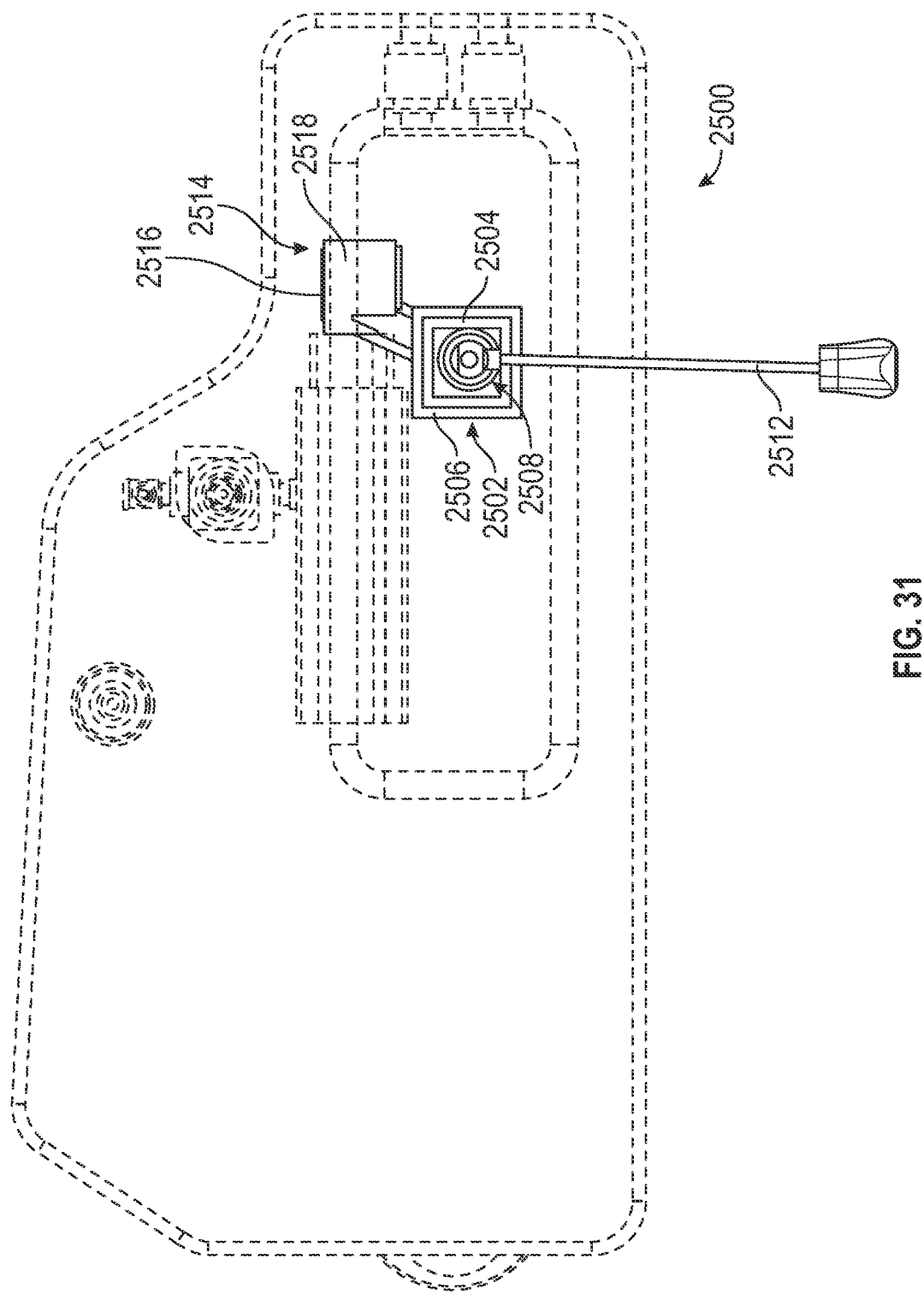
FIG. 31 is a top view of the armrest adjustment assembly of FIG. 29.
Figure 32:
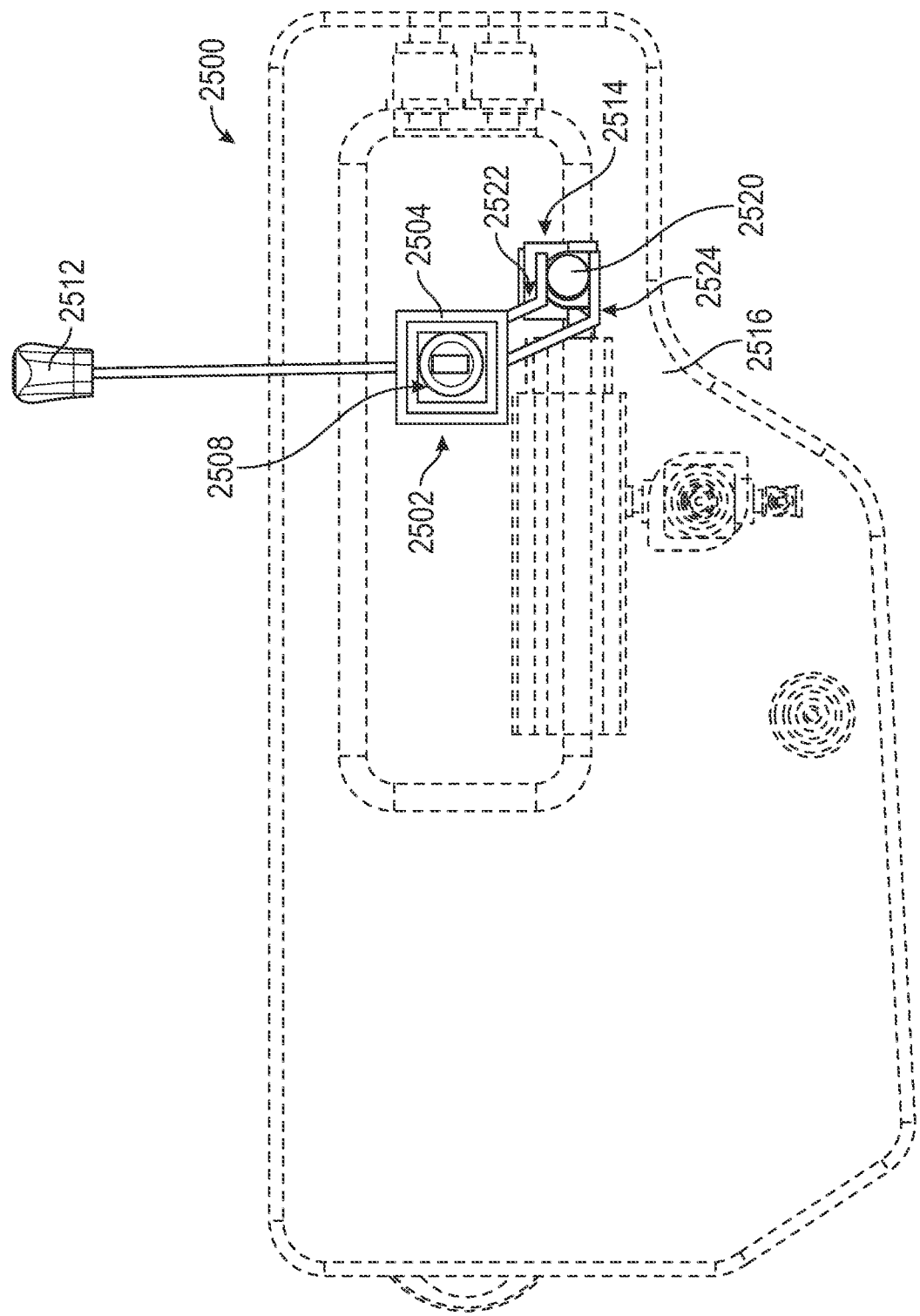
FIG. 32 is a bottom view of the armrest adjustment assembly of FIG. 29.
Figure 33:
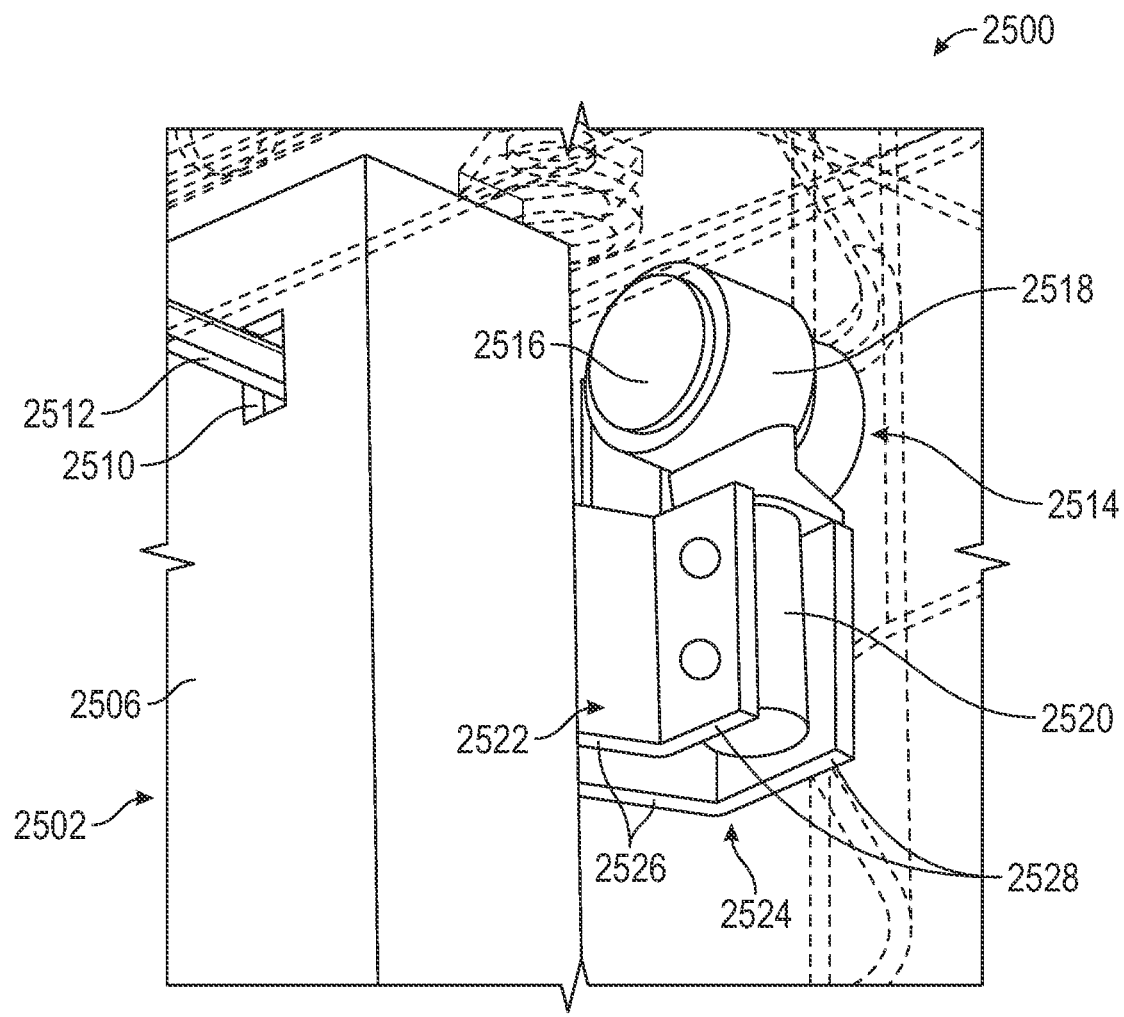
FIG. 33 is an enlarged view of a joint and bracket of the armrest adjustment assembly of FIG. 29.
Figure 35:
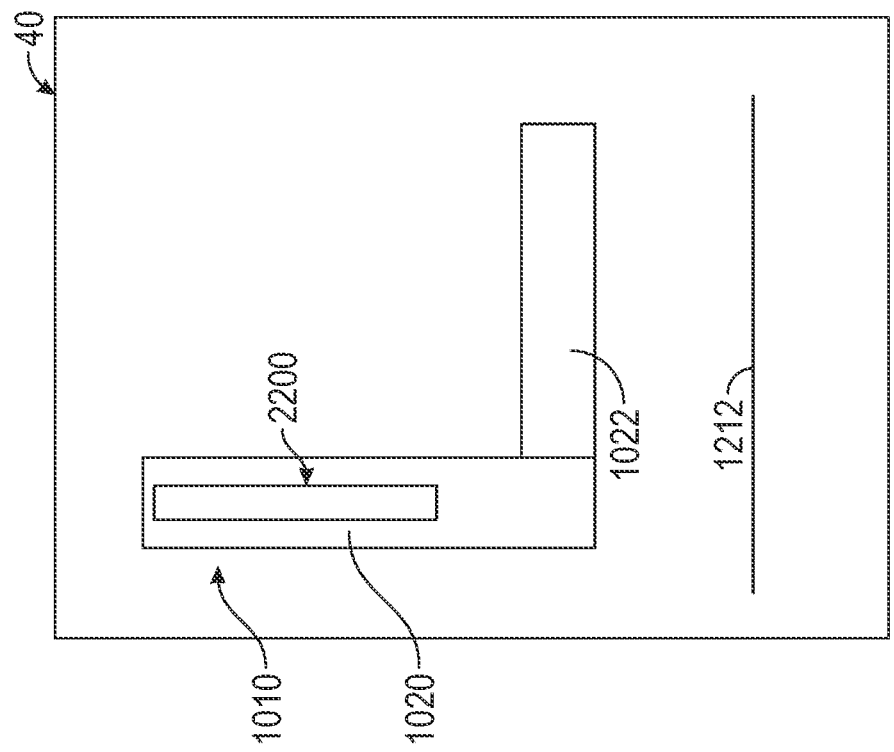
FIG. 35 is a schematic illustration of a side view of the armrest of FIG. 29 arranged within the cab of FIG. 24 or FIG. 27 with the armrest in an stowed position.
Figure 34:
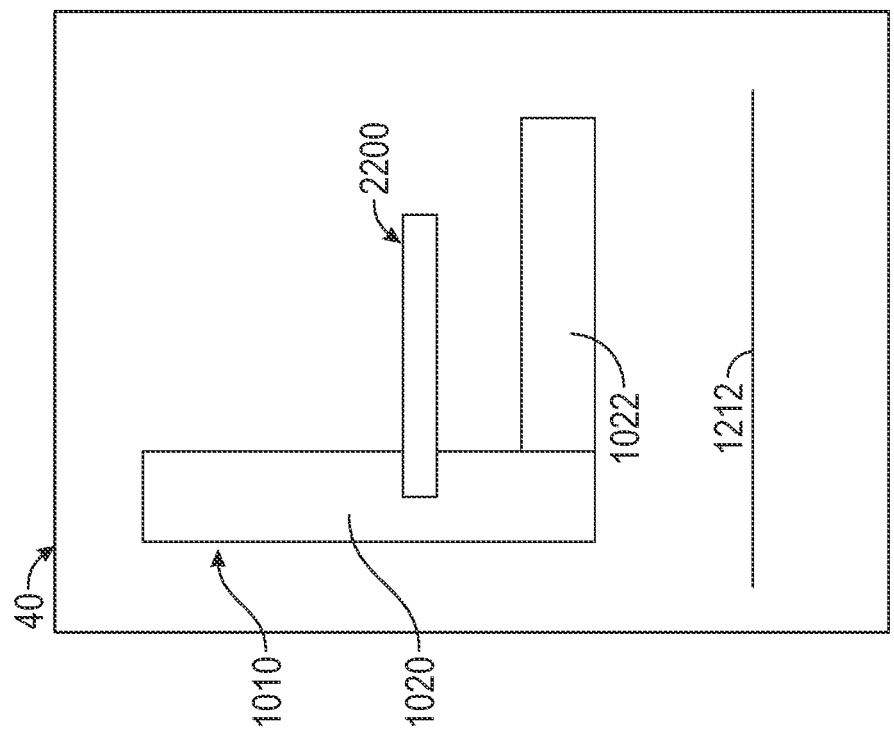
FIG. 34 is a schematic illustration of a side view of the armrest of FIG. 29 arranged within the cab of FIG. 24 or FIG. 27 with the armrest in an operating position.

As shown in FIGS. 29, 30, and 33, the outer housing 2506 includes an aperture 2510. The aperture 2510 may be positioned proximate a top end of the outer housing 2506, where a gas strut lever, handle, action mechanism, etc., shown as lever 2512, extends therethrough. The lever 2512 may be configured to release a valve and allow the gas strut 2508 to raise or lower depending upon an external force applied to the armrest 2200. Specifically, an operator may interface with (e.g., actuate) the lever 2512 to release the valve and the armrest 2200 may raise if there is no downward force acting on the armrest 2200, or the armrest 2200 may lower if there is a downward force acting on the armrest 2200 that is greater than a threshold force set by the gas strut 2508. In such an example, the downward force must be greater than the upward threshold force provided by the gas strut 2508. Once the lever 2512 is released, the valve is closed and the armrest 2200 is held in its current position by the gas strut 2508.

According to an exemplary embodiment, the gas strut 2508 may include a valve that is configured to control a raising and lowering rate of the gas strut 2508. The valve may be fluidly coupled to any portion of the gas strut 2508. The valve may be loosed or tightened to change a raising and lowered rate of the gas strut 2508. As can be appreciated, when the valve is completely tightened, the gas strut 2508 may raise or lower very fast, or not at all. Accordingly, when the valve is completely loosened, the gas strut 2508 may raise or lower very slow, or not at all. By way of example, the gas strut 2508 may provide an upward push force of 50 pounds.

With continued reference to FIGS. 29-35, the armrest adjustment assembly 2500 includes a joint 2514 coupled to an inner surface of the armrest 2200. The joint 2514 may be positioned opposite the lever 2512. The joint 2514 may define a pivot point for the armrest 2200. Specifically, the joint 2514 may include an integral locking mechanism (e.g., button mechanism, latch, detent, etc.) that can be engaged and permit pivotable movement of the armrest 2200 between the operating position and the stowed position, and then disengaged to lock the pivotal position of the armrest 2200. The joint 2514 includes an inner rod or bearing 2516 and an outer sleeve 2518 annularly extending over the inner rod 2516. When the joint 2514 is disengaged (e.g., by an operator or via a button or linkage coupled to the joint 2514), the inner rod 2516 is rigidly held and prevented from rotating relative to the outer sleeve 2518. When the joint 2514 is engaged (e.g., by an operator or via a button or linkage coupled to the joint 2514), the inner rod 2516, and the armrest 2200 coupled thereto, is allowed to rotate relative to the outer sleeve 2518 (and relative to the seat 1010, for example, in an up-down direction). In some embodiments, the housing 2502 and the gas strut 2508 arranged therein may remain stationary during upward/downward pivotal movement of the armrest 2200 due to the housing 2502 being coupled to the seat 1010. For example, the lever 2512 may extend through a cutout in the armrest 2200 that enable the armrest 2200 to pivot relative to the lever 2512. In other embodiments, the joint 2514 may be a hinge, where the armrest freely pivots about the hinge to reposition the armrest 2200. By way of example, the joint 2514 may include a button mechanism that can be interfaced with to permit pivotable movement of the armrest 2200, where the armrest 2200 is held in the current position when the button mechanism is released.

In some embodiments, the joint 2514 allows the armrest 2200 to pivot (e.g., in an up-down direction) about 90 degrees. When the armrest 2200 is in the operating position (see, e.g., FIG. 34), the armrest 2200 is positioned substantially parallel to the floor 1212 of the cab 40. When the armrest 2200 is in the stowed position (see, e.g., FIG. 35), the armrest 2200 is positioned substantially perpendicular to the floor 1212. Further, the armrest 2200 may be held in any position between the operating position and the stowed position. For example, the armrest 2200 may be angularly held at an angle of 45 degrees from the floor 1212. Additionally or alternatively, when the armrest 2200 is in the operating position, the armrest 2200 may obstruct the cab such that the cab 40 is not a walkthrough cab. When the armrest 2200 is in the stowed position, the armrest 2200 may not obstruct the cab 40 such that the cab 40 is a walkthrough cab.

As shown in FIGS. 29, 30, 32, and 33, the joint 2514 includes an elongated member or joint rod 2520 extending from the joint 2514. The joint rod 2520 may be a solid member extending radially outwardly from the joint 2514 (e.g., from an outer periphery of the outer sleeve 2518). The joint rod 2520 is received between and coupled to a first bracket 2522 and a second bracket 2524. The first bracket 2522 and the second bracket 2524 extend angularly from the outer housing 2506 and couple to the joint rod 2520. In some embodiments, the first bracket 2522 and the second bracket 2524 are spaced equidistant one another. Both of the first bracket 2522 and the second bracket 2524 include a first end 2526 that is rigidly coupled to the outer housing 2506, and a second end 2528 that is coupled to the joint rod 2520. The first ends 2526 may be coupled to the outer housing 2506 via a fastener, weld, or the an equivalent rigid coupling. In some embodiments, the second ends 2528 may include one or more apertures. As can be appreciated, the joint rod 2520 may include apertures that correspond to the apertures in the second ends 2528, where a fastener (e.g., nut, bolt, screw, pin, etc.) may extend therethrough to couple the second ends 2528 to the joint rod 2520. In some embodiments, the second ends 2528 may be rigidly coupled to the joint rod 2520 via a weld, etc. In some embodiments, the joint rod 2520 may be rotationally coupled to the second ends 2528 of the first bracket 2522 and the second bracket 2524. For example, the second ends 2528 of the first bracket 2522 and the second bracket 2524 may form a bearing sleeve within which the joint rod 2520 at least partially extends and is allowed to rotate within. In this way, the joint rod 2520, and the armrest 2200 coupled thereto through the first bracket 2522, the second bracket 2524, and the outer housing 2506, may be configured to rotate in the operating position (e.g., rotate the armrest 2200 toward the seat 1010 that it is coupled to or away from the seat 1010 it is coupled to.

In the illustrated embodiment, the joint 2514 is positioned proximate a rear portion of the armrest 2200. The joint 2514 is advantageously positioned proximate to the rear portion to keep components of the armrest 2200 out of engagement with the cab 40 as well as providing a maximum amount of room (e.g., walkthrough room) within the cab 40 when the armrest 2200 is pivoted to the stowed position. For example, the primary joystick 2203 and the secondary joystick 2208 extend outwardly from a top of the armrest 2200, and when the armrest 2200 is in the stowed position, the placement of the joint 2514 within the armrest 2200 may advantageously keep the primary joystick 2203 and the secondary joystick 2208 from coming in contact with the rear wall 2004 of the cab 40. For example, the joint 2514 may be positioned along an longitudinal length of the armrest 2200 at a location where a gap is formed between the primary joystick 2203 and the rear wall 2004 when the armrest 2200 is pivoted to the stowed position. Additionally or alternatively, the joint 2514 is positioned to keep components of the armrest 2200 out of engagement with a top of the cab 40 when the gas strut 2508 is in the raised position. For example, when the gas strut 2508 is in the raised position and the armrest 2200 is pivoted into the stowed position, the joint 2514 is advantageously positioned to keep the primary joystick 2203 from coming in contact with the top of the cab 40 and the rear wall 2004 of the cab 40.

As described herein, the cab 40 of the vehicle 10 (e.g., the refuse vehicle 100) may be configurable in different driving configurations (e.g., left-hand drive, right-hand drive, dual drive). FIGS. 36-44 illustrate exemplary embodiments of the cab 40 in various driving configurations. The cab 40 illustrates in FIGS. 36-44 may include similar features as the other embodiments of the cab 40 described herein, with similar features identified using like reference numerals.

Figure 36:
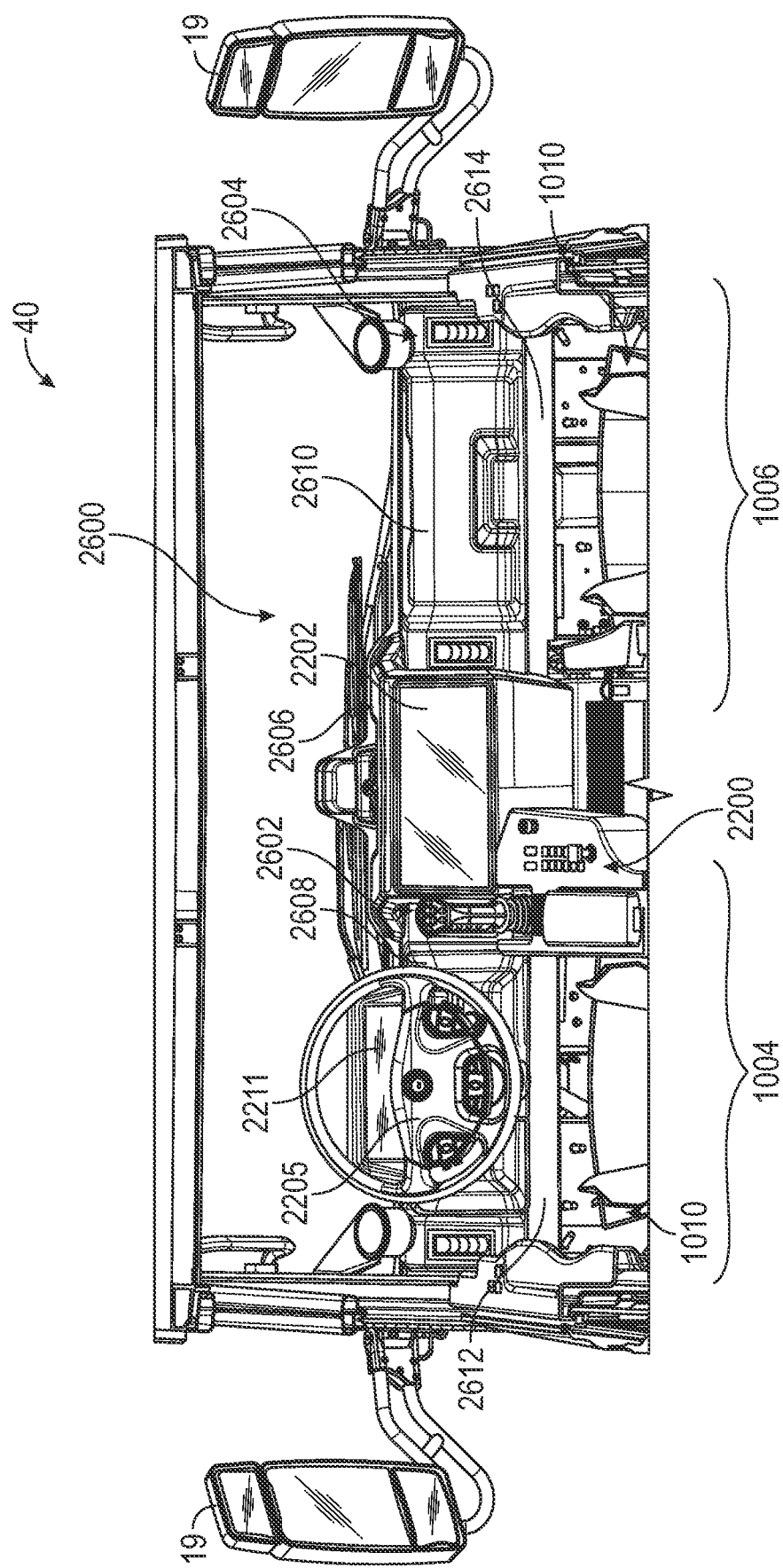
FIG. 36 is a top, rear perspective view of a cab of the vehicle of FIG. 1 in a left-hand drive configuration, according to an exemplary embodiment.
Figure 37:
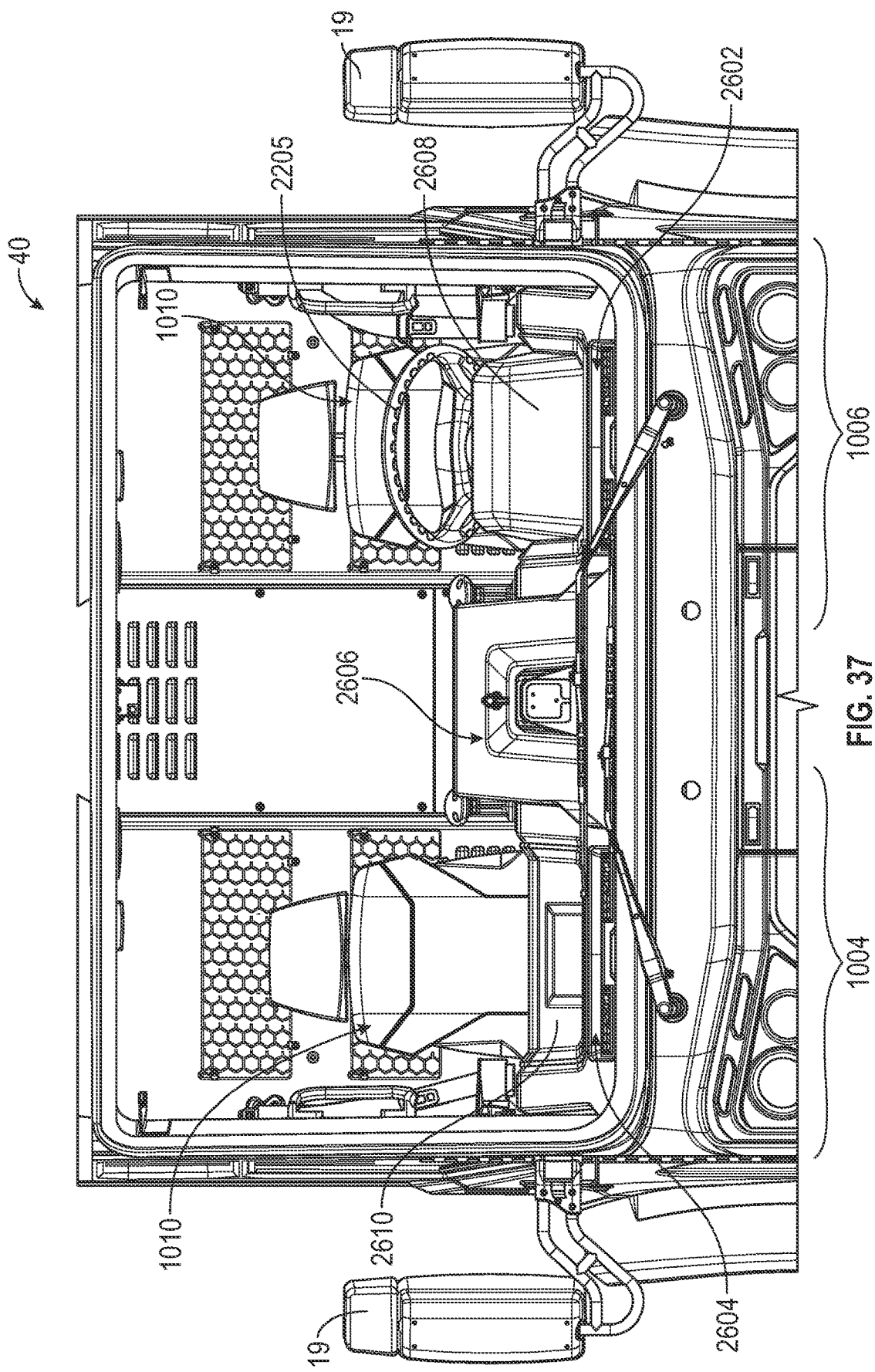
FIG. 37 is a front view of the cab of FIG. 36.
Figure 38:
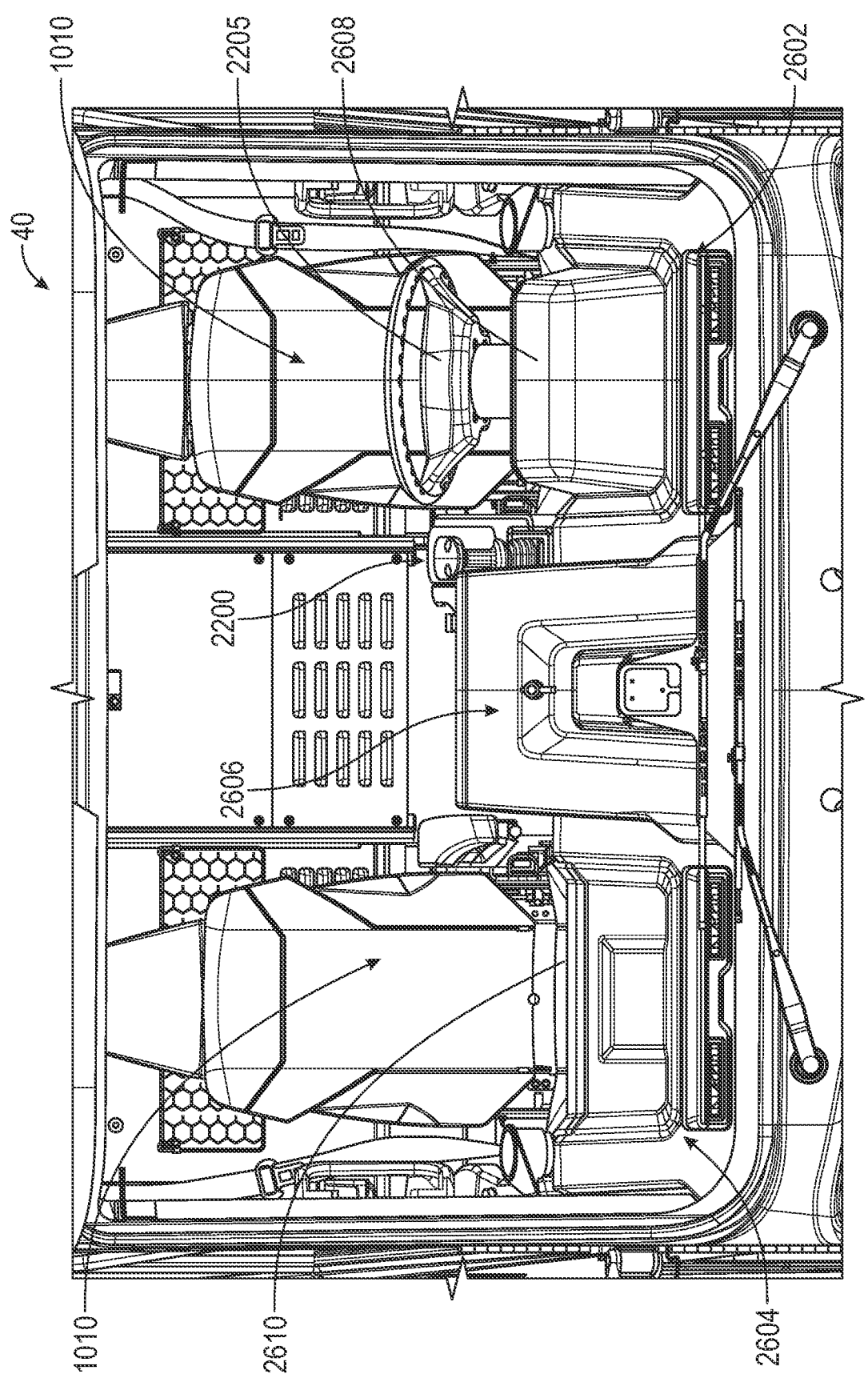
FIG. 38 is a top, front perspective view of the cab of FIG. 36.

With reference to FIGS. 36-38, the cab 40 is shown in a left-hand drive configuration where a front console or dash 2600 on the first side 1004 of the cab 40 includes the steering wheel 2205, and the seat 1010 on the first side 1004 of the cab 40 includes the control console 2200. In this configuration, one or more pedals 1210 are arranged adjacent to the floor 1212 on the first side 1004 of the cab 40. In general, the dash 2600 extends laterally along a front side of the cab interior 42 (e.g., adjacent to a windshield of the cab 40) and may include one or more dash pods to facilitate the installation of either a glove box or a gauge hood on the first side 1004 and/or the second side 1006, depending on the desired drive configuration. For example, the dash 2600 may include a first dash pod 2602 mounted on the first side 1004 of the dash 2600 and a second dash pod 2604 mounted on the second side 1006 of the dash 2600.

A center console 2606 is arranged on the dash 2600 between the first dash pod 2602 and the second dash pod 2604. The center console 2606 includes the user interface 2202 mounted therein. The first dash pod 2602 and the second dash pod 2604 are symmetrical in design and structure about a center axis or plane extending longitudinally along a center of the cab 40 or the chassis 20. That is, the first dash pod 2602 includes the same features as the second dash pod 2604, with the orientation of the features on the second dash pod 2604 being mirrored symmetrically to the corresponding features on the first dash pod 2602 about the center axis or plane. As will be described with reference to FIGS. 45-47, the first dash pod 2602 and the second dash pod 2604 both includes a universal mounting assembly that facilitates either a glove box or a gauge hood to be installed on the first dash pod 2602 or the second dash pod 2604. In the left-hand drive configuration shown in FIGS. 36-38, the first dash pod 2602 includes a gauge hood 2608 installed thereon and the second dash pod 2604 includes a glove box 2610 installed thereon. The gauge hood 2608 includes the display screen 2211, among other instrumentation, and the steering wheel 2205 extends through the gauge hood 2608.

In some embodiments, the first dash pod 2602 is installed on a first dash mounting plate 2612 and the second dash pod 2604 is installed on a second dash mounting plate 2614. In some embodiments, the dash pods 2602, 2604 are mounted to the corresponding dash mounting plate 2612, 2614 by a bracket 2666 (see, e.g., FIG. 46). Both the first dash mounting plate 2612 and the second dash mounting plate 2614 include mounting provisions for the steering wheel 2205 so that the steering wheel 2205 may be installed on the first dash mounting plate 2612, the second dash mounting plate 2614, or both the first dash mounting plate 2612 and the second dash mounting plate 2614 (e.g., two steering wheels 2205). This universal mounting of the steering wheel 2205 on the first side 1004 and the second side 1006 of the cab 40, combined with the universal mounting assembly of the first dash pod 2602 and the second dash pod 2604, enable the cab 40 to be configured in any one of the left-hand drive configuration, the right-hand drive configuration, and the dual-drive configuration without changing the main dash parts (e.g., the dash pods, the dash mounting plates, the center console, etc.).

Figure 39:
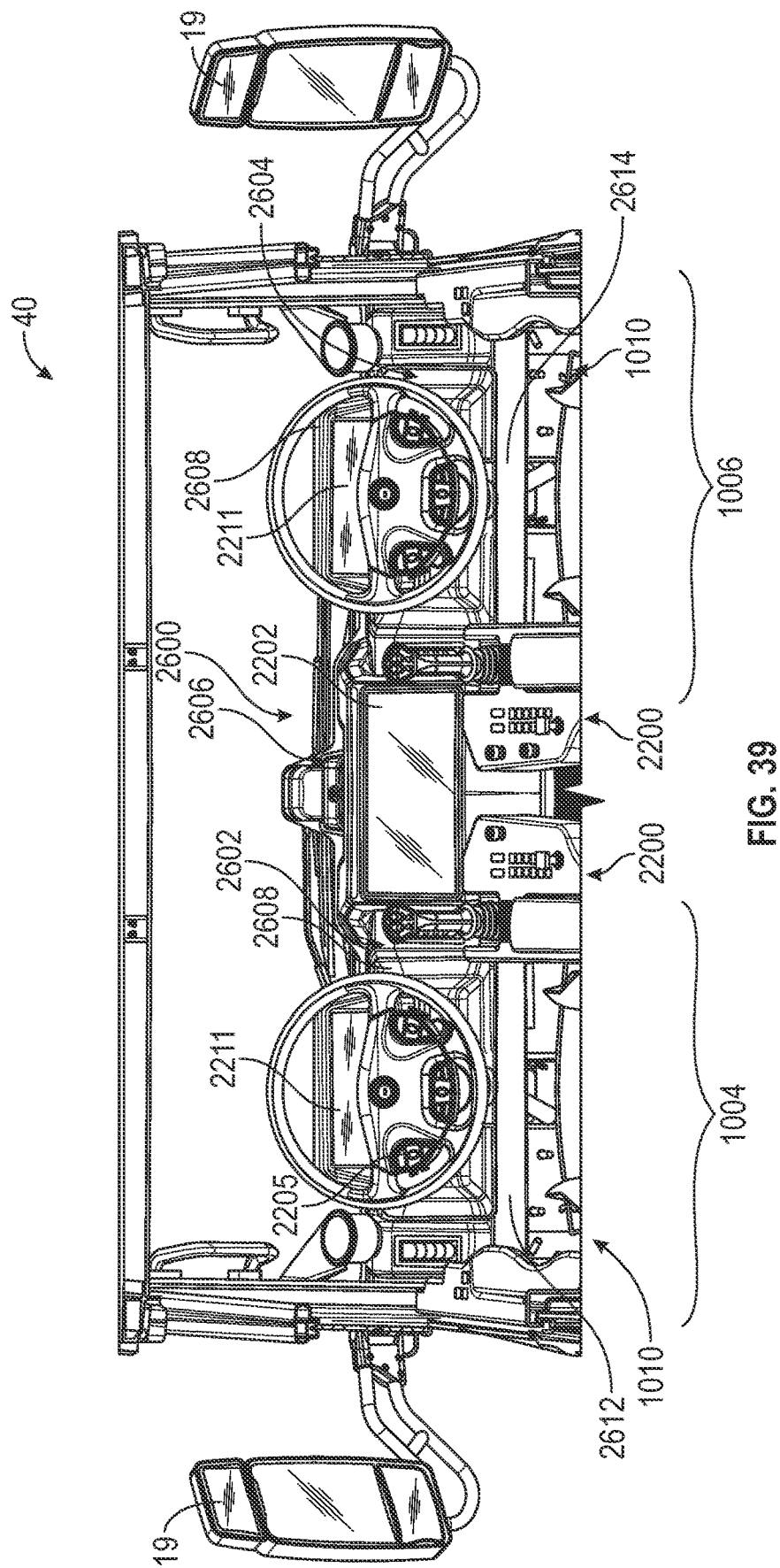
FIG. 39 is top, rear perspective view of a cab of the vehicle of FIG. 1 in a dual-drive configuration, according to an exemplary embodiment.
Figure 40:
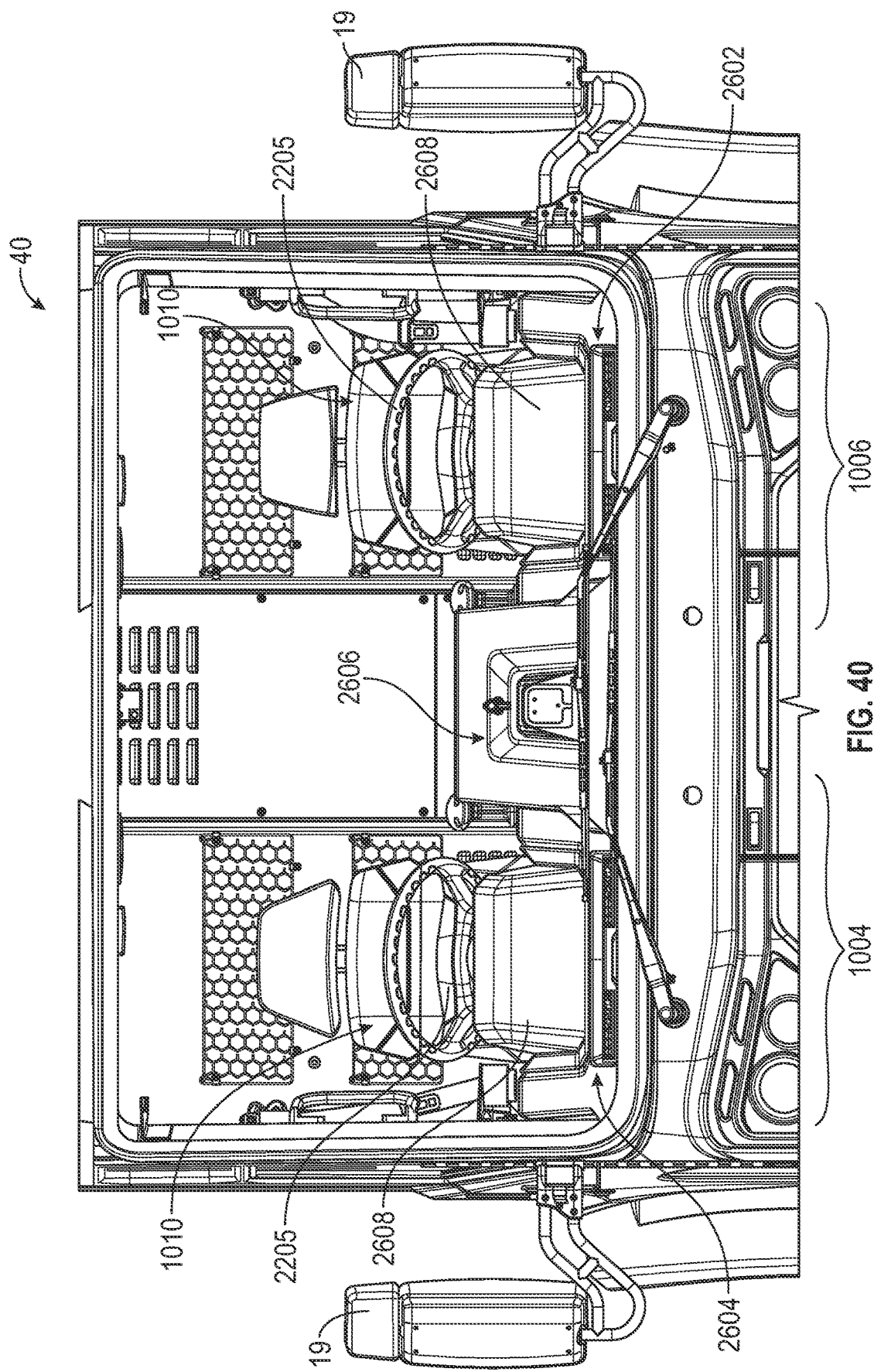
FIG. 40 is a front view of the cab of FIG. 39.
Figure 41:
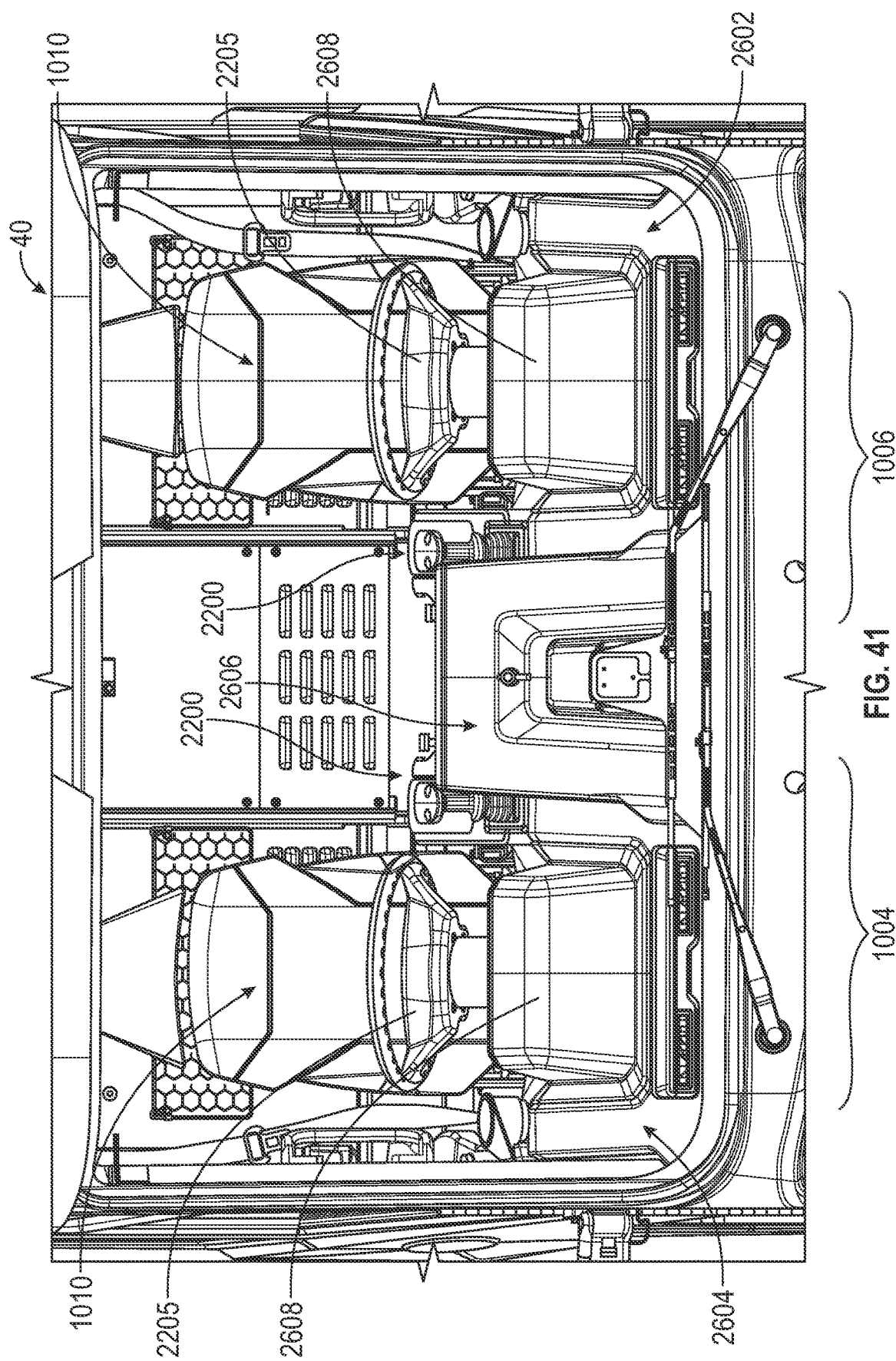
FIG. 41 is a top, front perspective view of the cab of FIG. 39.

With reference to FIGS. 39-41, the cab 40 is shown in a dual-drive configuration where both the first side 1004 and the second side 1006 of the dash 2600 include the steering wheel 2205, and the seat 1010 on both the first side 1004 and the second side 1006 of the cab 40 include the control console 2200. In this configuration, one or more pedals 1210 are arranged adjacent to the floor 1212 on both the first side 1004 and the second side 1006 of the cab 40. In addition, a gauge hood 2608 is installed on both the first dash pod 2602 and the second dash pod 2604. The systems and methods described herein for determining which drive components to activate (e.g., based on operator presence, the activation switch 2435, etc.) may be applied to the dual-drive configuration to determine whether the drive components on the first side 1004 or the second side 1006 are active and can control operation of the vehicle 10 (e.g., the refuse vehicle 100).

Figure 42:
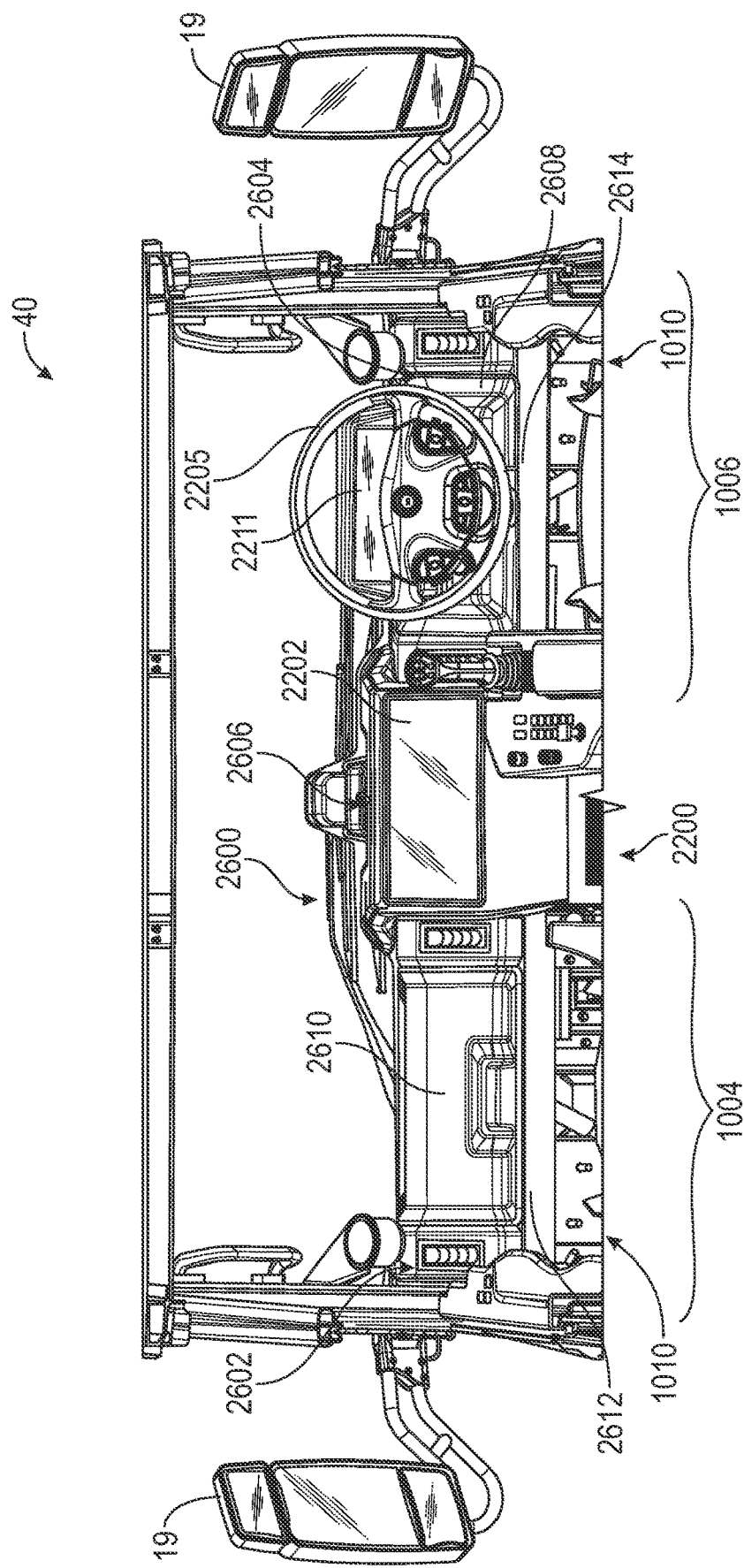
FIG. 42 is a top, rear perspective view of a cab of the vehicle of FIG. 1 in a right-hand drive configuration.
Figure 43:
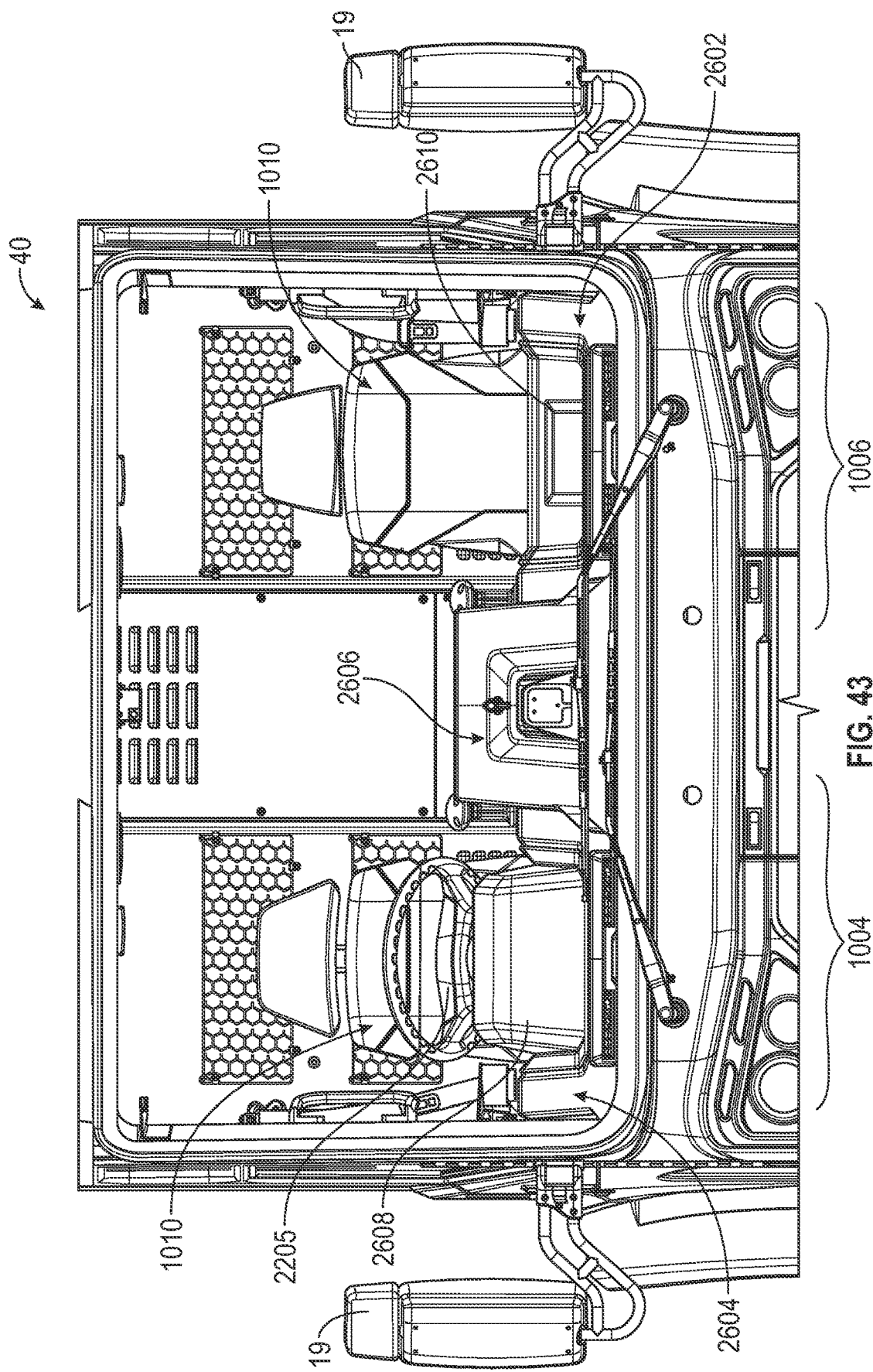
FIG. 43 is a front view of the cab of FIG. 42.
Figure 44:
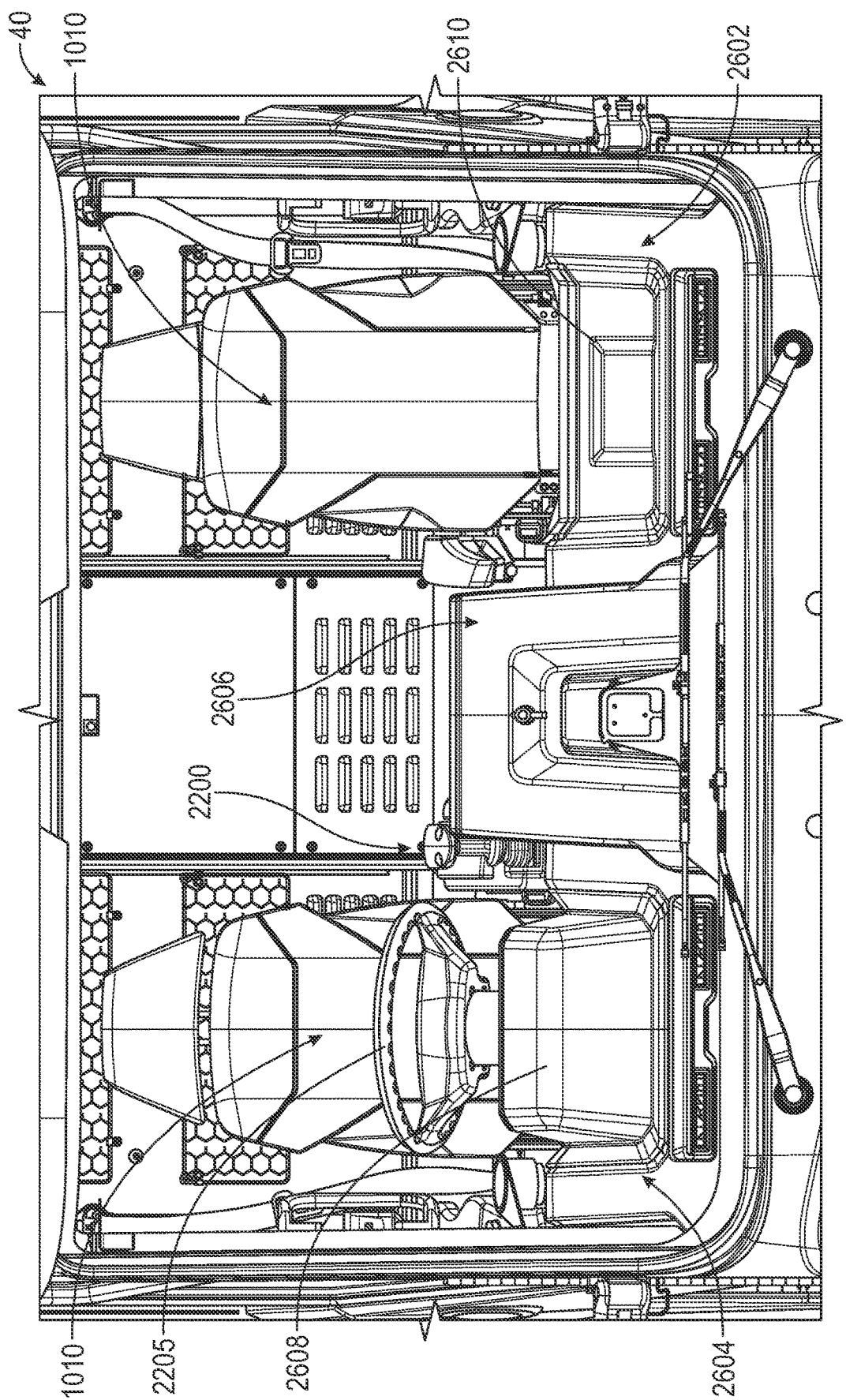
FIG. 44 is a top, front perspective view of the cab of FIG. 42.

With reference to FIGS. 42-44, the cab 40 is shown in a right-hand drive configuration where the second side 1006 of the dash 2600 includes the steering wheel 2205, and the seat 1010 on the second side 1006 of the cab 40 includes the control console 2200. In this configuration, one or more pedals 1210 are arranged adjacent to the floor 1212 on the second side 1006 of the cab 40. In addition, a glove box 2610 is installed on the first dash pod 2602 and a gauge hood 2608 is installed on the second dash pod 2604.

Figure 45:
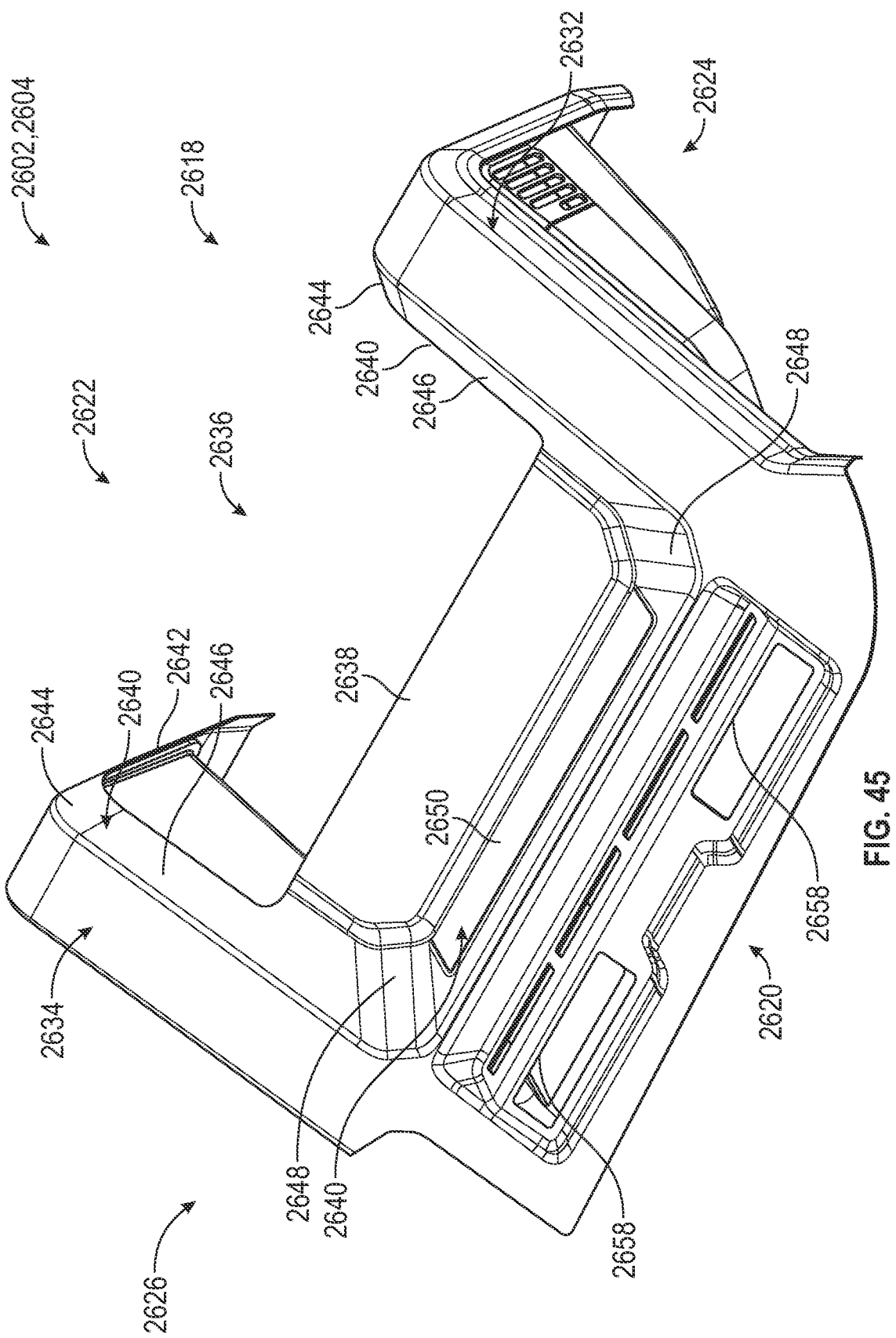
FIG. 45 is a top, front, left perspective view of a dash pod of the cab of FIG. 36, 39, or 42, according to an exemplary embodiment.
Figure 46:
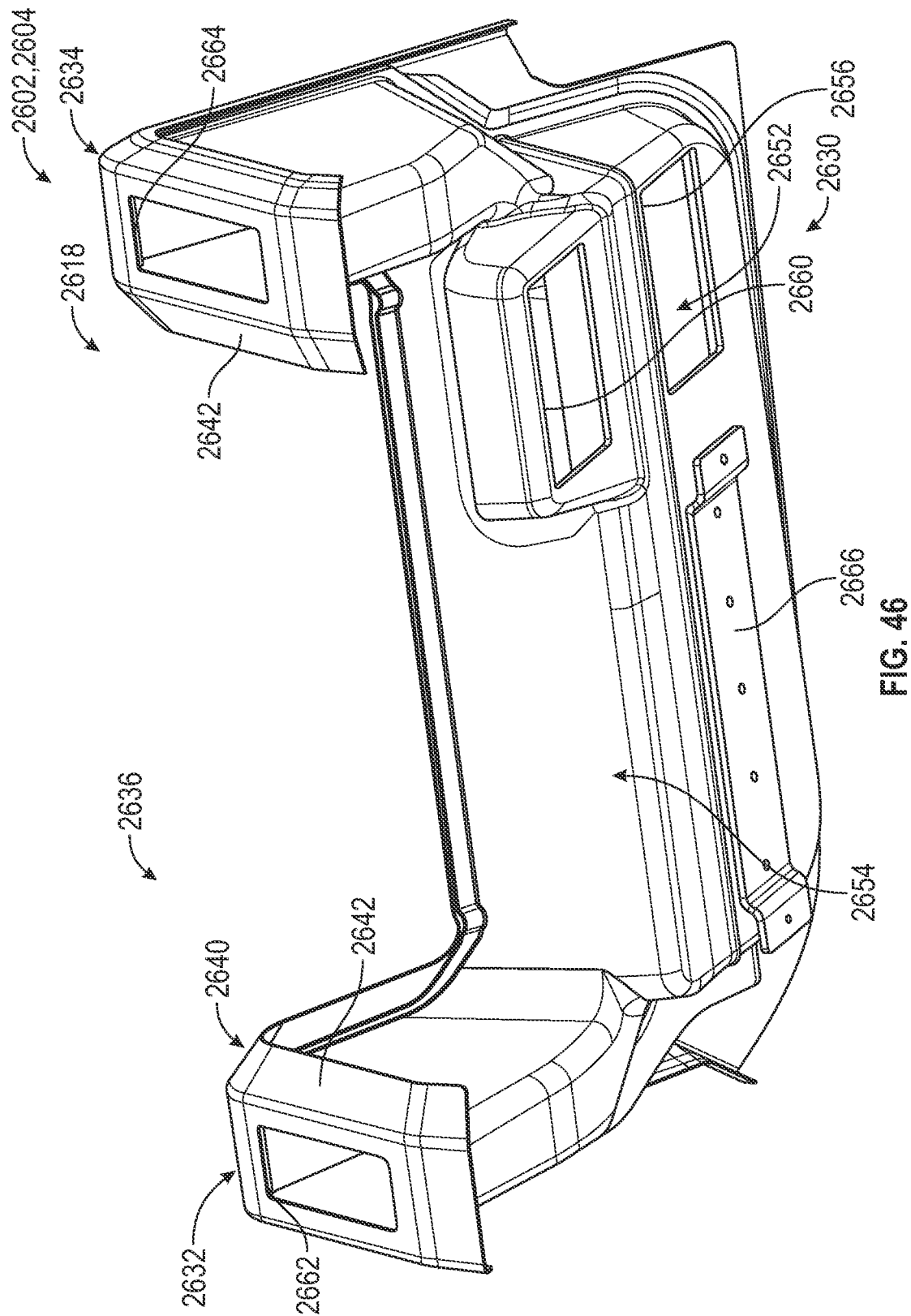
FIG. 46 is a bottom, rear, right perspective view of the dash pod of FIG. 45.
Figure 47:
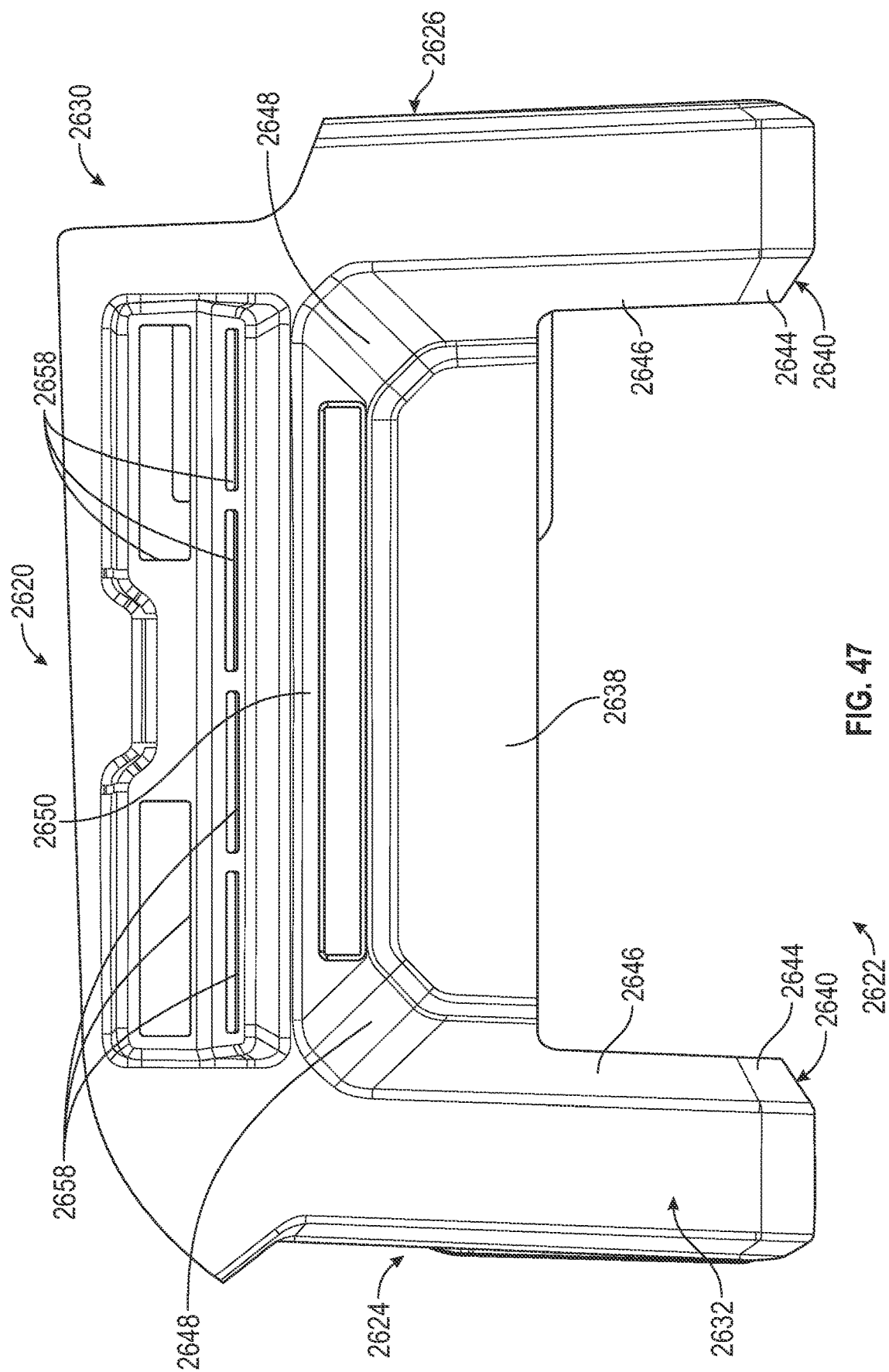
FIG. 47 is a top view of the dash pod of FIG. 45.

Turning to FIGS. 45-47, a dash pod is shown according to an exemplary embodiment. It should be appreciated that although the first dash pod 2602 is illustrated in FIGS. 45-47, the description herein applies symmetrically to the second dash pod 2604 (e.g., the second dash pod 2604 includes the same features and properties arranged symmetrically about the center axis or plane). In the illustrated embodiment, the first dash pod 2602 includes a body 2618 that defines a front side 2620, a rear side 2622, a left side 2624, a right side 2626, a top side 2628, and a bottom side 2630. The body 2618 includes a first arm 2632, a second arm 2634, and a universal mounting assembly 2636 formed laterally between the first arm 2632 and the second arm 2634.

The first arm 2632 extends from the front side 2620 to the rear side 2622 along the left side 2624 of the body 2618, and the second arm 2634 extends from the front side 2620 to the rear side 2622 along the right side 2626 of the body 2618. The mounting assembly 2636 includes a mounting platform 2638 and an angled mounting border 2640 that is formed by angled surfaces extending along the first arm 2632, the second arm 2634, and the mounting platform 2638. For example, angled surfaces (e.g., non-planar with adjacent surfaces or formed at an acute angle relative to adjacent surfaces) on the laterally-inner edges of the first arm 2632 and the second arm 2634 include a first portion 2342 that extend from distal ends of the first arm 2632 and the second arm 2634 in a first direction (e.g., a vertical direction) from the bottom side 2630 toward the top side 2628. The angled surfaces on the first arm 2632 and the second arm 2634 also include a second portion 2644 that curves in a direction toward the front side 2620 and is connected between the first portion 2642 and a third portion 2646, which extends toward the front side 2620 in a second direction (e.g., a horizontal direction) perpendicular to the first direction.

The angled surfaces formed along a periphery of the mounting platform 2638 connect to the third portions 2646 of the first arm 2632 and the second arm 2634 to form a continuous angled border that defines the angled mounting border. For example, the angled surfaces formed along a periphery of the mounting platform 2638 include laterally-opposing corner portions 2648 and a center portion 2650 extending laterally between the opposing corner portions 2648. The first portions 2642, the second portions 2644, the third portions 2646, the opposing corner portions 2648, and the center portion 2650 combine to form a continuous border that defines the angled mounting border 2640. The angled mounting border 2640 is configured to engage and receive a complementary angled border on the gauge hood 2608 or the glove box 2610. That is, both the gauge hood 2608 and the glove box 2610 are designed to include an angled mounting border that is complementary to the angled mounting border 2640 so that the gauge hood 2608 or the glove box 2610 can be installed onto corresponding dash pod 2602, 2604. In some embodiments, the gauge hood 2608 or the glove box 2610 are further secured (e.g., removably coupled) to the corresponding dash pod 2602, 2604 by fasteners (e.g., screws, bolts, clips, rivets, or an equivalent fastener). In some embodiments, the gauge hood 2608 or the glove box 2610 are further supported on the mounting platform 2638 of the corresponding dash pod 2602, 2604.

In general, both of the dash pods 2602, 2604 includes integrated HVAC ducting one or more ducts that receive HVAC air flow. For example, as illustrated in FIGS. 45-47, the first dash pod 2602 includes a front duct 2652 and a rear duct 2654. The front duct 2652 includes a front duct opening 2656 arranged on the bottom side 2630 (see, e.g., FIG. 46) that is in fluid communication with a plurality of front vent openings 2658 arranged on the top side 2628 of the body 2618 adjacent to the front side 2620 (e.g., defrost vents). The rear duct 2654 includes a rear duct opening 2660 arranged on the bottom side 2630 (see, e.g., FIG. 46) that is in fluid communication with a first arm vent opening 2662 and a second arm vent opening 2664 (e.g., passenger vents). The first arm vent opening 2662 is arranged within a distal end of the first arm 2632 and the second arm vent opening 2664 is arranged within a distal end of the second arm 2634.

In general, incorporating a universal mounting structure (e.g., the mounting platform 2638 and the angled mounting border 2640) and HVAC ducting into the dash pods 2602, 2604 reduces the number of components required to assemble the dash 2600 with the various drive configurations (e.g., left-hand drive, right-hand drive, and dual drive), and enables the cab 40 to be easily reconfigured to conform to different driving configurations without changing the main dash components (e.g., dash pods 2602, 2604, the center console 2606, etc.).

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the chassis 20 and the cab 40 of the exemplary embodiment shown in at least FIGS. 14-47 may be incorporated into the refuse vehicle 100 of the exemplary embodiments shown in at least FIG. 3-8. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle, comprising:
   a chassis coupled to a wheel, the chassis including a first portion and a second portion;
   an energy storage system supported by the chassis;
   a drive motor coupled to the wheel and configured to receive electrical energy from the energy storage system and provide rotational mechanical energy to the wheel;
   a cab supported by the first portion of the chassis;
   a refuse compartment supported by the second portion of the chassis;
   a suspension supported by the cab;
   a seat supported within an interior of the cab;
   an armrest arranged proximate to the seat and having control console with a joystick; and
   an armrest adjustment assembly coupled to the armrest and configured to adjust a height of the armrest relative to the seat,
   wherein the suspension supports the seat and the armrest so that a position of the armrest relative to the seat is maintained.

2. The refuse vehicle of claim 1, wherein the armrest adjustment assembly includes a housing and a gas strut arranged within the housing.

3. The refuse vehicle of claim 2, wherein the gas strut includes a lever that, when actuated, is configured to selectively raise or lower the armrest relative to the seat.

4. The refuse vehicle of claim 3, wherein the housing includes an outer housing and an inner housing telescopically received within the outer housing.

5. The refuse vehicle of claim 4, wherein the lever extends through an aperture formed in the outer housing.

6. The refuse vehicle of claim 1, wherein the armrest adjustment assembly includes a hinge pivotally coupled to the armrest.

7. The refuse vehicle of claim 6, wherein the armrest is configured to selectively pivot about the hinge to move between an operating position and a stowed position.

8. The refuse vehicle of claim 1, further comprising a second seat, a second armrest arranged proximate to the second seat, wherein the second armrest includes a second control console having a second joystick.

9. A refuse vehicle, comprising:
- a chassis coupled to a wheel, the chassis including a first portion and a second portion;
- an energy storage system supported by the chassis;
- a drive motor coupled to the wheel and configured to receive electrical energy from the energy storage system and provide rotational mechanical energy to the wheel;
- a cab supported by the first portion of the chassis;
- a refuse compartment supported by the second portion of the chassis;
- a suspension supported by the cab; and
- a seat supported within an interior of the cab and including:
  - an armrest coupled to the seat and having a joystick supported on the armrest; and
  - a gas strut coupled between the seat and the armrest and configured to adjust a height of the armrest relative to the seat,
- wherein the suspension supports the seat and the armrest so that a position of the armrest relative to the seat is maintained.

10. The refuse vehicle of claim 9, wherein the gas strut is received within an outer housing.

11. The refuse vehicle of claim 10, further comprising an inner housing telescopically received within the outer housing and coupled to the seat.

12. The refuse vehicle of claim 11, wherein the gas strut includes a lever that extends through an aperture formed in the outer housing.

13. The refuse vehicle of claim 11, wherein the armrest includes a hinge pivotally coupled between the seat and the outer housing.

14. The refuse vehicle of claim 13, wherein the armrest is configured to selectively pivot about the hinge to move between an operating position and a stowed position.

15. The refuse vehicle of claim 9, further comprising a second seat, a second armrest coupled to the second seat, wherein the second armrest includes a second joystick.

16. A refuse vehicle, comprising:
- a chassis coupled to a wheel, the chassis including a first portion and a second portion;
- an energy storage system supported by the chassis;
- a drive motor coupled to the wheel and configured to receive electrical energy from the energy storage system and provide rotational mechanical energy to the wheel;
- a cab supported by the first portion of the chassis;
- a refuse compartment supported by the second portion of the chassis;
- a suspension supported by the cab;
- a seat supported within an interior of the cab;
- an armrest coupled to the seat and having a joystick supported on the armrest; and
- an armrest adjustment assembly coupled to the armrest, the armrest adjustment assembly including a hinge and a housing, wherein the housing is coupled to the seat and the hinge is coupled to the armrest and the housing, wherein the armrest pivots about the hinge to selectively move between an operating position and a stowed position, and wherein the suspension supports the seat and the armrest so that a position of the armrest relative to the seat is maintained.

17. The refuse vehicle of claim 16, wherein the armrest adjustment assembly a gas strut arranged within the housing.

18. The refuse vehicle of claim 17, wherein the gas strut includes a lever that, when actuated, is configured to selectively raise or lower the armrest relative to the seat.

19. The refuse vehicle of claim 18, wherein the housing includes an outer housing and an inner housing telescopically received within the outer housing.

20. The refuse vehicle of claim 19, wherein the lever extends through an aperture formed in the outer housing.

* * * * *